under 35 U.S.C. 154(b) by 87 days.

(12) United States Patent
Sugimoto et al.

(10) Patent No.: US 7,304,705 B2
(45) Date of Patent: Dec. 4, 2007

(54) IMAGING UNIT, OPTICAL WRITE UNIT, OPTICAL READ UNIT AND IMAGE FORMING APPARATUS

(75) Inventors: Hiroyuki Sugimoto, Kanagawa (JP); Toshiaki Tokita, Kanagawa (JP); Yumi Matsuki, Kanagawa (JP); Masanori Kobayashi, Kanagawa (JP); Yasuyuki Takiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 87 days.

(21) Appl. No.: 10/394,269

(22) Filed: Mar. 24, 2003

(65) Prior Publication Data

US 2004/0036829 A1    Feb. 26, 2004

(30) Foreign Application Priority Data

Mar. 26, 2002  (JP)  .............................. 2002-086905
Apr. 2, 2002   (JP)  .............................. 2002-099540
Feb. 20, 2003  (JP)  .............................. 2003-042721

(51) Int. Cl.
    G02F 1/1343    (2006.01)
    C09K 19/02     (2006.01)
(52) U.S. Cl. ...................................... 349/141; 349/184
(58) Field of Classification Search ................ 349/139, 349/130, 141, 184
    See application file for complete search history.

(56) References Cited

U.S. PATENT DOCUMENTS

| 5,408,344 A | 4/1995 | Takiguchi et al. |
| 5,496,497 A | 3/1996 | Takiguchi et al. |
| 5,510,886 A | 4/1996 | Sugimoto et al. |
| 5,619,765 A | 4/1997 | Tokita et al. |
| 5,638,842 A | 6/1997 | Tokita et al. |
| 5,643,380 A | 7/1997 | Saitoh et al. |
| 5,694,188 A * | 12/1997 | Sano et al. .................. 349/139 |
| 5,737,044 A * | 4/1998 | Van Haaren et al. ......... 349/61 |
| 5,769,957 A | 6/1998 | Murakami et al. |
| 5,923,928 A | 7/1999 | Sugimoto |
| 5,926,669 A | 7/1999 | Sugimoto et al. |
| 5,969,780 A | 10/1999 | Matsumoto et al. |
| 6,006,062 A | 12/1999 | Takahashi et al. |

(Continued)

FOREIGN PATENT DOCUMENTS

JP        05-344431        12/1993

(Continued)

OTHER PUBLICATIONS

Applied Physics Society, Optics Social Meeting Edition, p. 198, "Crystal Optics".

(Continued)

*Primary Examiner*—Dung T. Nguyen
(74) *Attorney, Agent, or Firm*—Oblon, Spivak, McClelland, Maier & Neustadt, P.C.

(57) ABSTRACT

An imaging unit images light on a light receiving element, and includes an optical path shifting element, and a lens arranged on an input side or an output side of the optical path shifting element. The optical path shifting element includes a liquid crystal layer which is applied with an electrical field in a direction approximately parallel to an in-plane direction. The liquid crystal layer is made of a chiral smectic C phase ferroelectric liquid crystal having a homeotropic alignment. The optical path shifting element shifts an optical path of the light input thereto in an optical path shifting direction.

24 Claims, 26 Drawing Sheets

U.S. PATENT DOCUMENTS

| | | |
|---|---|---|
| 6,061,042 A | 5/2000 | Takahashi et al. |
| 6,151,093 A | 11/2000 | Takiguchi et al. |
| 6,157,795 A | 12/2000 | Kadonaga et al. |
| 6,223,008 B1 | 4/2001 | Takahashi et al. |
| 6,351,299 B2 | 2/2002 | Takiguchi et al. |
| 6,497,488 B1 | 12/2002 | Yamauchi et al. |
| 6,524,759 B1 | 2/2003 | Sugimoto et al. |
| 6,537,711 B1 | 3/2003 | Nimura et al. |
| 2002/0097369 A1* | 7/2002 | Yanagida et al. ........... 349/165 |
| 2002/0135729 A1 | 9/2002 | Tokita et al. |
| 2004/0036829 A1 | 2/2004 | Sugimoto et al. |

FOREIGN PATENT DOCUMENTS

| | | | |
|---|---|---|---|
| JP | 08-118726 | | 5/1996 |
| JP | 09-116704 | | 5/1997 |
| WO | WO 00/31582 | * | 6/2000 |

OTHER PUBLICATIONS

U.S. Appl. No. 11/206,205, filed Aug. 18, 2005, Tokita, et al.
U.S. Appl. No. 11/409,059, filed Apr. 24, 2006, Sugimoto, et al.

* cited by examiner

FIG.4A
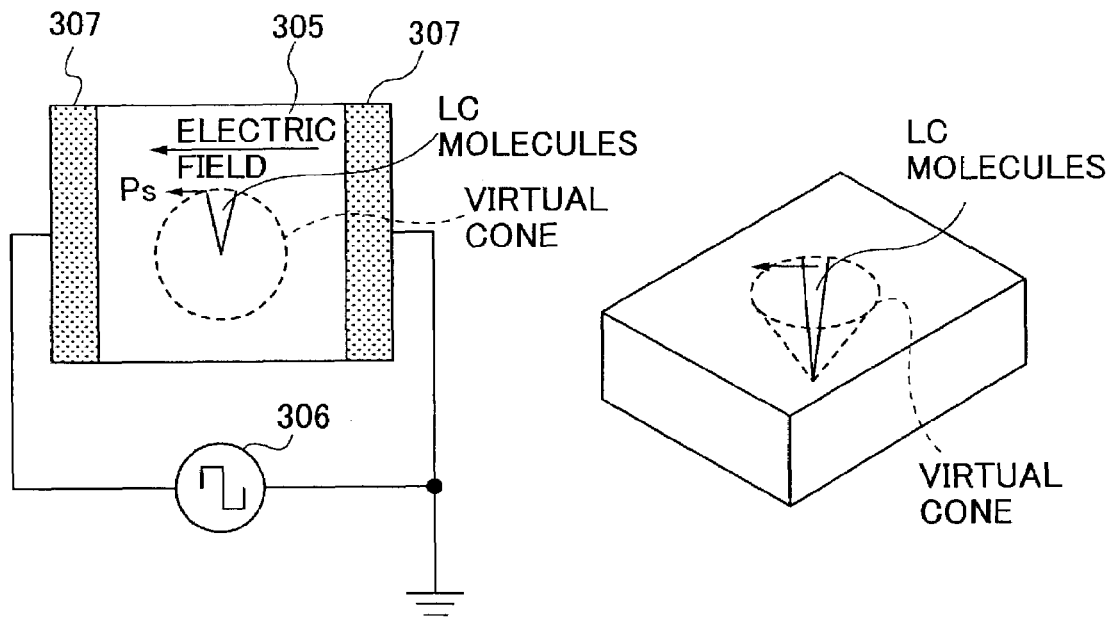
FIG.4B
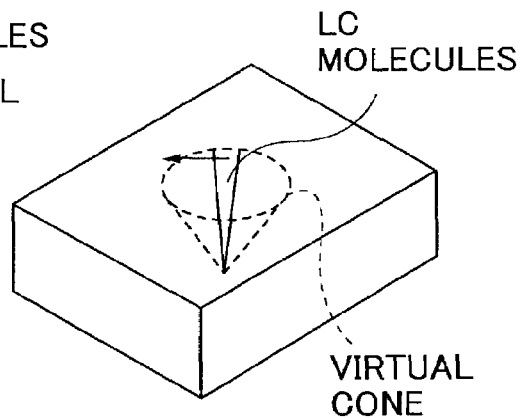
FIG.5A
FIG.5B
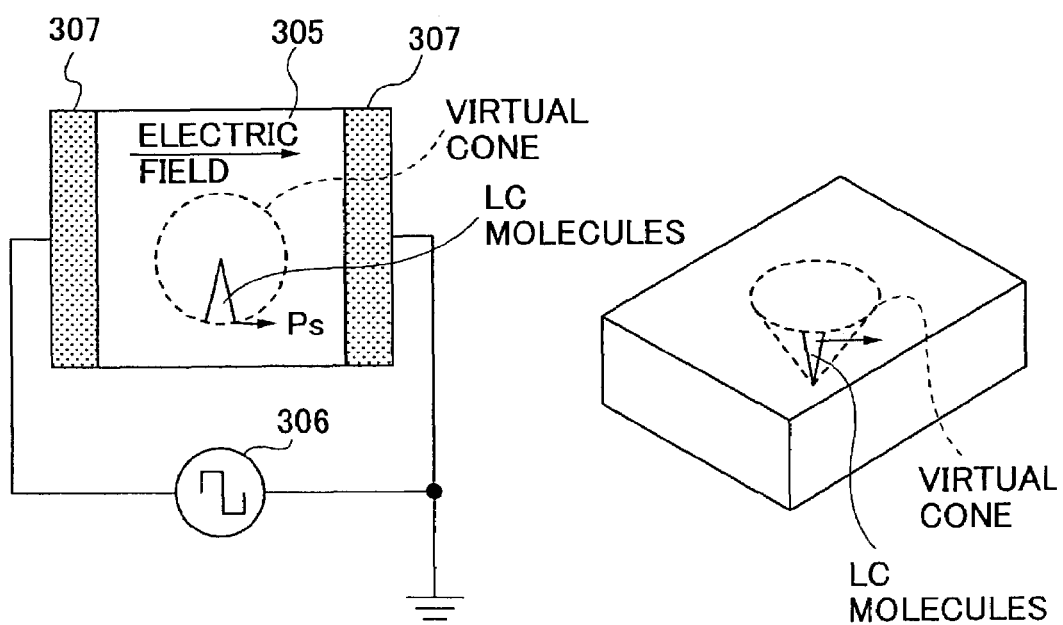

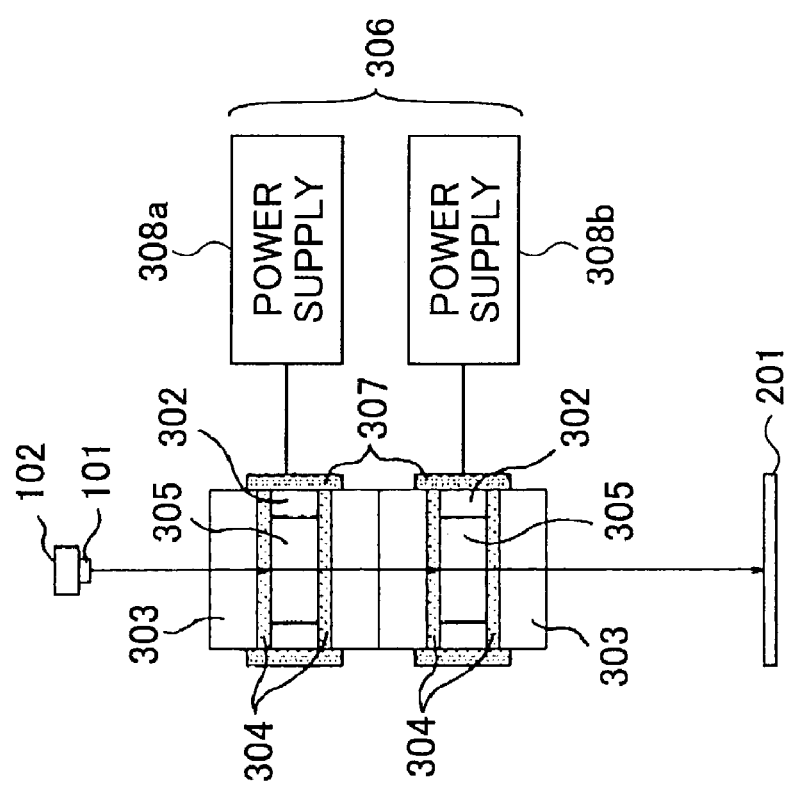
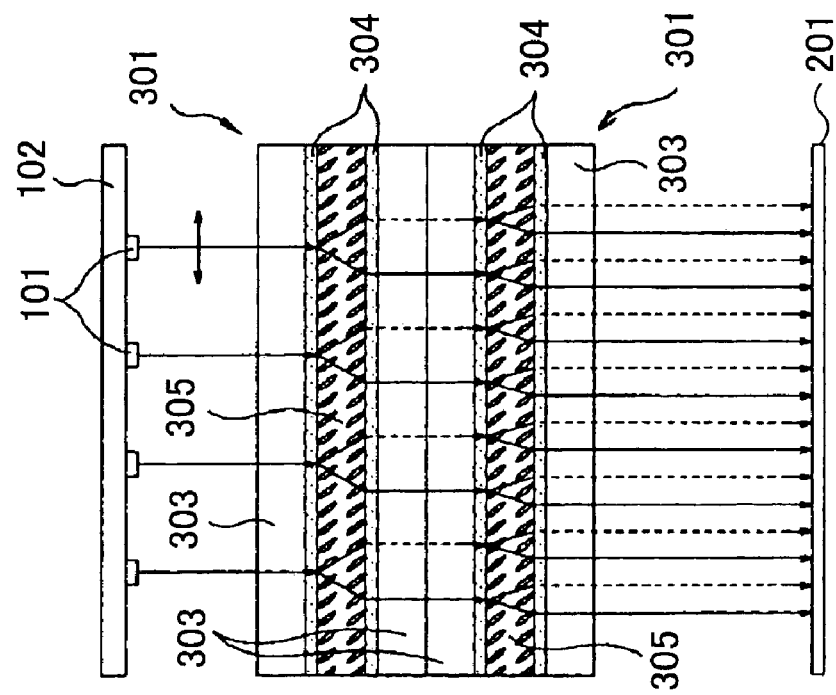

MEDIUM MOVING DIRECTION

NOISE

INCIDENT LIGHT POLARIZATION DIRECTION

IMAGING POSITION SHIFTING DIRECTION

FIG.42
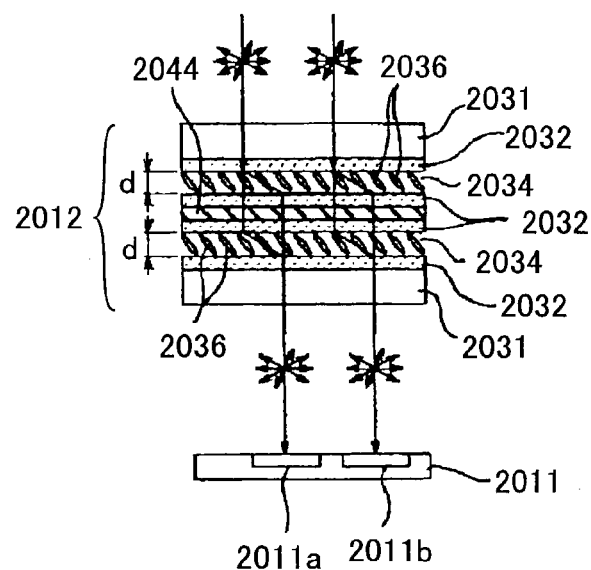
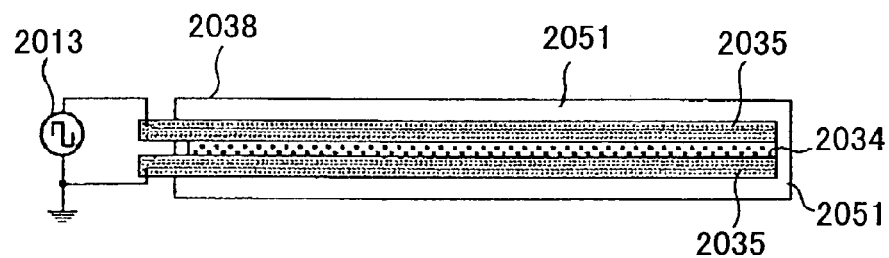
FIG.43A
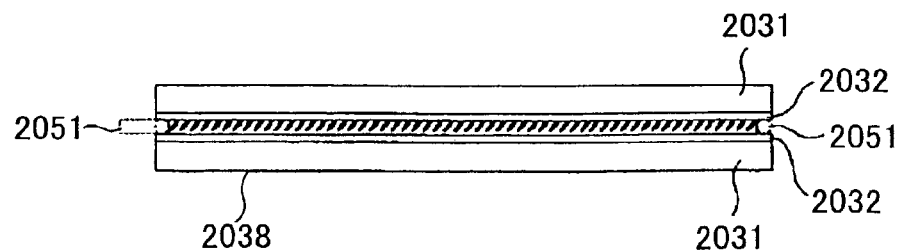
FIG.43B

IMAGING UNIT, OPTICAL WRITE UNIT, OPTICAL READ UNIT AND IMAGE FORMING APPARATUS

BACKGROUND OF THE INVENTION

This application claims the benefit of Japanese Patent Applications No. 2002-086905 filed Mar. 26, 2002, No. 2002-099540 filed Apr. 2, 2002, and No. 2003-042721 filed Feb. 20, 2003, in the Japanese Patent Office, the disclosure of which is hereby incorporated by reference.

1. Field of the Invention

The present invention generally relates to imaging units, optical write units, optical read units and image forming apparatuses, and more particularly to an imaging unit, an optical read unit and an image forming apparatus which use an optical path shifting element, and to an optical write unit and an image forming apparatus which use a light emitting element array.

2. Description of the Related Art

There are various kinds of image forming apparatuses, such as electrophotography type copying machines, printers, facsimile machines and composite apparatuses (MFPs) having multiple functions such as copying, printing and facsimile functions, photoexposure type apparatuses and printers which use photosensitive materials, and printers and facsimile machines which use thermal materials. In such image forming apparatuses, an image forming engine may be formed by an optical write unit which uses a light emitting element array.

In the optical write unit which uses the light emitting element array, it is necessary to reduce the pitch of the light emitting elements of the light emitting element array, in order to increase the resolution of the printed image. For example, when producing a light emitting element array having a pixel pitch of 1200 dpi, the pitch of the light emitting elements becomes approximately 21 µm. However, the cost of such a light emitting element array becomes high, because of the need to employ a high-density mounting technique such as wire-bonding.

Accordingly, an optical write unit was previously proposed in a Japanese Laid-Open Patent Application No. 8-118726, which uses a light emitting element array having a low resolution but enables printing at a high resolution. This proposed optical write unit uses an imaging position control means for electrooptically changing an exposure position, by combining a ferroelectric liquid crystal cell which rotates a plane of polarization by 90 degrees and a birefringence plate.

FIG. 1 is a cross sectional view showing an example of a conventional optical write unit, such as that proposed in the Japanese Laid-Open Patent Application No. 8-118726.

In FIG. 1, a transparent electrode 2 and a horizontal alignment layer 3 are formed on each of a pair of transparent substrates 1. A liquid crystal layer 4 made of a chiral smectic C phase ferroelectric liquid crystal is sandwiched between the horizontal alignment layers 3 provided on the pair of transparent substrates 1. The thickness of the liquid crystal layer 4 is set smaller than the spiral pitch of the chiral smectic C phase. Hence, the liquid crystal layer 4 forms a surface stabilizing type ferroelectric liquid crystal cell.

The liquid crystal layer 4 is made of a liquid crystal material which makes a 45 degree change in the alignment direction of the liquid crystal directors when the electric field is switched. Hence, it is possible to rotate the plane of polarization by 90 degrees by performing the switching so that the direction of the liquid crystal directors becomes parallel to or 45 degrees to the plane of linearly polarized light of the incident light.

In addition, by providing the birefringence plate 5 at a stage subsequent to the liquid crystal cell formed by the liquid crystal layer 4, the light propagates linearly when the plane of polarization is such that the light becomes an ordinary ray component with respect to the birefringence plate 5, and the light makes a parallel shift when the plane of polarization is such that the light becomes an extraordinary ray component with respect to the birefringence plate 5. In this case, the amount of shift of the optical path is determined by the direction of the optical axis of the birefringence plate 5 and the thickness of the birefringence plate 5.

The optical write unit is formed by interposing an optical path shifting element 6 having the structure described above between a light emitting element array 7 and a recording medium 8. In this optical write unit, light emitting from a plurality of light emitting elements 9 of the light emitting element array 7 is converged by a lens (not shown), and is thereafter irradiated on the recording medium 8 via the optical path shifting element 6. By switching the polarity of the electric field applied to the liquid crystal layer 4 via the transparent electrodes 2, the direction of the spontaneous polarization of the liquid crystal layer 4 switches between the directions indicated by symbols "●" and "⊗" shown in FIG. 1. Hence, the light emitted from the light emitting element array 7 exposes the recording medium 8 at a pitch which is ½ the pitch of the light emitting elements 9, depending on the operation of switching the spontaneous polarization direction by the optical path shifting element 6. In other words, if the light emitting elements 9 are arranged at the pitch of N µm, it is possible to expose the recording medium 8 by shifting the optical path in the direction in which the light emitting elements 9 are arranged by N/2 µm.

Therefore, by using the optical write unit described above in the image forming apparatus, it is possible to print at a high resolution even by use of the light emitting element array having a lower resolution. Moreover, the surface stabilizing type ferroelectric liquid crystal cell formed by the liquid crystal layer 4 can be switched at a high speed, so that a high-speed optical path shifting can be realized.

However, the optical write unit shown in FIG. 1 has the following problems (1)-(5).

(1) The surface stabilizing type ferroelectric liquid crystal cell requires the cell gap to be controlled with a high accuracy, and for this reason, it is difficult to produce the surface stabilizing type ferroelectric crystal cell within an area corresponding to the size of the light emitting element array.

(2) The surface stabilizing type ferroelectric liquid crystal cell requires a pair of transparent electrodes in the optical path, thereby decreasing the transmittance of the surface stabilizing type ferroelectric liquid crystal cell.

(3) An optical crystal which functions as the birefringence plate is expensive in general, and the cost of the optical write unit becomes high when the optical crystal covering an area corresponding to the size of the light emitting element array is used.

(4) Because the switching is made between the optical path linearly propagating through the birefringence plate and the optical path propagating obliquely through the birefringence plate, the focal point shifts due to the difference between the optical path lengths of the two optical paths.

(5) Since the amount of light propagation in the optical path is determined by the birefringence and the thickness of the optical crystal, the amount of light propagation in the optical path becomes fixed.

On the other hand, in an optical read unit used in digital copying machines, image scanners and the like, a document image is read by driving first and second scanning bodies to scan the document. The scanned document image is imaged by an imaging lens on a solid state image sensing device using CCDs.

In such an optical read unit, when the number of pixels is increased, in conveniences such as inconsistencies in the sensitivities with respect to each of the pixels, warping of the solid state image sensing device itself, increase of the production cost, the increase in the size of the optical read unit, and increase of the frequency of a read pixel clock for the solid state image sensing device occur. Hence, it is desirable to increase the reading density and to realize a high picture quality without introducing the above described inconveniences, and to suppress the so-called moire image without deteriorating the resolution characteristic. A method of realizing these desires shifts the solid state image sensing device in the main scan direction, and improves the reading density by reading between the light receiving parts of the solid state image sensing device for the adjacent pixels. Such a method is referred to as a pixel shifting method, and is sometimes also referred to as a pixel shifting method or an image shifting method.

However, when combining the two images which are read by shifting the pixel position, the number of scans required increases because of the need to make the scan before and after the shifting of the solid state image sensing device. In addition, when reading while shifting the pixel position during one scan operation, it is necessary to shift the pixel position at a high speed. Furthermore, in order to shift the pixel position, it is necessary to move the solid state image sensing device itself by use a piezoelectric element or the like or, to shift the optical path by rotating the angle of an optical part such as a glass plate. In either case, it is necessary to use mechanical parts for the purpose of shifting the pixel position. For this reason, the mechanical structure of the optical read unit becomes complex, and vibrations and noise generated by the mechanical parts and the mechanical durability and reliability of the mechanical parts become a problem particularly when the pixel position is shifted at a high speed, as in the case of the mechanical structure proposed in a Japanese Laid-Open Patent Application No. 9-116704, for example.

Accordingly, a method of electrooptically shifting the optical path has been proposed. For example, a Japanese Laid-Open Patent Application No. 5-344431 proposes a combination of a birefringence plate and a liquid crystal element which rotates the plane of polarization.

In the optical read unit which uses the combination of the liquid crystal element and the birefringence plate, it is conceivable to use a surface stabilizing type ferroelectric liquid crystal cell as the liquid crystal element in order to realize a high-speed response.

In other words, a liquid crystal material which makes a 45 degree change in the alignment direction of the liquid crystal directors when the electric field is switched is used, and it is possible to rotate the plane of polarization by 90 degrees by performing the switching so that the direction of the liquid crystal directors becomes parallel to or 45 degrees to the plane of linearly polarized light of the incident light. In addition, by providing the birefringence plate at a stage subsequent to the liquid crystal cell, the light propagates linearly when the plane of polarization is such that the light becomes an ordinary ray component with respect to the birefringence plate, and the light makes a parallel shift when the plane of polarization is such that the light becomes an extraordinary ray component with respect to the birefringence plate. In this case, the amount of shift of the optical path is determined by the direction of the optical axis of the birefringence plate and the thickness of the birefringence plate. The ferroelectric liquid crystal cell is capable of making a high-speed switching, and thus, the optical path can be shifted at a high speed.

However, the optical read unit described above also has the problems (1)-(5) of the optical write unit described above.

SUMMARY OF THE INVENTION

Accordingly, it is a general object of the present invention to provide a novel and useful imaging unit, optical write unit, optical read unit and image forming apparatus, in which the problems described above are eliminated.

Another and more specific object of the present invention is to provide an imaging unit, an optical write unit and an image forming apparatus, which can solve the problems (1)-(5) described above and realize a high-resolution image exposure even by use of a light emitting element array having a relatively low resolution.

Still another and more specific object of the present invention is to provide an imaging unit, an optical write unit, an optical read unit and an image forming apparatus, which can solve the problems (1)-(5) described above and realize a high-definition image reading at a high speed, with a high-speed response, a high light utilization efficiency and adjustable amount of shift depending on the electric field intensity, and without a change in the optical path length when the imaging position is shifted.

Still another object of the present invention is to provide an imaging unit for imaging light on a light receiving element, comprising at least one optical path shifting element having an input side and an output side; and a lens arranged on the input side or the output side of the optical path shifting element, where the light receiving element receiving light imaged thereon via the optical path shifting element which comprises a liquid crystal layer; first and second vertical alignment layers arranged on opposite surfaces of the liquid crystal layer; first and second transparent substrates respectively arranged on the first and second vertical alignment layers; and first and second electrodes arranged on respective sides of the liquid crystal layer and applying an electrical field in a direction approximately parallel to an in-plane direction of the first and second substrates when applied with a voltage, the liquid crystal layer is made of a chiral smectic C phase ferroelectric liquid crystal having a homeotropic alignment caused by the vertical alignment layers, and the optical path shifting element shifts an optical path of the light input thereto in an optical path shifting direction in one of a first state and a second state depending on a state of the electric field applied to the liquid crystal layer. According to the imaging unit of the present invention, it is possible to image the light on the light receiving element at a high speed and with a high definition or resolution.

A further object of the present invention is to provide an optical write unit for optically writing image on a recording medium, comprising a light emitting element array having a plurality of light emitting elements arranged in an arrangement direction at a predetermined pixel pitch; a lens converging light emitted from the light emitting element array on the recording medium; and at least one optical path shifting element electrically shifting an optical path of the light emitted from the light emitting element array in an optical path shifting direction parallel to the arrangement direction, where the optical path shifting element is controlled to shift the optical path to thereby irradiate light, which has been interpolated between pixels of the predetermined pixel pitch, with respect to the recording medium, the optical path shifting element comprises a pair of transparent electrodes having a predetermined separation; a pair of vertical alignment layers disposed between the pair of transparent electrodes; a liquid crystal layer, disposed between the pair of vertical alignment layers, and made of a chiral smectic C phase ferroelectric liquid crystal having a homeotropic alignment caused by the pair of vertical alignment layers; and electric field generating means for applying a voltage to the liquid crystal layer to generate an electric field in a direction which is approximately parallel to an in-plane direction of the pair of transparent substrates and is approximately perpendicular to the arrangement direction. According to the optical write unit of the present invention, it is possible to carry out a high-definition optical write operation at a high speed, and it is possible to obtain advantageous effects such as high response speed, high light utilization efficiency, adjustable amount of shift of the optical path depending on the electric field intensity, and no change in the optical path length between the shifted positions of the optical path.

Another object of the present invention is to provide an image forming apparatus comprising a photoconductive body; a charging unit uniformly charging a surface of the photoconductive body; an optical write unit forming a latent image on the charged surface of the photoconductive body by irradiating light thereon; a developing unit developing the latent image into a developed image; and a transfer unit transferring the developed image onto a recording medium, where the optical write unit comprises a light emitting element array having a plurality of light emitting elements arranged in an arrangement direction at a predetermined pixel pitch; a lens converging light emitted from the light emitting element array on the photoconductive body; and at least one optical path shifting element electrically shifting an optical path of the light emitted from the light emitting element array in an optical path shifting direction parallel to the arrangement direction, the optical path shifting element is controlled to shift the optical path to thereby irradiate light, which has been interpolated between pixels of the predetermined pixel pitch, with respect to the photoconductive body, and the optical path shifting element comprises a pair of transparent electrodes having a predetermined separation; a pair of vertical alignment layers disposed between the pair of transparent electrodes; a liquid crystal layer, disposed between the pair of vertical alignment layers, and made of a chiral smectic C phase ferroelectric liquid crystal having a homeotropic alignment caused by the pair of vertical alignment layers; and electric field generating means for applying a voltage to the liquid crystal layer to generate an electric field in a direction which is approximately parallel to an in-plane direction of the pair of transparent substrates and is approximately perpendicular to the arrangement direction. According to the image forming apparatus of the present invention, it is possible to carry out a high-definition optical write operation at a high speed, and it is possible to obtain advantageous effects such as high response speed, high light utilization efficiency, adjustable amount of shift of the optical path depending on the electric field intensity, and no change, in the optical path length between the shifted positions of the optical path. Furthermore, it is possible to form an image having a high contrast even when the optical write operation is carried out at a relatively low light intensity.

Still another object of the present invention is to provide an optical read unit comprising a light source which scans a document having a document image which is to be read by a scanning light; an imaging element, including a plurality of photocells, receiving light reflected from the document to read the document image, and having a first read resolution; at least one optical path shifting element, having an input side and an output side, shifting an imaging position of the light received by the imaging element in a main scan direction of the scanning light by shifting an optical path of an incoming light in an optical path shifting direction; and a control circuit controlling the imaging element and the optical path shifting element to time-divisionally receive light corresponding to a plurality of pixels by each common photocell of the imaging element by shifting the optical path by the optical path shifting element, so as to increase an effective second read resolution of the imaging element is greater than the first read resolution, where the optical path shifting element comprises a liquid crystal layer; first and second vertical alignment layers arranged on opposite surfaces of the liquid crystal layer; first and second transparent substrates respectively arranged on the first and second vertical alignment layers; and first and second electrodes arranged on respective sides of the liquid crystal layer and applying an electrical field in a direction approximately parallel to an in-plane direction of the first and second substrates when applied with a voltage, the liquid crystal layer is made of a chiral smectic C phase ferroelectric liquid crystal having a homeotropic alignment caused by the vertical alignment layers, and the optical path shifting element shifts the optical path in one of a first state and a second state depending on a state of the electric field applied to the liquid crystal layer. According to the optical read unit of the present invention, it is possible to carry out a high-resolution optical read operation at a high speed, and it is possible to obtain advantageous effects such as high response speed, high light utilization efficiency, adjustable amount of shift of the optical path depending on the electric field intensity, and no change in the optical path length between the shifted positions of the optical path.

A further object of the present invention is to provide an image forming apparatus comprising an optical read unit which reads a document image of a document; and a printer engine which prints the document image read by the optical read unit, where the optical read unit comprises a light source which scans the document by a scanning light; an imaging element, including a plurality of photocells, receiving light reflected from the document to read the document image, and having a first read resolution; at least one optical path shifting element, having an input side and an output side, shifting an imaging position of the light received by the imaging element in a main scan direction of the scanning light by shifting an optical path of an incoming light in an optical path shifting direction; and a control circuit controlling the imaging element and the optical path shifting element to time-divisionally receive light corresponding to a plurality of pixels by each common photocell of the imaging element by shifting the optical path by the optical path shifting element, so as to increase an effective second read resolution of the imaging element is greater than the first read resolution, the optical path shifting element comprises a liquid crystal layer; first and second vertical alignment layers arranged on opposite surfaces of the liquid crystal layer; first and second transparent substrates respectively arranged on the first and second vertical alignment layers; and first and second electrodes arranged on respective sides of the liquid crystal layer and applying an electrical field in a direction approximately parallel to an in-plane direction of the first and second substrates when applied with a voltage, the liquid crystal layer is made of a chiral smectic C phase ferroelectric liquid crystal having a homeotropic alignment caused by the vertical alignment layers, and the optical path shifting element shifts the optical path in one of a first state and a second state depending on a state of the electric field applied to the liquid crystal layer. According to the image forming apparatus of the present invention, it is possible to carry out a high-resolution optical read operation at a high speed, and it is possible to obtain advantageous effects such as high response speed, high light utilization efficiency, adjustable amount of shift of the optical path depending on the electric field intensity, and no change in the optical path length between the shifted positions of the optical path.

Other objects and further features of the present invention will be apparent from the following detailed description when read in conjunction with the accompanying drawings.

BRIEF DESCRIPTION OF THE DRAWINGS

FIGS. 4A and 4B are diagrams for explaining a direction of an electric field generated in a liquid crystal layer of an optical path shifting element, and a tilt direction of liquid crystal molecules;

FIGS. 5A and 5B are diagrams for explaining the direction of the electric field generated in the liquid crystal layer of the optical path shifting element, and the tilt direction of the liquid crystal molecules, for a case where the direction of the electric field is reversed;

FIG. 9A is a side view in cross section showing a second embodiment of the optical write unit according to the present invention;

FIG. 9B is a front view in cross section showing the second embodiment of the optical write unit;

FIG. 42 is a side view in cross section showing a fourth embodiment of the optical read unit according to the present invention; and FIGS. 43A and 43B respectively are a plan view and a side view showing an optical path shifting element created by the present inventors.

DESCRIPTION OF THE PREFERRED EMBODIMENTS

First, a description will be given of a first embodiment of an optical write unit according to the present invention, by referring to FIGS. 2 through 6.

Figure 2:
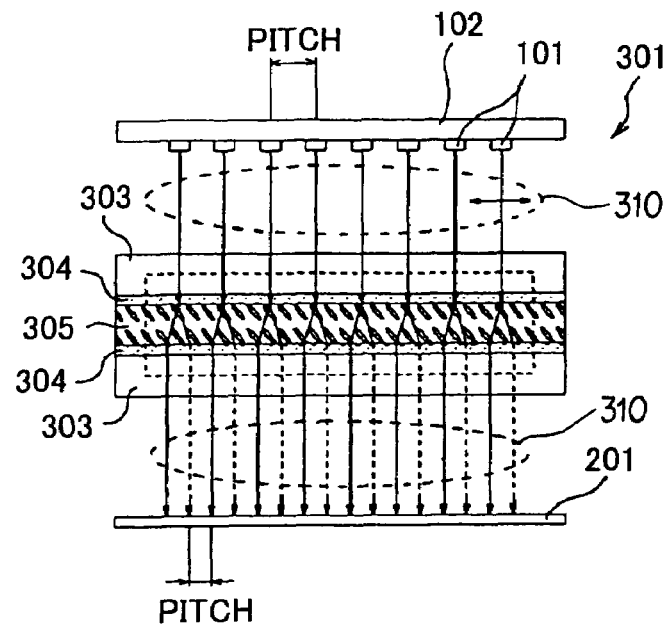
FIG. 2 is a side view in cross section showing a first embodiment of an optical write unit according to the present invention.
Figure 3:
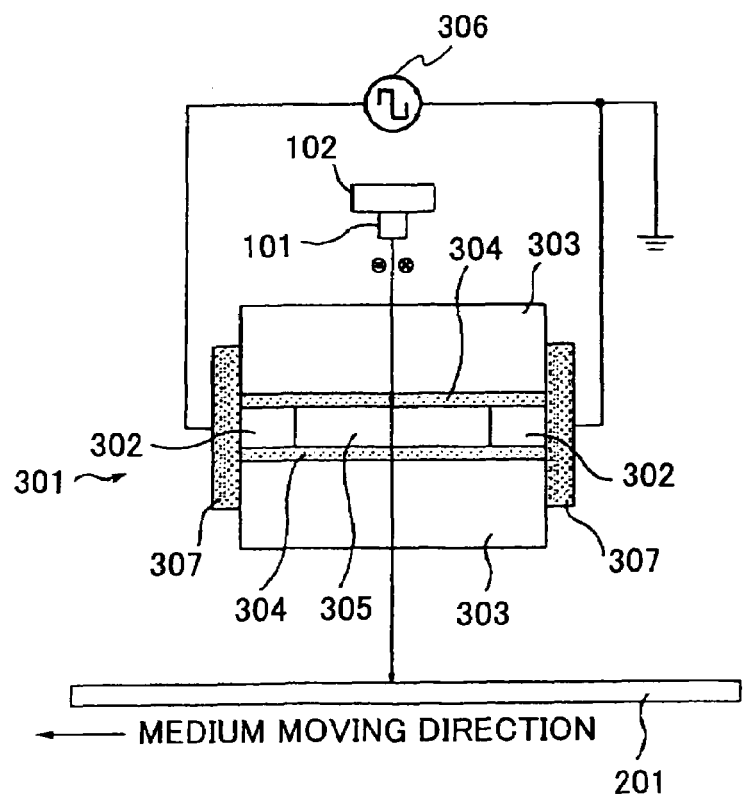
FIG. 3 is a front view in cross section showing the first embodiment of the optical write unit.

FIG. 2 is a side view in cross section showing the first embodiment of the optical write unit, and FIG. 3 is a front view in cross section showing the first embodiment of the optical write unit.

This first embodiment of the optical write unit includes a light emitting element array 102 having a plurality of light emitting elements (light emitting parts) 101 arranged at a predetermined pitch, a lens 310 (which can be positioned at either of the positions shown in FIG. 2) for converging light emitted from the light emitting elements 101 on a recording medium 201, and an optical path shifting element 301 capable of electrically shifting the light emitted from the light emitting elements 101 in an arrangement direction in which the light emitting elements 101 are arranged. The light emitting from the light emitting elements 101 is shifted by driving and controlling the optical path shifting element 301, thereby irradiating light, which has been interpolated between the pixels, with respect to the recording medium 201.

The optical path shifting element 301 is arranged in an optical path from the light emitting element array 102 towards the recording medium 201. The optical path shifting element 301 includes a pair of transparent substrates 303 which are separated by a separation distance (or gap) which is restricted by a spacer 302, via a pair of vertical alignment layers 304. Surfaces of the pair of substrates 303 (substrate surfaces) are approximately parallel to each other. A liquid crystal layer 305 made of a chiral smectic C phase ferroelectric liquid crystal, which makes a homeotropic alignment due to the vertical alignment layers 304, is sandwiched between the vertical alignment layers 304 provided on the pair of transparent substrates 303. The optical path shifting element 301 further includes an electric field generating means 306. This electric field generating means 306 applies a voltage across a pair of electrodes 307 which are arranged along on both ends of the liquid crystal layer 305, so as to generate an electric field within the liquid crystal layer 305 in a direction which is approximately perpendicular to a normal direction to the substrate surface and is approximately perpendicular to the arrangement direction of the light emitting elements 101. In other words, the electric field is generated in a direction approximately parallel to an in-plane direction of the substrate 303 and is approximately perpendicular to the arrangement direction of the light emitting elements 101.

In this embodiment of the optical write unit, the light emitting elements 101 which are arranged at the predetermined pitch in the light emitting element array 102 are driven in response to an image signal, thereby emitting light from the light emitting element array 102. The light emitting from each light emitting element 101 is converged on the recording medium 20 via the lens 310 and the optical path shifting element 301, to expose the pixels on the recording medium 201. Two-dimensional image information is exposed on the recording medium 201 by moving the recording medium 201 relative to the light emitting element array 102.

The optical path shifting element 301 shifts the optical path in the arrangement direction of the light emitting elements 101. When the predetermined pitch of the light emitting elements 101 is P µm, it is possible to carry out the exposure at two times the pixel density by interpolating between the pixels, by shifting the optical path P/2 µm by the optical path shifting element 301 at a high speed in the arrangement direction of the light emitting elements 101.

Next, a more detailed description will be given of each part of the optical write unit.

A light emitting diode (LED), a laser diode (semiconductor laser), a combination of a light source and a liquid crystal shutter, a combination of a light source and a micromirror, and the like may be used as the light emitting element 101. In order to expose the pixels on the recording medium 201 at a high definition, it is preferable that the area of the light emitting element 101 is small, and that the directivity of the light emitting from the light emitting element 101 is high. In addition, the wavelength of the light emitted from the light emitting element 101 may be designed by use of appropriate light emitting materials and filter characteristics, and the wavelength is appropriately set depending on the spectral sensitivity of the recording medium 201 which is exposed. The light emitting element array 102 is formed by arranging a plurality of such light emitting elements 101 in a one-dimensional or two-dimensional array.

A microlens array (not shown) may be provided adjacent to the light emitting element array 102, so as to change a luminance distribution of the light emitting spots by converging the light emitted from each light emitting element 101 and to control the shape of the exposed spots on the recording medium 201. A liquid crystal microlens array may be used for the microlens array, so as to change the size of the exposed spots on the recording medium 201 by a variable focal point function using electric field.

A spherical lens, an aspherical lens, a distributed index lens array and the like may be used for the lens 310 which converges the light emitted from the light emitting elements 101 onto the recording medium 201. It is preferable to use the distributed index lens array (self-focusing lens array) when minimizing the size of the optical system, because the distance between object image planes can be made small. Furthermore, a liquid crystal layer may be provided on a portion of such a lens to form a liquid crystal lens, so that the size of the exposed spots on the recording medium 201 can be changed by the variable focal point function using electric field.

Next, a description will be given of the optical path shifting element 301.

The pair of confronting transparent substrates 303 may be made of glass, quartz, plastic or the like. It is desirable to use a transparent material having no birefringence for the substrates 303. In addition, the thickness of the substrates 303 is preferably in a range of approximately several tens of μm to approximately several mm.

The thicknesses of the pair of substrates 303 may be mutually different so that one is thicker than the other. For example, the optical path shifting element 301 may be arranged adjacent to the light emitting element array 102, and the thickness of the substrate 303 closer to the light emitting element array 102 may be set in a range of approximately several tens of μm to approximately several hundred μm, while the thickness of the other substrate 303 may be set to approximately several mm for the purpose of securing rigidity. In this case, the distance from the light emitting elements 101 to the liquid crystal layer 305 may be set in a range of approximately several tens of μm to approximately several hundred μm. When the distance from the light emitting elements 101 to the liquid crystal layer 305 falls within this range, the spreading of the light emitted from the light emitting elements 101 is relatively small, and the area of the optical path transmitted through the liquid crystal layer 305 can be reduced, thereby making it possible to make the effective area of the optical path shifting element 301 small. Similar effects are obtainable when the optical path shifting element 301 is arranged adjacent to the recording medium 201 and the substrate 303 closer to the recording medium 201 is made thin.

The vertical alignment layer 304 formed on the substrate 303 may be made of a vertical alignment agent for liquid crystal display, silane coupling agent, $SiO_2$ evaporation layer, and the like. The material used for the vertical alignment layer 304 is not limited to a particular material, and any suitable material which causes liquid crystal molecules to make a vertical alignment (homeotropic alignment) with respect to the surface of the substrate 303 may be used for the vertical alignment layer 304. The vertical alignment (homeotropic alignment) not only includes a state where the liquid crystal molecules are aligned vertically with respect to the surface of the substrate 303, but also a state where the liquid crystal molecules are tilted up to several tens of degrees with respect to the surface of the substrate 303.

The spacer 302 is provided between the two substrates 303 to determine the separation between the two substrates 303, and the liquid crystal layer 305 is formed between the two substrates 303. The pair of electrodes 307 are provided on both ends of the liquid crystal layer 305, in a state sandwiching the liquid crystal layer 305 along a horizontal direction. The spacer 302 may be formed by a sheet member having a thickness in a range of approximately several μm to approximately several mm or, grains having a grain diameter in such a range. It is preferable to provide the spacer 302 outside an effective region of a light transmitting part of the optical path shifting element 301. Metals such as Al, Cu and Cr, transparent electrode materials such as ITO, and the like may be used for the pair of electrodes 307.

In FIG. 3, the pair of electrodes 307 are formed on the side surfaces of the substrates 303. However, the locations of the pair of electrodes 307 are not limited to those shown in FIG. 3 as long as it is possible to apply an electric field in the horizontal direction of the liquid crystal layer 305. In order to apply a uniform horizontal electric field within the liquid crystal layer 305, it is preferable to use as the pair of electrodes 307 metal layers having a width which is approximately equal to or greater than the thickness of the liquid crystal layer 305. In addition, in order to reduce the number of parts, the member forming the spacer 302 and the metal sheet members forming the pair of electrodes 307 may be formed by a common metal member, so that the thickness of the liquid crystal layer 305 is determined by the thickness of this common metal layer.

Liquid crystal capable of forming a smectic C phase in a temperature range in which the optical write unit is used for the liquid crystal layer 305. Hence, the electric field is applied in the horizontal direction of the liquid crystal layer 305, by applying a voltage across the pair of electrodes 307.

A more detailed description will be given of the liquid crystal layer 305 capable of forming the smectic C phase. In the liquid crystal layer 305 which is formed by the smectic crystal, the liquid crystal is arranged in layers (smectic layers) in a major axis direction of the liquid crystal molecules. The liquid crystal in which the major axis direction of the liquid crystal molecules matches the normal direction to the layers (layer normal direction) is referred to as the smectic A-phase, while the liquid crystal in which the major axis direction of the liquid crystal molecules do not match the layer normal direction is referred to as the smectic C phase.

The ferroelectric liquid crystal having the smectic C phase generally has a so-called spiral structure in which the direction of the liquid crystal directors rotates spirally for every smectic layer in a state where no external electric field acts, and is referred to as the chiral smectic C phase. In addition, in the antiferroelectric liquid crystal having the chiral smectic C phase, the liquid crystal directors face mutually opposite directions for every smectic layer. The liquid crystals having the chiral smectic C phase include asymmetric carbon in the molecular structure, and thus have spontaneous polarization. The optical characteristic is controlled by rearranging the liquid crystal molecules in a direction determined by the spontaneous polarization Ps and the external electric field E. In this embodiment, it is assumed for the sake of convenience that the liquid crystal layer 305 of the optical path shifting element 301 is made of the ferroelectric liquid crystal, but it is of course possible to similarly use the antiferroelectric liquid crystal for the liquid crystal layer 305.

The chiral smectic C phase liquid crystal has an extremely high-speed response characteristic compared to the smectic A-phase or nematic liquid crystals, and can carry out a switching in the sub ms range. Particularly because the direction of the liquid crystal directors is uniquely determined with respect to the direction of the electric field in the case of the chiral smectic C phase liquid crystal, the direction of the liquid crystal directors can be controlled with more ease compared to the smectic A-phase liquid crystal.

The liquid crystal layer 305 made of the smectic C phase liquid crystal having the homeotropic alignment is less likely to receive restricting forces from the substrates 303 with respect to the operation of the liquid crystal directors compared to a case where the alignment is homogeneous (that is, a state where the liquid crystal directors are aligned parallel to the surface of the substrate 303), and only requires a small electric field. In the case where the liquid crystal directors have the homogeneous alignment, the liquid crystal directors are strongly dependent upon not only the direction of the electric field but also the surface of he substrate 303, thereby requiring more accurate positioning of the optical path shifting element 301. But when the liquid crystal directors have the homeotropic alignment as in the case of this embodiment, a positioning margin of the optical path shifting element 301 with respect to the light deflection is increased. By utilizing these characteristics of the smectic C phase liquid crystal having the homeotropic alignment, it becomes unnecessary to align the spiral axis perfectly perpendicular to the surface of the substrate 303. In other words, the spiral axis may be slightly tilted with respect to the normal to the surface of the substrate 303, as long as the liquid crystal directors can face two directions without receiving the restricting forces from the substrates 303.

Next, a description will be given of the operation of this embodiment of the optical write unit, based on the operating principle of the optical path shifting element 301.

Figure 6:
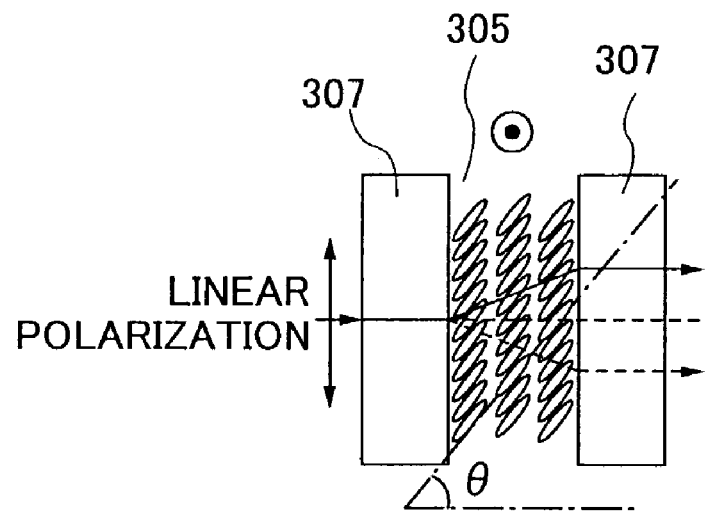
FIG. 6 is a diagram showing a state of alignment of the liquid crystal molecules in the liquid crystal layer.

FIGS. 4A and 4B are diagrams for explaining the direction of the electric field generated in the liquid crystal layer 305 of the optical path shifting element 301, and the tilt direction of the liquid crystal molecules. FIGS. 5A and 5B are diagrams for explaining the direction of the electric field generated in the liquid crystal layer 305 of the optical path shifting element 301, and the tilt direction of the liquid crystal molecules, for a case where the direction of the electric field is reversed. FIG. 6 is a diagram showing a state of alignment of the liquid crystal molecules in the liquid crystal layer 305. Further, FIG. 7 is a diagram showing a state of alignment of the liquid crystal molecules in the liquid crystal layer 305 for the case where the direction of the electric field is reversed.

In FIGS. 4A, 4B, 5A and 5B, the length of the optical path shifting element 301 is illustrated as being short compared to the width of the optical path shifting element 301 between the pair of electrodes 307, for the sake of convenience. However, the width and length of the optical path shifting element 301 may be set so that the structure is long and narrow with respect to the effective area of the light emitting element array 102.

FIGS. 4A and 5A respectively show the optical path shifting element 301 viewed from the side of the light emission surface thereof. FIG. 4A shows a state where the liquid crystal directors are tilted such that the side of the liquid crystal molecule illustrated with the wider width is tilted in a direction out of the paper. FIG. 5A shows a state where the liquid crystal directors are tilted such that the side of the liquid crystal molecule illustrated with the narrower width is tilted in a direction into the paper. The direction of the spontaneous polarization Ps of the liquid crystal is indicated by an arrow in FIGS. 4A and 5A. As shown in FIG. 4A, the direction of the tilt angle of the liquid crystal molecules having the approximately vertical alignment is reversed when the direction of the electric field reverses. FIGS. 4A and 5A show the relationship of the direction of the applied electric field and the tilt direction of the liquid crystal molecules, for the liquid crystal having the spontaneous polarization Ps which is positive. When the direction of the tilt angle reverses, it may be regarded that the liquid crystal molecules within the smectic layer undergo a rotary movement within a virtual cone shape as shown in FIGS. 4B and 5B.

Figure 7:
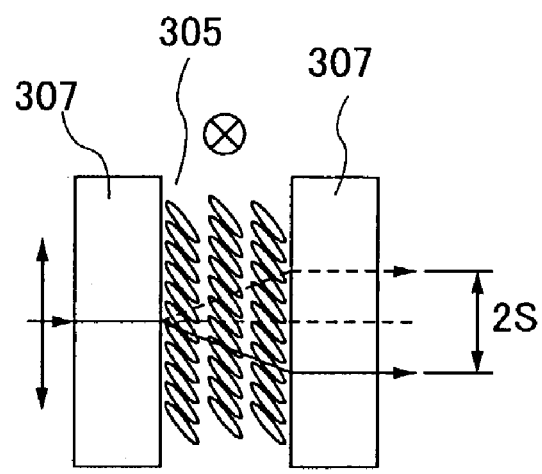
FIG. 7 is a diagram showing a state of alignment of the liquid crystal molecules in the liquid crystal layer for the case where the direction of the electric field is reversed.

In FIGS. 6 and 7, the illustration of the vertical alignment layer 304, the spacer 302 and the pair of electrodes 307 is omitted. Further, for the sake of convenience, FIGS. 6 and 7 show a case where the voltage is applied in a direction perpendicular to (that is, in a direction into or out of) the paper, and the electric field acts in this direction perpendicular to the paper. The direction of the electric field is switched by a voltage applying means (not shown) depending on a target light deflecting direction, so that the optical path shifting element 301 is switched between a state shown in FIG. 6 and a state shown in FIG. 7.

As shown in FIG. 6, when the electric field is applied in the direction out of the paper, the number of liquid crystal molecules with the liquid crystal directors tilted towards the top right in FIG. 6 increases if the spontaneous polarization of the liquid crystal molecules is positive, and in this case, an average optical axis of the liquid crystal layer 305 also tilts towards the top right in FIG. 6, so that the liquid crystal layer 305 functions as a birefringence plate. At electric fields greater than or equal to a threshold value where the spiral structure of the chiral smectic C phase dissolves, all liquid crystal directors have a tilt angle θ, and the liquid crystal layer 305 functions as a birefringence plate having an optical axis which is tilted by an angle θ in the upward direction. The linearly polarized light which is incident to the liquid crystal layer 305 from the left in FIG. 6 as extraordinary light makes a parallel shift in the upward direction. When the refractive index in the major axis direction of the liquid crystal molecules is denoted by ne, the refractive index in a minor axis direction of the liquid crystal molecules is denoted by no, and a thickness (gap) of the liquid crystal layer 305 is denoted by d, an amount of shift, S, can be described by the following formula (1), as described in "Crystal Optics", Applied Physics Society, Optics Social Meeting Edition, page 198.

$$S=[(1/no)^2-(1/ne)^2]\sin(2\theta)\cdot d/[2\{(1/ne)^2\sin^2\theta+(1/no)^2\cos^2\theta\}] \quad (1)$$

Similarly, when the voltage applied to the pair of electrodes 307 is reversed and the electric field is applied in the direction into the paper in FIG. 7, the liquid crystal directors tilt towards the bottom right in FIG. 7, and the liquid crystal layer 305 functions as a birefringence plate having an optical axis which is tilted downwards by an angle θ. The linearly polarized light which is incident to the liquid crystal layer 305 from the left in FIG. 7 as extraordinary light makes a parallel shift in the downward direction. Accordingly, an amount of shift of the optical path, amounting to 2S, is obtained by the reversal of the direction of the electrical field.

Therefore, by switching the polarity of the electric field applied to the liquid crystal layer 305 via the pair of electrodes 307, the liquid crystal layer 305 exhibits an optical path shifting function. Hence, it is possible to irradiate on the recording medium 201 the light which has been interpolated between the pixels, so that a high-resolution image exposure is possible even by use of the light emitting element array 102 having a low resolution.

As may be seen from FIGS. 6 and 7, the optical path of the light emitted from the light emitting element array 102 is shifted symmetrically. For this reason, there is an advantage in that the optical path length does not vary when the optical path is shifted by the optical path shifting element 301.

Moreover, even at the electric fields less than the threshold value at which the spiral structure of the chiral smectic C phase dissolves in the liquid crystal layer 305, the average direction of the liquid crystal directors may be regarded as the optical axis of the liquid crystal layer 305, similarly to the case where the electric field is greater than or equal to the threshold value at which the spiral structure of the chiral smectic C phase dissolves. Even in the region where the electric field is less than the threshold value at which the spiral structure of the chiral smectic C phase dissolves, the amount of shift of the optical path can be controlled, because the tilt direction of the optical axis with respect to the electric field intensity changes.

Furthermore, the amount of shift 2S of the optical path when the electric field is reversed, depends upon the optical characteristic of the liquid crystal material used for the liquid crystal layer 305 and the thickness of the liquid crystal layer 305. For example, when the thickness of the liquid crystal layer 305 is in a range of approximately several tens of μm to approximately several hundred μm, it is possible to obtain an amount of shift of the optical path in a range of approximately several μm to approximately several tens of μm. Hence, the optical path shifting element 301 of this embodiment is suited for structures corresponding to several hundred dpi to several thousand dpi.

Figure 1:
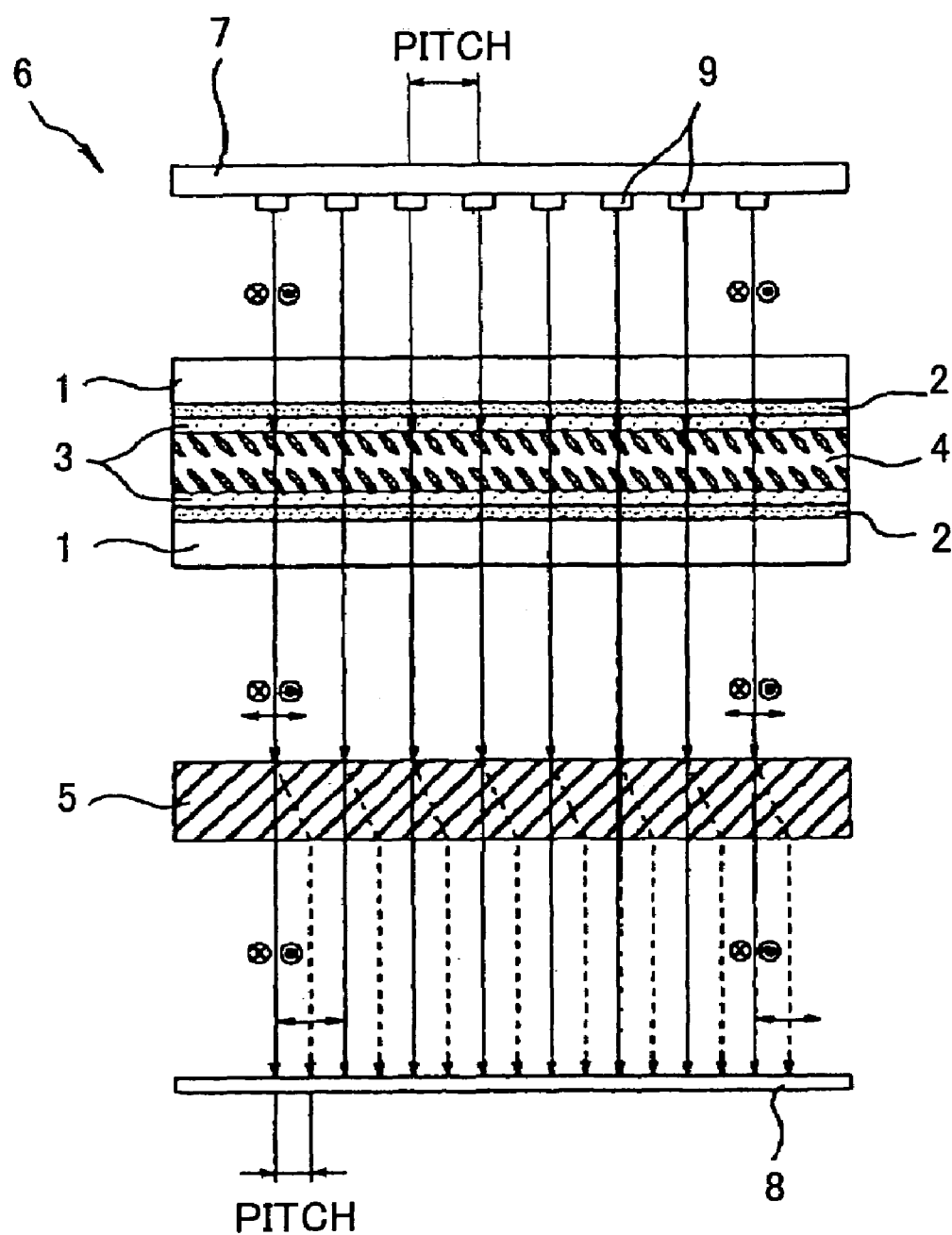
FIG. 1 is a cross sectional view showing an example of a conventional optical write unit.

In this embodiment, it is unnecessary to provide transparent electrodes within the optical path as required in the conventional optical write unit shown in FIG. 1, and consequently, there is no deterioration in the transmittance which would otherwise be introduced by the provision of the transparent electrodes.

In addition, a switching time required to switch the optical axis of the optical path shifting element 301 changes depending on the spontaneous polarization, the tilt angle, the spiral pitch and the viscoelasticity of the liquid crystal material used for the liquid crystal layer 305, the electric field intensity, the temperature and the like. But in any case, it is possible to obtain a high-speed response from the optical path shifting element 301 on the order of approximately several hundred μsec at an electric field intensity of approximately several hundred V/mm, and approximately several tens of μsec at an electric field intensity of approximately several thousand V/mm (several V/μm).

Figure 8:
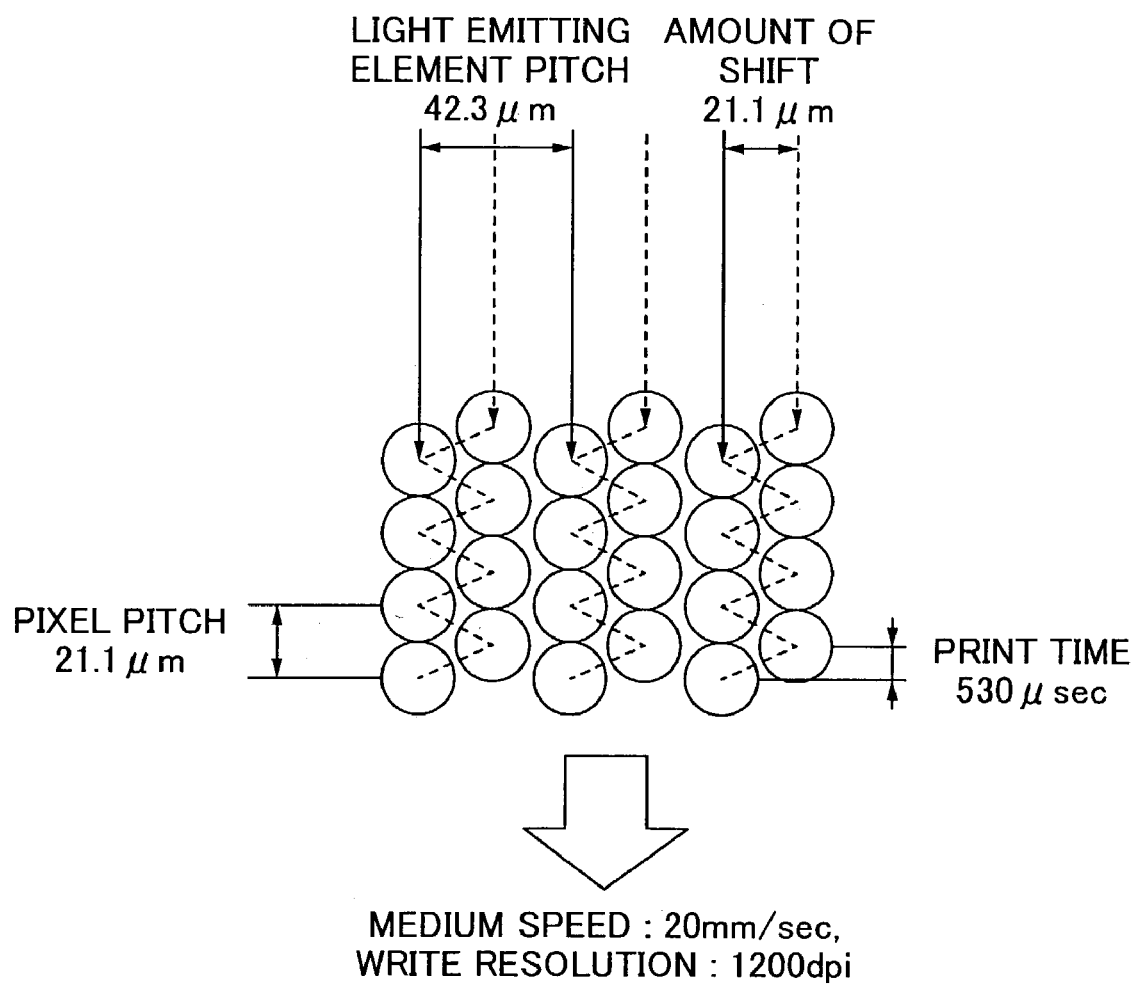
FIG. 8 is a diagram showing a relationship between a pitch of light emitting elements, an amount of shift of an optical path by the optical path shifting element, a pixel pitch and a resolution.

FIG. 8 is a diagram showing a relationship between the pitch of the light emitting elements 101, the amount of shift of the optical path by the optical path shifting element 301, the pixel pitch and the resolution.

A description will be given of the relationship between the pitch of the light emitting elements 101, the amount of shift of the optical path by the optical path shifting element 301, the pixel pitch and the resolution, for a particular case.

For example, when a one-dimensional light emitting element array 102 having 600 dpi (light emitting elements 101 arranged at a pitch of 42.3 μm) is used to write an image with a resolution of 1200 dpi (pixel pitch of 21.1 μm) at a recording medium moving velocity of 20 mm/sec as shown in FIG. 8, the amount of shift of the optical path required us 21.1 μm and the optical path shifting element 301 described above can be used to make this shift. The write time for one line is approximately 1060 μsec. Since the printing needs to be carried out at two shifted positions during this write time, a print time required at one shifted position is one-half the above write time, which is approximately 530 μsec. Hence, a sufficiently long print time can be secured for the required exposure, even when the time required to switch the optical path (optical path switching time) is on the order of several hundred μsec. When the recording medium 201 moves at a constant velocity, the recording medium 201 has slightly moved when the exposure takes place at the shifted position. Consequently, an exposure locus made by one light emitting element 101 becomes a zigzag shape as shown in FIG. 8. The image data to be written may be processed according to the pixel positions having the alternating arrangement. Alternatively, the recording medium 201 may be moved in steps by use of a stepping motor or the like, so that the recording medium 201 is not moved during the optical path switching time, and the pixels during the optical path switching time are exposed on the same line on the recording medium 201.

Next, a description will be given of a second embodiment of the optical write unit according to the present invention, by referring to FIGS. 9A and 9B. FIG. 9A is a side view in cross section showing a second embodiment of the optical write unit according to the present invention, and FIG. 9B is a front view in cross section showing the second embodiment of the optical write unit. In FIGS. 9A and 9B, those parts which are the same as those corresponding parts of the first embodiment of the optical write unit shown in FIGS. 2 through 7 are designated by the same reference numerals, and a description thereof will be omitted.

In this second embodiment of the optical write unit, a plurality of optical path shifting element 301 is provided. More particularly, two optical path shifting elements 301 are provided in this embodiment. The two optical path shifting elements 301 are arranged in series with respect to the optical path, so that the light propagating directions in the two optical path shifting elements 301 are approximately parallel. In addition, power supplies 308a and 308b capable of independently applying a voltage to each of the optical path shifting element 301 are provided. In this embodiment, a first power supply 308a is provided to apply a voltage to one optical path shifting element 301, and a second power supply 308b is provided to apply a voltage to the other optical path shifting element 301. In other words, the electric field generating means 306 independently drives the two optical path shifting elements 301 by the first and second power supplies 308a and 308b.

The amount of shift of the optical path in the optical path shifting element 301 located closer to the light emitting element array 102 is set to P/2 with respect to the pitch P of the light emitting elements 102 of the light emitting element array 102. On the other hand, the amount of shift of the optical path in the optical path shifting element 301 located closer to the recording medium 201 is set to P/4 with respect to the pitch P of the light emitting elements 102 of the light emitting element array 102.

By appropriately controlling the operations of the first and second power supplies 308a and 308b, it is possible to carry out the optical write operation at four times (=2 times×2 times) the pixel density. Accordingly, it is possible to increase the pixel density to two or more times. Moreover, the pixel density can be increased by simply arranging the optical path shifting element 301 in a plurality of stages, because the plane of linear polarization of the optical path shifting element 301 is constant.

Of course, the number of optical path shifting element 301 and the amount of shift of the optical path in each of the optical path shifting element 301 are not limited to those described above.

Figure 10:
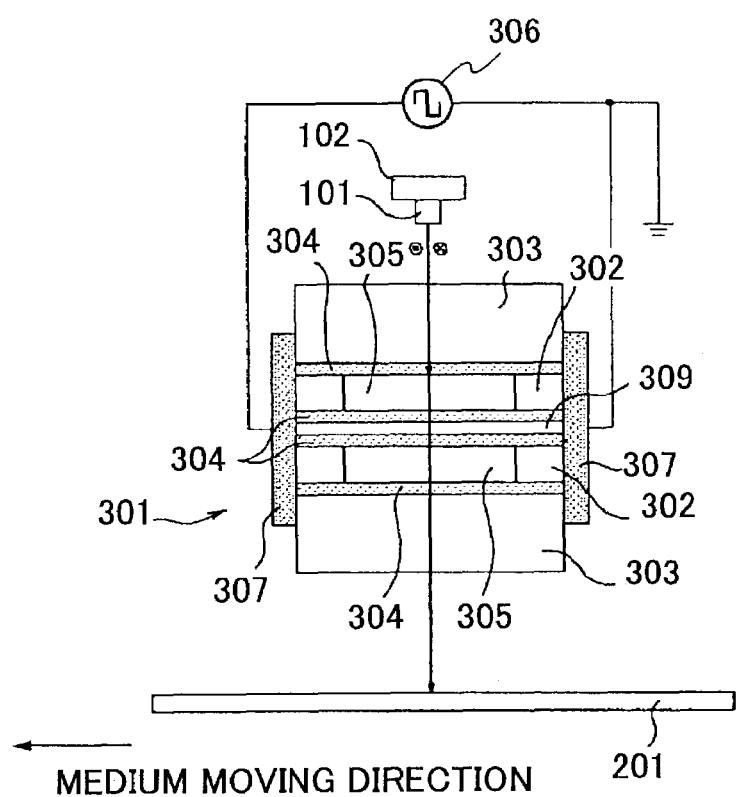
FIG. 10 is a front view in cross section showing a third embodiment of the optical write unit according to the present invention.

Next, a description will be given of a third embodiment of the optical write unit according to the present invention, by referring to FIG. 10. FIG. 10 is a front view in cross section showing the third embodiment of the optical write unit. In FIG. 10, those parts which are the same as those corresponding parts of the first embodiment of the optical write unit shown in FIGS. 2 through 7 are designated by the same reference numerals, and a description thereof will be omitted.

When using an inexpensive light emitting element array 102 having the light emitting elements 101 which are arranged at a relatively large pitch, it is necessary to set the amount of shift of the optical path to a large value. But when the thickness of the liquid crystal layer 305 is set large in order to obtain a large amount of shift of the optical path, there is a possibility of generating alignment defects which do not have the vertical alignment state within the liquid crystal layer 305. The alignment defects are more easily generated as the thickness of the liquid crystal layer 305 becomes larger. When the alignment defects occur, the liquid crystal layer 305 becomes cloudy and whitish, thereby causing light scattering and decrease in transmittance.

Accordingly, in order to prevent the generation of such alignment defects in this third embodiment of the optical write unit, the liquid crystal layer 305 of a single optical path shifting element 301 is divided into divided layer portions by an intermediate layer 309 in a direction in which the thickness of the liquid crystal layer 305, and a vertical alignment layer 304 similar to the vertical alignment layer 304 formed on the substrate 303 is formed on at least one of the two surfaces of the intermediate layer 309, as shown in FIG. 10. The pair of electrodes 307 is arranged so that a uniform electric field is applied inside each of the divided layer portions of the liquid crystal layer 305. In the case shown in FIG. 10, the pair of electrodes 307 is arranged so as to sandwich the entire liquid crystal layer 301 formed by the divided layer portions, and the vertical alignment layer 304 is formed on both the two surfaces of the intermediate layer 309. Of course, the spacers 302 for the divided layer portions of the liquid crystal layer 305 may be formed by metal electrodes which are used in common as the pair of electrodes 307.

The intermediate layer 309 may be formed by a transparent film shaped or plate shaped material having a small refractive index anisotropy. Preferably, the material used for the intermediate layer 309 can withstand the temperature and solvent used during the process of forming the vertical alignment layer 304, and it is particularly preferable to use a glass plate having a thickness of approximately several tens of μm to several hundred μm as the intermediate layer 309.

The intermediate layer 309 generates an alignment restricting force at a central portion of the liquid crystal layer 305 where the alignment restricting force on the smectic layers weakens. For this reason, it is possible to increase the amount of shift of the optical path in the optical path shifting element 301, without having to make the divided layer portions of the liquid crystal layer 305 thick. As a result, each divided layer portion of the liquid crystal layer 305 can be made relatively thin so as to prevent the generation of the alignment defect, while at the same time, the entire liquid crystal layer 305 formed by the divided layer portions can be made relatively thick so as to increase the amount of shift of the optical path in the optical path shifting element 301.

Figure 11:
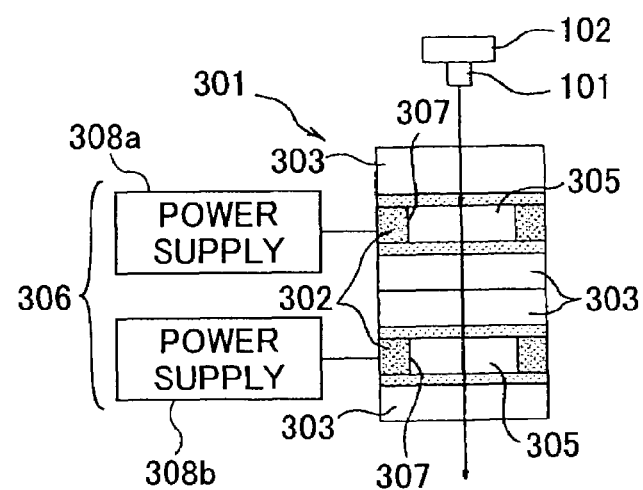
FIG. 11 is a front view in cross section showing a fourth embodiment of the optical write unit according to the present invention.
Figure 12:
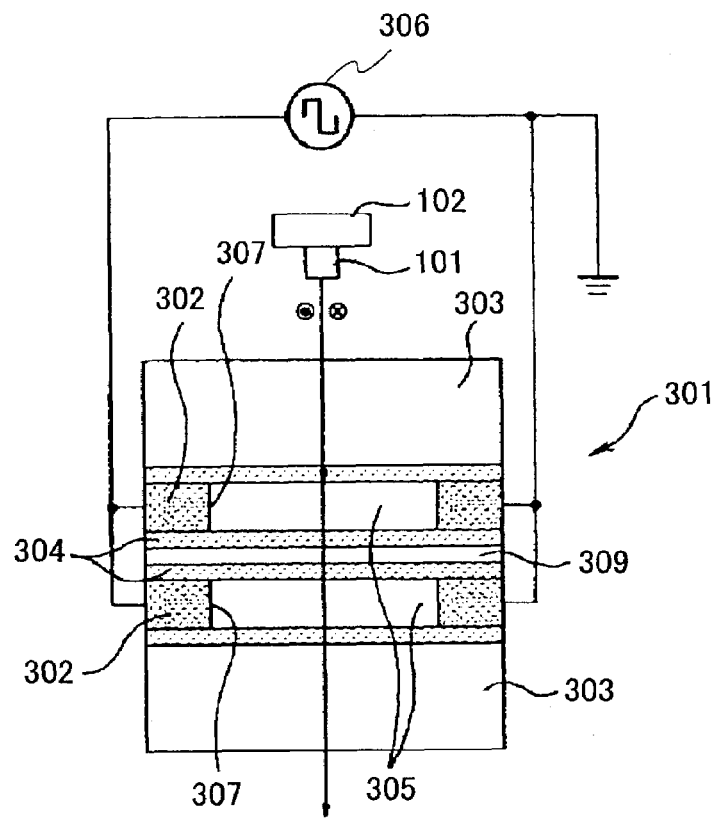
FIG. 12 is a front view in cross section showing a modification of the fourth embodiment of the optical write unit.

Next, a description will be given of a fourth embodiment of the optical write unit according to the present invention, by referring to FIGS. 11 and 12. FIG. 11 is a front view in cross section showing the fourth embodiment of the optical write unit, and FIG. 12 is a front view in a cross section showing a modification of the fourth embodiment of the optical write unit.

The fourth embodiment is based on the second embodiment shown in FIGS. 9A and 9B. Hence, in FIG. 11, those parts which are the same as those corresponding parts in FIGS. 9A and 9B are designated by the same reference numerals, and a description thereof will be omitted.

The modification of the fourth embodiment is based on the third embodiment shown in FIG. 10. Hence, in FIG. 12, those parts which are the same as those corresponding parts shown in FIG. 10 are designated by the same reference numerals, and a description thereof will be omitted.

In the first through third embodiments of the optical write unit described above, the thickness of the liquid crystal layer 305 is restricted by the spacer 302, and the pair of electrodes 307 are provided on the side surfaces of the optical path shifting element 301. According to such a structure, the liquid crystal layer 305 and the spacer 302 are sandwiched between the pair of electrodes 307. Hence, when generating an electric field inside the liquid crystal layer 305, it is necessary to apply a surplus voltage corresponding to the width of the spacer 302.

Accordingly, in this fourth embodiment of the optical write unit and the modification thereof, the pair of electrodes 307 have a sheet shape and are provided on the inner side of the spacer 302, so that each electrode 307 is provided between the liquid crystal layer 305 and the spacer 302 as shown in FIGS. 11 and 12. Consequently, the distance between the pair of electrodes 307 in a direction parallel to the substrate surface becomes equal to the width of the corresponding liquid crystal layer 305.

Although the sheet-shaped electrode 307 is provided on the inner side of the spacer 302 in FIGS. 11 and 12, it is of course possible to deposit the electrode 307 on the inner side of the spacer 302 by sputtering a metal material. Alternatively, a metal layer may be adhered on a surface of a spacer material, and the spacer material may be sliced so that the metal layer appears on the inner side of the spacer 302. Furthermore, the spacer 302 itself may be made of a metal material, so that the metal spacer 302 can be used in common as a spacer and an electrode.

According to the structures shown in FIGS. 11 and 12, it is possible to efficiently generate a horizontal electric field inside the liquid crystal layer 305. As a result, it is possible to reduce the voltage which needs to be applied with respect to the liquid crystal layer 305.

In addition, when the spacer 302 is used in common as the electrode 307, it is possible to reduce the number of required parts, and positively make the thickness of the liquid crystal layer 305 uniform.

Figure 13:
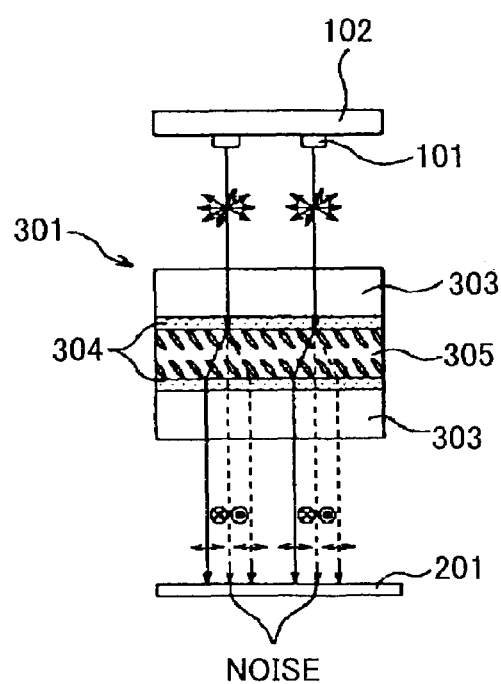
FIG. 13 is a side view in cross section showing the first embodiment of the optical write unit for explaining a phenomenon generated therein.
Figure 14:
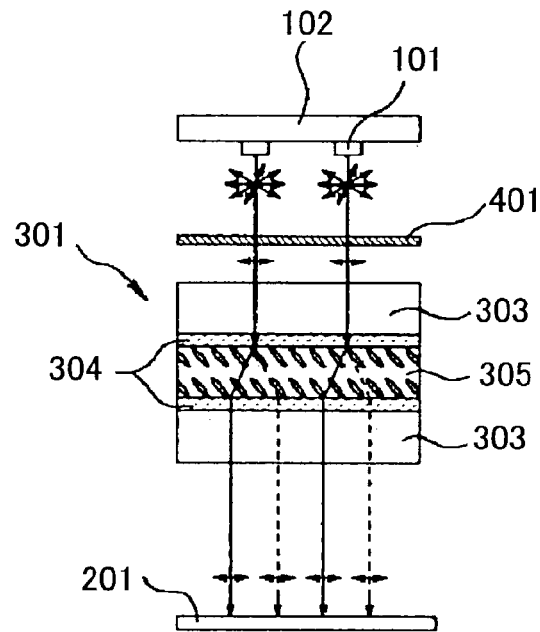
FIG. 14 is a side view in cross section showing a fifth embodiment of the optical write unit according to the present invention.
Figure 15:
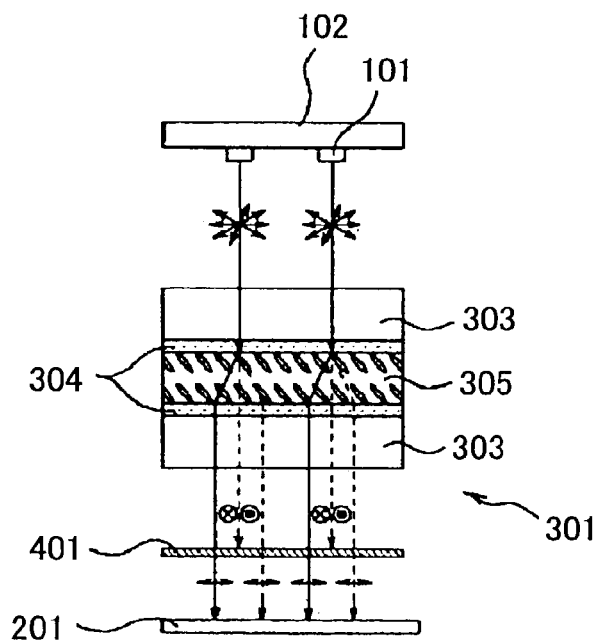
FIG. 15 is a side view in cross section showing a modification of the fifth embodiment of the optical write unit.

Next, a description will be given of a fifth embodiment of the optical write unit according to the present invention, by referring to FIGS. 13 through 15. FIG. 13 is a side view in cross section showing the first embodiment of the optical write unit for explaining a phenomenon generated therein. FIG. 14 is a side view in cross section showing the fifth embodiment of the optical write unit. In addition, FIG. 15 is a side view in cross section showing a modification of the fifth embodiment of the optical write unit. In FIGS. 13 through 15, those parts which are the same as those corresponding parts of the first embodiment of the optical write unit shown in FIGS. 2 through 7 are designated by the same reference numerals, and a description thereof will be omitted.

In the first through fourth embodiments of the optical write unit described above, it is assumed that the light emitted from the light emitting element array 102 is linearly polarized light which is parallel to the optical path shifting direction. However, in actual practice, the light emitted from the light emitting element array 102 may not be the desired linearly polarized light. Hence, although the linearly polarized light component parallel to the optical path shifting direction, that is, parallel to the tilted direction of the liquid crystal directors, is shifted as described above, the other light components are not shifted, to thereby generate a noise light component as shown in FIG. 13. The noise light component deteriorates the resolution and the contrast.

Hence, in this fifth embodiment and the modification thereof, a linearly polarizing plate 401 which transmits only the light components in the plane of polarization parallel to the optical path shifting direction is provided, so that only the light which is subjected to the desired shift is exposed on the recording medium 201. The linearly polarizing plate 401 may be provided on the input side of the optical path shifting element 301 as shown in FIG. 14 or, provided on the output side of the optical path shifting element 301 as shown in FIG. 15.

The provision of the linearly polarizing plate 401 positively ensures that the light exposed on the recording medium 201 is only the linearly polarized light parallel to the optical path shifting direction. Therefore, it is possible to prevent unwanted light components from exposing the recording medium 201, to thereby enable the optical write operation to be carried out with a high resolution and a high contrast.

Figure 16:
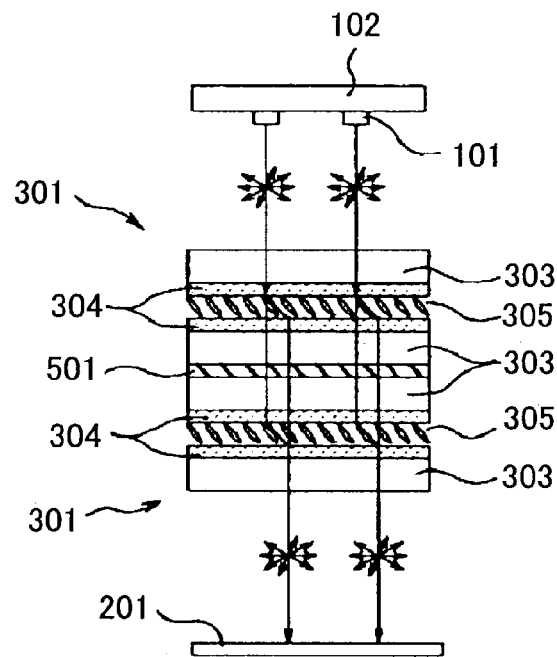
FIG. 16 is a side view in cross section showing a sixth embodiment of the optical write unit according to the present invention.
Figure 17:
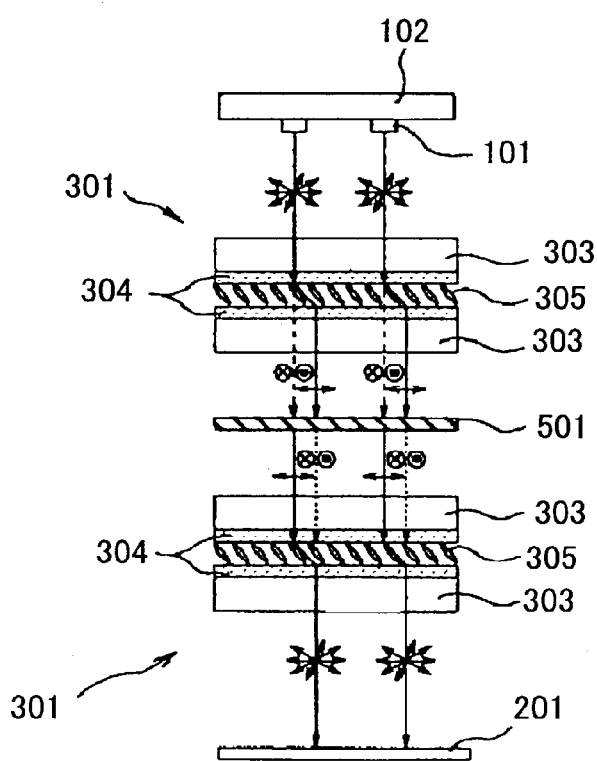
FIG. 17 is a diagram for explaining the operation of the sixth embodiment of the optical write unit.

Next, a description will be given of a sixth embodiment of the optical write unit according to the present invention, by referring to FIGS. 16 and 17. FIG. 16 is a side view in cross section showing the sixth embodiment of the optical write unit, and FIG. 17 is a diagram for explaining the operation of the sixth embodiment of the optical write unit. In FIGS. 16 and 17, those parts which are the same as those corresponding parts of the first embodiment of the optical write unit shown in FIGS. 2 through 7 are designated by the same reference numerals, and a description thereof will be omitted.

In the first through fifth embodiments of the optical write unit described above, only the linearly polarized light component in the optical path shifting direction is exposed on the recording medium 201. Hence, other than a case where the light emitting element 101 itself emits linearly polarized light, the surplus polarized light components are reflected or transmitted so as not to be used for the exposure. For this reason, the light utilization efficiency of the light emitted from the light emitting element 101 and exposed on the recording medium 201 deteriorates by an amount corresponding to the surplus polarized light components which are not used for the exposure.

Hence, in this sixth embodiment of the optical write unit, two optical path shifting elements 301 having liquid crystal layers 305 with approximately the same thicknesses are arranged in series in the optical path facing a direction such that the optical path shifting directions of the two optical path shifting elements 301 are approximately parallel to each other. In addition, a polarization plane rotating element 501 which rotates the plane of linear polarization by approximately 90 degrees, is arranged between the two optical path shifting elements 301. FIGS. 16 and 17 show a state where the liquid crystal molecules are tilted in one direction by an electric field which is applied in one direction.

As shown in FIG. 16, when the non-polarized light from the light emitting element 101 is transmitted through the first optical path shifting element 301, the polarized light component parallel to the optical path shifting direction is shifted to the right in FIG. 16 in correspondence with the thickness d of the liquid crystal layer 305 of this first optical path shifting element 301. The polarized light component perpendicular to the paper in FIG. 16 is not deflected and propagates in a straight line. When these light components output from the first optical path shifting element 301 is transmitted through the polarization plane rotating element 501, each plane of polarization is rotated by approximately 90 degrees. Hence, in the second optical path shifting element 301, the shifted polarized light component from the first optical path shifting element 301 propagates in a straight line, and the polarized light component propagated in the straight line through the first optical path shifting element 301 is shifted to the right in FIG. 16 in correspondence with the thickness d of the liquid crystal layer 305 of the second optical path shifting element 301. FIG. 17 shows the shifted state of the polarized light components in relation to the direction of the electric field generated within each of the liquid crystal layers 305 of the first and second optical path shifting element 301.

When the liquid crystal material and thickness of the two liquid crystal layers 305 and the electric fields applied to the two liquid crystal layers 305 are respectively the same, the amount of shift of the polarized light component generated in the two liquid crystal layers 305 becomes the same. Hence, it is possible to utilize all of the polarized light components of the light emitted from the light emitting element 101, and the light utilization efficiency is approximately doubled compared to the case where only the linearly polarized light component in one direction is used.

The polarization plane rotating element 501 may be formed by a halfwave plate, a twist nematic liquid crystal cell, a twist nematic liquid crystal film or the like.

Figure 18:
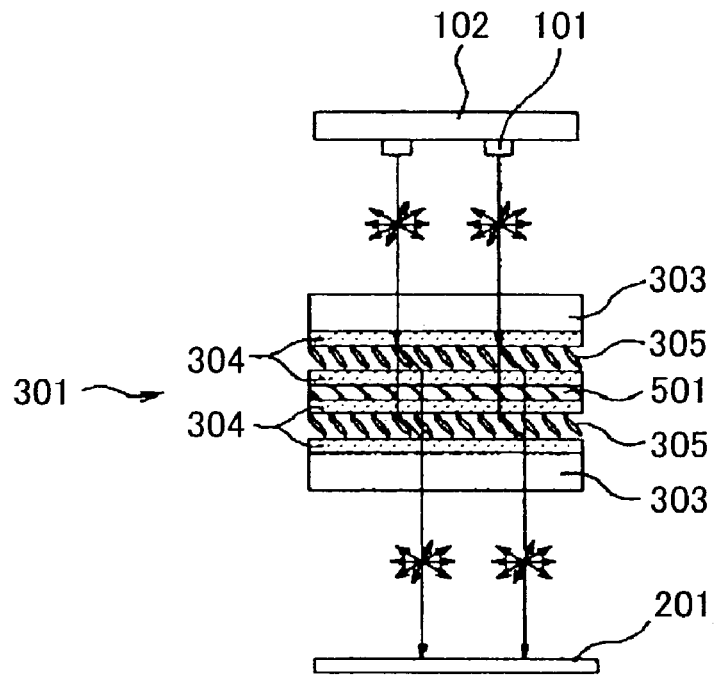
FIG. 18 is a side view in cross section showing a seventh embodiment of the optical write unit according to the present invention.

Next, a description will be given of a seventh embodiment of the optical write unit according to the present invention, by referring to FIG. 18. FIG. 18 is a side view in cross section showing the seventh embodiment of the optical write unit. In FIG. 18, those parts which are the same as those corresponding parts of the third embodiment of the optical write unit shown in FIG. 10 are designated by the same reference numerals, and a description thereof will be omitted.

In this seventh embodiment of the optical write unit, a member corresponding to the intermediate layer 309 described above is formed by a polarization plane rotating element 501 which rotates the plane of linear polarization by approximately 90 degrees. The thicknesses of the two liquid crystal layers 305 respectively arranged on the upstream side and the downstream side of the optical path with respect to the polarization plane rotating element 501 are set approximately the same.

Thus, the polarization plane rotating element 501 also functions as the intermediate layer 309, so that the number of layers or elements forming the optical path shifting element 301 is reduced. In addition, the transmittance of the optical path shifting element 301 as a whole is improved, because it is possible to reduce undesirable effects of reflections at the interfaces of the layers.

Furthermore, the alignment of the liquid crystal layer 305 is improved, and all of the polarized light components input to the optical path shifting element 301 can be shifted, thereby improving the light utilization efficiency.

The polarization plane rotating element 501 may be formed by a halfwave plate, a twist nematic liquid crystal cell, a twist nematic liquid crystal film or the like.

Of course, it is possible to further provide an intermediate layer 309 in each of the two liquid crystal layers 305 respectively on the upstream side and the downstream side of the optical path. In this case, the thicknesses of the divided layer portions of each of the two liquid crystal layers 305, divided by the corresponding intermediate layer 309, may be set so that the total thickness is approximately the same for the two liquid crystal layers 305.

Figure 19:
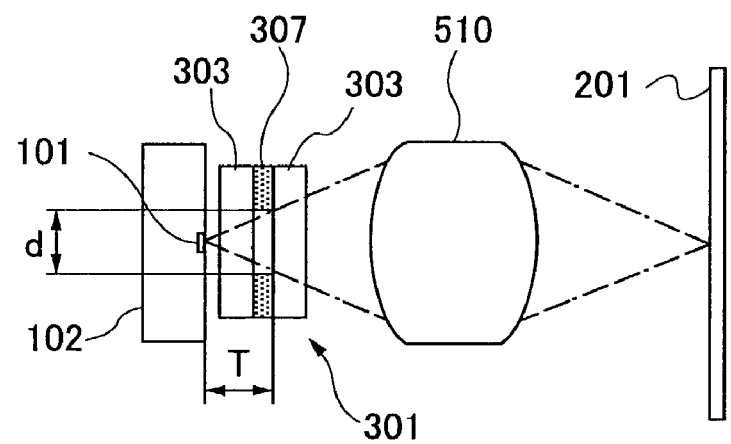
FIG. 19 is a front view in cross section showing an arrangement of the optical path shifting element of the optical write unit.
Figure 20:
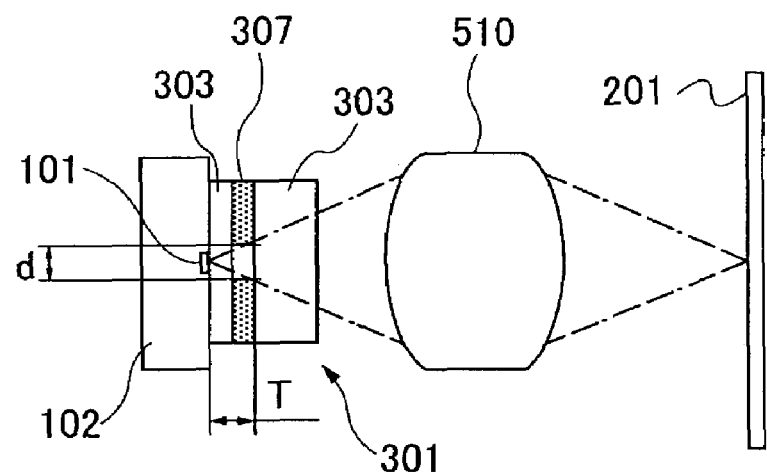
FIG. 20 is a front view in cross section showing an arrangement of the optical path shifting element of an eighth embodiment of the optical write unit according to the present invention.

Next, a description will be given of an eighth embodiment of the optical write unit according to the present invention, by referring to FIGS. 19 and 20. FIG. 19 is a front view in cross section showing an arrangement of the optical path shifting element of the optical write unit, and FIG. 20 is a front view in cross section showing an arrangement of the optical path shifting element of the eighth embodiment of the optical write unit. In FIGS. 19 and 20, those parts which are the same as those corresponding parts of the first through seventh embodiments of the optical write unit shown in FIGS. 2 through 18 are designated by the same reference numerals, and a description thereof will be omitted.

The light emitted from the light emitting element 101 is transmitted through the optical path shifting element 301 and is converged on the recording medium 201 via a lens 510. The light emitting elements 101 of the light emitting element array 102 is arranged in an array in a direction perpendicular to the paper in FIG. 19. The two substrates 303 of the optical path shifting element 301 have approximately the same thicknesses, and the metal electrodes 207 are used in common as the spacers. In actual practice, the angle of the light transmitted through the optical path shifting element 301 changes at the interface of the layers depending on the difference in the refractive indexes of the layers, but for the sake of convenience and in order to simplify the illustration, the change in the angle of the light in each layer due to the different refractive indexes is not shown in FIG. 19, and similar representations will be employed for the subsequent drawings.

If a distance from the light emitting element 101 to the liquid crystal layer 305 is denoted by T, the area of the optical path passing through the liquid crystal layer 305 becomes larger as the distance T becomes larger. Accordingly, when arranging the pair of electrodes 207 so as not to deteriorate the light utilization efficiency, it is unavoidable to set a separation distance (or gap) d between the electrodes 207 to a relative large value. When the separation distance d is increased, it becomes necessary to apply a high voltage on the electrodes 307 in order to apply a high electric field to the liquid crystal layer 305, which is not preferable in that restrictions on the power supply capacity, discharge measures and the like increase. For this reason, it is preferable to set the distance T to a small value, but this distance T is determined by the thickness of the substrate 303.

Therefore, in this eighth embodiment of the optical write unit, the light emitting element array 102 and the optical path shifting element 301 are arranged adjacent to each other as shown in FIG. 20, and of the two substrates 303, the substrate 303 closer to the light emitting element array 102 is made to have a thickness smaller than the thickness of the substrate 303 closer to the lens 510. For example, the optical path shifting element 301 is arranged adjacent to the light emitting element array 102, the thickness of the substrate 303 closer to the light emitting element array 102 is set in a range of approximately several tens of μm to several hundred μm, and the thickness of the substrate 303 closer to the lens 510 is set in a range of approximately several mm in order to secure rigidity. In this case, the distance T from the light emitting element 101 to the liquid crystal layer 305 can be set in a range of approximately several tens of μm to several hundred μm. Accordingly, the liquid crystal layer 305 of the optical path shifting element 301 can be arranged in a region where the spread of the light emitted from the light emitting element array 102 is small, and the effective area of the liquid crystal layer 305 required for the optical path shift can be made small. When the effective area of the liquid crystal layer 305 is small, the separation distance d between the electrodes 307 can be made small, thereby making it possible to apply a high electric field to the liquid crystal layer 305 by applying a relatively low voltage to the electrodes 307. The optical path can be shifted at a high speed by applying the high electric field to the liquid crystal layer 305 of the optical path shifting element 301, and thus, a high-speed optical write unit can be realized. Moreover, the cost of the optical write unit can be reduced because it is possible to reduce the amount of liquid crystal material used for the liquid crystal layer 305.

Figure 21:
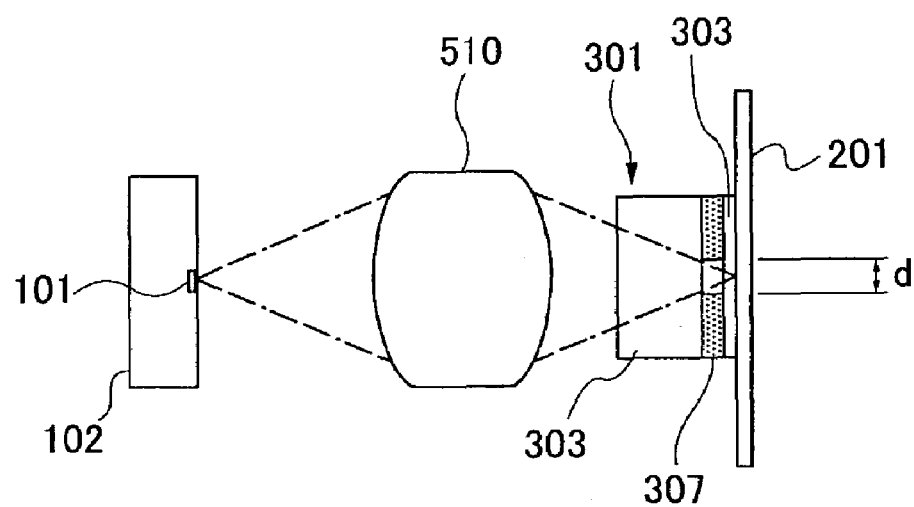
FIG. 21 is a front view in cross section showing an arrangement of the optical path shifting element of a ninth embodiment of the optical write unit according to the present invention.

Next, a description will be given of a ninth embodiment of the optical write unit according to the present invention, by referring to FIG. 21. FIG. 21 is a front view in cross section showing an arrangement of the optical path shifting element of the ninth embodiment of the optical write unit. In FIG. 21, those parts which are the same as those corresponding parts of the eighth embodiment of the optical write unit shown in FIG. 20 are designated by the same reference numerals, and a description thereof will be omitted.

In this ninth embodiment of the optical write unit, the optical path shifting element 301 and the recording medium 201 are arranged adjacent to each other, and the thickness of the substrate 303 closer to the recording medium 201 is made smaller than the thickness of the substrate 303 closer to the lens 510, as shown in FIG. 21.

Accordingly, the liquid crystal layer 305 of the optical path shifting element 301 can be arranged in a region where the spread of the light immediately before being converged on the recording medium 201 is small, and the effective area of the liquid crystal layer 305 required for the optical path shift can be made small. When the effective area of the liquid crystal layer 305 is small, the separation distance d between the electrodes 307 can be made small, thereby making it possible to apply a high electric field to the liquid crystal layer 305 by applying a relatively low voltage to the electrodes 307. The optical path can be shifted at a high speed by applying the high electric field to the liquid crystal layer 305 of the optical path shifting element 301, and thus, a high-speed optical write unit can be realized. Moreover, the cost of the optical write unit can be reduced because it is possible to reduce the amount of liquid crystal material used for the liquid crystal layer 305.

Figure 22:
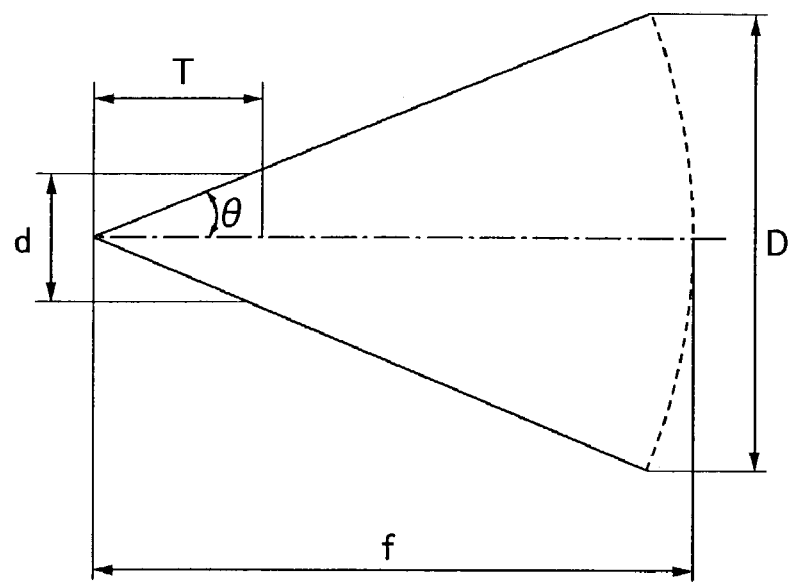
FIG. 22 is a diagram for explaining a relationship of a light incident angle of a lens, a distance from a focal point position and a diameter of an optical path in a tenth embodiment of the optical write unit according to the present invention.

Next, a description will be given of a tenth embodiment of the optical write unit according to the present invention, by referring to FIG. 22. FIG. 22 is a diagram for explaining a relationship of a light incident angle of a lens, a distance from a focal point position and a diameter of an optical path in the tenth embodiment of the optical write unit. In FIG. 22, those parts which are the same as those corresponding parts of the eighth and ninth embodiments of the optical write unit shown in FIGS. 20 and 21 are designated by the same reference numerals, and a description thereof will be omitted.

In this tenth embodiment of the optical write unit, when the optical system structure shown in any of FIGS. 19 through 21 is considered, the separation distanced of the electrodes 307 is set to satisfy the following relationship, where NA denotes a numerical aperture of the lens 510, n denotes the refractive index of the substrate 303 of the optical path shifting element 301, and T denotes a maximum distance from a focal point position of the lens 510 to the liquid crystal layer 305 within the optical path shifting element 301.

$$2T \times NA/n \leq d \leq 2T \times NA$$

FIG. 22 shows the relationship of a light incident angle θ of the lens 510, the distance T from the focal point position, and the diameter d of the optical path. The numerical aperture NA of the lens 510 can be described by the following formula, where f denotes the focal length of the lens 510, D denotes an aperture of the lens 510, and n denotes the refractive index between the lens 510 and the focal point.

$$NA = n \times \sin\theta = n \times 2f/D$$

In order to narrow the separation distance d between the electrodes 307 of the optical path shifting element 301 in a range such that the electrodes 307 do not block the spreading range of the optical path, the relationship of the separation distance d (aperture width between the electrodes 307) and the distance T from the focal point position to the liquid crystal layer 305 is adjusted with respect to the numerical aperture NA. In other words, the numerical aperture NA is set to NA=n×2T/d based on the approximation relationship shown in FIG. 22. In actual practice, the substrate 303 and the liquid crystal layer 305, which have relatively large refractive indexes, are provided between the lens 510 and the focal point position or, between the liquid crystal layer 305 and the focal point position. If the thickness of the glass substrate 303 is assumed to be zero, the refractive index n of air filling the space between the liquid crystal layer 305 and the focal point position is n=1, and the separation distance d of the electrodes 307 becomes d=2T×NA. On the other hand, if the substrate 303 having the refractive index n completely fills the space between the liquid crystal layer 305 and the focal point position, the separation distance d between the electrodes 307 becomes d=2T×NA/n.

Accordingly, it is possible to obtain an optimum setting which can simultaneously improve the light utilization efficiency and the electric field applying efficiency, by setting the separation distance d of the electrodes 307 in the above described range between 2T×NA/n and 2T×NA. As a result, for a given voltage applied to the electrodes 307, it is possible to apply a relatively high electric field to the liquid crystal layer 305, without deteriorating the light utilization efficiency of the optical system, and it is possible to realize a high-speed optical write operation.

Figure 23:
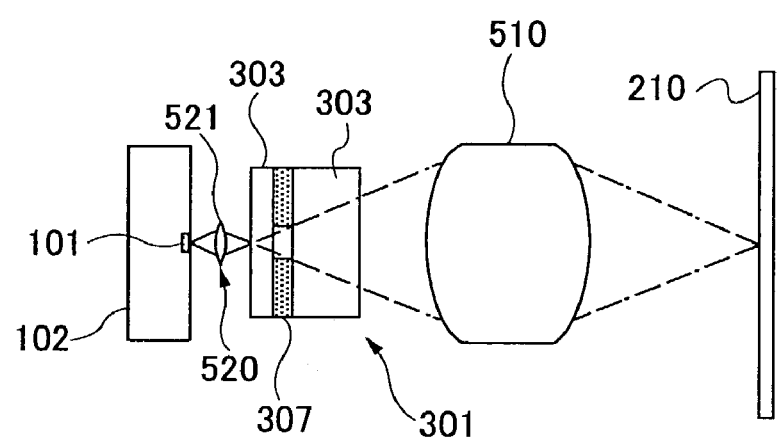
FIG. 23 is a front view in cross section showing an eleventh embodiment of the optical write unit according to the present invention.

Next, a description will be given of an eleventh embodiment of the optical write unit according to the present invention, by referring to FIG. 23. FIG. 23 is a front view in cross section showing the eleventh embodiment of the optical write unit. In FIG. 23, those parts which are the same as those corresponding parts of the eighth embodiment of the optical write unit shown in FIG. 20 are designated by the same reference numerals, and a description thereof will be omitted.

In this eleventh embodiment of the optical write unit, a microlens array 520 which is formed by a plurality of microlenses 521 is provided adjacent to the light emitting elements 101 of the light emitting element array 102, as shown in FIG. 23. Both the light emitting elements 101 and microlenses 521 are arranged in an array in a direction perpendicular to the paper in FIG. 23. The pitch and positions of the light emitting elements 101 respectively correspond to the pitch and positions of the microlenses 521.

According to the structure shown in FIG. 23, the light emitted from the light emitting element 101 is once converged by the corresponding microlens 521 of the microlens array 520, and the focal point of this corresponding microlens 521 is projected on the recording medium 201. Consequently, the recording spot size can be made small, and the effect of increasing the recording density by the optical path shift increases.

Figure 24A:
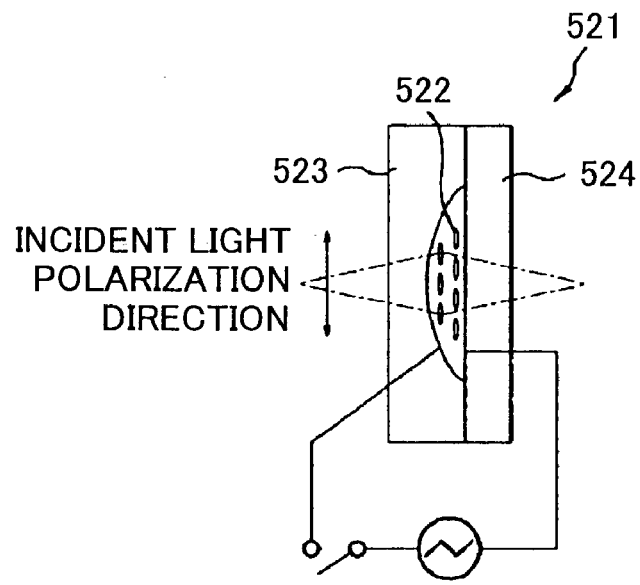
FIG. 24A is a cross sectional view showing a microlens of a microlens array in a twelfth embodiment of the optical write unit according to the present invention in a state where no electric field is applied.
Figure 24B:
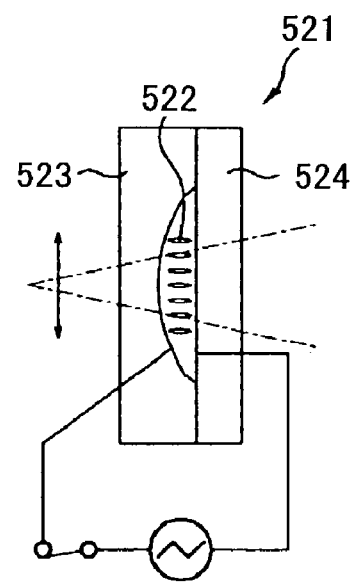
FIG. 24B is a cross sectional view showing the microlens of the microlens array in the twelfth embodiment of the optical write unit in a state where an electric field is applied.

Next, a description will be given of a twelfth embodiment of the optical write unit according to the present invention, by referring to FIGS. 24A and 24B. FIG. 24A is a cross sectional view showing a microlens of a microlens array in the twelfth embodiment of the optical write unit in a state where no electric field is applied, and FIG. 24B is a cross sectional view showing the microlens of the microlens array in the twelfth embodiment of the optical write unit in a state where an electric field is applied. In FIGS. 24A and 24B, those parts which are the same as those corresponding parts of the eleventh embodiment of the optical write unit shown in FIG. 23 are designated by the same reference numerals, and a description thereof will be omitted.

A microlens 521 shown in FIGS. 24A and 24B at least includes a liquid crystal layer 522, and electrodes capable of applying an electric field to the liquid crystal layer 522, so that a focal length of the microlens 521 is variable with respect to light in a specific polarization direction depending on the electric field intensity of the electric field applied to the liquid crystal layer 522. In the case of the microlens 521 shown in FIGS. 24A and 24B, the liquid crystal layer 522 is provided between a lens substrate 523 having a concave portion with the microlens shape and a parallel substrate 524. In addition, a transparent electrode layer and an alignment layer (both not shown) are provided at the interfaces between the liquid crystal layer 522 and the substrates 523 and 524. An ITO electrode may be used for the transparent electrode layer, and formed in an effective region of the substrate surface. A horizontal alignment layer may be used for the alignment layer, by carrying out an alignment process such as rubbing in an up-and-down direction on the paper in FIGS. 24A and 24B.

Accordingly, in the state where no electric field is applied to the liquid crystal layer 522 as shown in FIG. 24A, the liquid crystal molecules are aligned in the up-and-down direction on the paper. By selecting a liquid crystal material which makes the refractive index in the major axis direction of the liquid crystal molecule (extraordinary light refractive index) sufficiently large compared to the refractive indexes of the substrates 523 and 524, it is possible to generate a large lens effect with respect to the linearly polarized incident light in FIG. 24A.

On the other hand, in the state where the electric field is applied to the liquid crystal layer 522 by applying a voltage to the transparent electrodes as shown in FIG. 24B, the liquid crystal molecules are vertically aligned with respect to the substrates 523 and 524. The lens effect generated in this case is small, because the difference between the ordinary light refractive index of the liquid crystal molecules and the refractive indexes of the substrates 523 and 524 is relatively small.

Therefore, it is possible to control the existence or magnitude of the converging function of the microlens 521. When carrying out the high-density optical write operation using the optical path shift, the converging function of the microlens 521 is generated to make the light spot of the light emitting element 101 small, so as to set the pixel size to a small value. On the other hand, when no optical path shift is required, the converging function of the microlens 521 is not generated to make the light spot of the light emitting element 101 large, so as to set the pixel size to a size corresponding to the low-density optical write operation.

The polarity (positive or negative) of the dielectric anisotropy of the liquid crystal molecules, the direction of the alignment process, and the relationship between the existence of the electric field applied to the liquid crystal layer 522 and the size of the generated lens effect are not limited to the above, and may be set to appropriately combinations which can obtain similar effects.

Figure 25A:
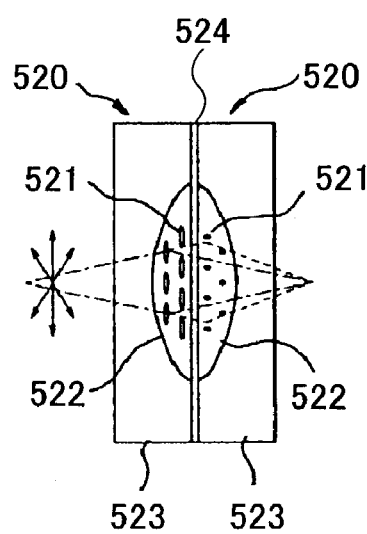
FIG. 25A is a cross sectional view showing a microlens array in the thirteenth embodiment of the optical write unit in a state where no electric field is applied.
Figure 25B:
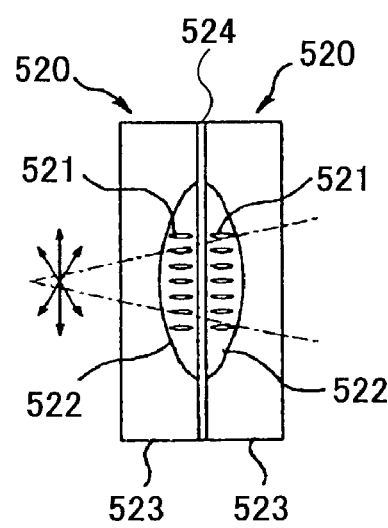
FIG. 25B is a cross sectional view showing the microlens array in the thirteenth embodiment of the optical write unit in a state where an electric field is applied.

Next, a description will be given of a thirteenth embodiment of the optical write unit according to the present invention, by referring to FIGS. 25A and 25B. FIG. 25A is a cross sectional view showing a microlens array in the thirteenth embodiment of the optical write unit in a state where no electric field is applied, and FIG. 25B is a cross sectional view showing the microlens array in the thirteenth embodiment of the optical write unit in a state where an electric field is applied. In FIGS. 25A and 25B, those parts which are the same as those corresponding parts of the twelfth embodiment of the optical write unit shown in FIGS. 24A and 24B are designated by the same reference numerals, and a description thereof will be omitted.

In the twelfth embodiment of the optical write unit, it is only possible to cope with a case where the incident light is linearly polarized. Hence, it is necessary to use the twelfth embodiment in combination with a linearly polarizing plate in the case where the light from the light emitting element 101 is non-polarized, and the light utilization efficiency slightly deteriorates in this case.

Hence, in this thirteenth embodiment of the optical write unit, two liquid crystal microlens arrays 520 are arranged in series in the optical axis direction, as shown in FIGS. 25A and 25B. In addition, the direction of the alignment process or the direction of the applied electric field is set so that the alignment direction of the liquid crystal molecules within the microlenses 521 of one (for example, the left) microlens array 520 is perpendicular to the alignment direction of the liquid crystal molecules within the microlenses 521 of the other (for example, the left) microlens array 520 when applied with the electric field or when not applied with the electric field. The structure of each microlens 521 within the microlens array 520 is the same as that of the twelfth embodiment of the optical write unit described above. In addition, a single substrate 524, which has the transparent electrode layer and the orientation layer provided on each of the opposite surfaces thereof, is shared by the two microlens arrays 520. Since the two microlenses 521 of the two microlens arrays 520 are preferably arranged adjacent to each other, it is preferable to make the single substrate 524 thin compared to the substrates 523.

In FIG. 25A, the liquid crystal molecules in the microlenses 521 of the left microlens array 520 are aligned in the up-and-down direction on the paper, and the liquid crystal molecules in the microlenses 521 of the right microlens array 520 are aligned in the direction perpendicular to the paper. Hence, when the non-polarized light is incident to the structure shown in FIG. 25A in a state where no electric field is applied, the polarized light component in the up-and-down direction on the paper is subjected to the lens effect by the microlenses 521 of the left microlens array 520 due to the extraordinary light refractive index of the liquid crystal layer 522 thereof, while the polarized light component in the direction perpendicular to the paper is transmitted approximately as it is due to the ordinary light refractive index of the liquid crystal layer 522 thereof. But thereafter, in the right microlens array 520 shown in FIG. 25A, the polarized light component in the up-and-down direction on the paper is transmitted approximately as it is due to the ordinary light refractive index of the liquid crystal layer 522 thereof, while the polarized light component in the direction perpendicular to the paper is subjected to the lens effect by the microlenses 521 of the right microlens array 520 due to the extraordinary light refractive index of the liquid crystal layer 522 thereof and is converged. By optimizing the lens shape and the liquid crystal material so that the focal point positions of the two microlens arrays 520 match, it is possible to realize a variable focal point function with respect to the non-polarized incident light, and in combination with the optical path shifting element 301 corresponding to the non-polarized light, it is possible to switch the write density with a high light utilization efficiency.

On the other hand, in the state shown in FIG. 25B, the liquid crystal molecules within the microlenses 521 of the two microlens arrays 520 are aligned in the same direction. Hence, the lens effect generated in this case is small.

In the liquid crystal microlens array 520 described above, the substrate 523 has the lens shape, and the lens effect is generated by the thickness distribution of the liquid crystal layer 522. However, the lens effect may be generated by use of a flat plate shaped substrate and a liquid crystal layer having a constant thickness, by generating an electric field intensity distribution within the liquid crystal layer and spatially forming a refractive index distribution. In this case, the electrodes may be divided into a plurality of electrode portions and the voltage applied to the electrode portions may be varied so as to generate the electric field intensity distribution. Alternatively, the electric field intensity distribution may be generated by forming a potential distribution within the electrodes by using a high-resistance electrode material for the electrodes. The electrodes may have a stripe shape, a ring shape, or the like, to suit the shape of the desired electric field intensity distribution.

Next, a description will be given of a fourteenth embodiment of the optical write unit according to the present invention.

In the thirteenth embodiment of the optical write unit described above, the liquid crystal microlens array 520 is provided adjacent to the light emitting element array 102, so as to realize the variable focal point function and to make the exposure spot size on the recording medium 201 variable. But in this fourteenth embodiment of the optical write unit, the lens 510 itself, which converges the light emitted from the light emitting element 101 of the light emitting element array 102, at least includes a liquid crystal layer (not shown) and electrodes (not shown) which enable an electric field to be applied to the liquid crystal layer. By use of the lens 510 having such a structure, it is possible to vary the focal length of the lens 510 with respect to the light in a specific polarization direction depending on the electric field intensity.

The operating principle of the lens 510 having such a structure is basically the same as that of the microlens 521 shown in FIGS. 24A and 24B having the variable focal point function. The design of the variable focal point lens portion using the liquid crystal may be optimized depending on the design of the spherical lens, the aspherical lens or the distributed index lens of the fixed portion.

When carrying out the high-density write operation using the optical path shift, the pixel size can be set to a small value by controlling the focal length of the lens 510 so that the converged spot size on the recording medium 201 becomes small. On the other hand, when not requiring the optical path shift, the pixel size can be set to a value corresponding to the low-density write operation, by controlling the focal length of the lens 510 so that the converged spot size on the recording medium 201 becomes large.

Next, a description will be given of a fifteenth embodiment of the optical write unit according to the present invention.

In the fourteenth embodiment of the optical write unit, it is only possible to cope with a case where the incident light is linearly polarized. Hence, it is necessary to use the fourteenth embodiment in combination with a linearly polarizing plate in the case where the light from the light emitting element 101 is non-polarized, and the light utilization efficiency slightly deteriorates in this case.

Accordingly, in this fifteenth embodiment of the optical write unit, the lens 510 for converging the light emitted from the light emitting element 101 on the recording medium 201 has a structure at least including two liquid crystal layers (not shown) and electrodes (not shown) which enable an electric field to be applied to each of the liquid crystal layers. Furthermore, the direction of the alignment process or the direction of the applied electric field is set so that the alignment direction of the liquid crystal molecules in one of the two liquid crystal layers is perpendicular to the liquid crystal molecules in the other of the two liquid crystal layers in a state where an electric field is applied or no electric field is applied to the electrodes.

The operating principle of the lens 510 having such a structure is basically the same as that of the microlenses 521 of the liquid crystal microlens array 520 shown in FIGS. 25A and 25B having the variable focal point function. The design of the variable focal point lens portion using the liquid crystal may be optimized depending on the design of the spherical lens, the aspherical lens or the distributed index lens of the fixed portion.

Therefore, it is possible to realize the variable focal point function with respect to the non-polarized incident light, and in combination with the optical path shifting element 301 corresponding to the non-polarized light, it is possible to switch the write density with a high light utilization efficiency.

Figure 26:
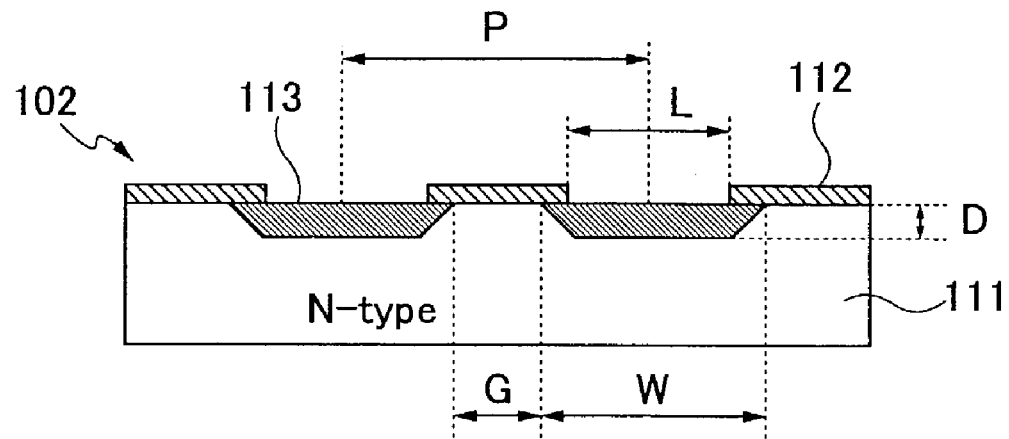
FIG. 26 is a side view in cross section showing a light emitting element array of a sixteenth embodiment of the optical write unit according to the present invention.

Next, a description will be given of a sixteenth embodiment of the optical write unit according to the present invention, by referring to FIG. 26. FIG. 26 is a side view in cross section showing the light emitting element array 102 of the sixteenth embodiment of the optical write unit. In FIG. 26, those parts which are the same as those corresponding parts of the first through fifteenth embodiments of the optical write unit shown in FIGS. 2 through 25B are designated by the same reference numerals, and a description thereof will be omitted.

In the first through fifteenth embodiment of the optical write unit described above, the type of the light emitting element array 102 is not specified.

For example, if a combination of a light source and a nematic liquid crystal light bulb array is used as the light emitting element array 102, it is not possible to cope with the high-speed write operation because of the relatively slow response of liquid crystal light bulbs forming the liquid crystal light bulb array. On the other hand, if a combination of a light source and a ferroelectric liquid crystal light bulb array is used as the light emitting element array 102, it is possible to cope with the high-speed write operation since ferroelectric liquid crystal light bulbs forming the ferroelectric liquid crystal light bulb array can write one dot in a time of approximately several tens of μsec. However, the light which is to be switched using the liquid crystal needs to be linearly polarized light, and the light utilization efficiency deteriorates when the light source emits non-polarized light.

Hence, in this sixteenth embodiment of the optical write unit, an LED array formed by LEDs is used as the light emitting element array 102. For example, a GaAlAs wafer 111 shown in FIG. 26 is used as base material for the LED array. A diffusion preventing layer 112 made of oxidized Al or the like is formed on the wafer 111 by a photolithography process. In this case, openings are formed in the diffusion preventing layer 112, and each opening has a width L and the openings are formed at a pitch P. In other words, a distance between centers of two mutually adjacent openings in the diffusion preventing layer 112 is P, and this distance P is equal to the pitch of the light emitting elements (LEDs) 101, that is, the distance between centers of two mutually adjacent light emitting elements (LEDs) 101.

Then, the wafer 111 having the diffusion preventing layer 112 is subjected to a Zn (zinc) atmosphere, and P (phosphor) is selectively diffused via the openings in the diffusion preventing layer 112, so as to form light emitting portions 113. The P is diffused under the diffusion preventing layer 112 by an amount (width) approximately corresponding to a depth D of the light emitting portions 113. For this reason, a width W with which the light emitting portion 113 actually emits light becomes W=L+2D. If the width L of the opening in the diffusion preventing layer 112 is 2 μm or greater by taking into consideration the precision of the photolithography process, and the depth D of the light emitting portion 113 is set to approximately 10 μm or greater in order to maximize the light emission output of the light emitting portion 113, the width W with which the light emitting portion 113 actually emits light becomes approximately 22 μm or greater. Furthermore, a gap G between two adjacent light emitting portions 113 needs to be set to approximately 5 μm or greater in order to prevent the two adjacent light emitting portions from making undesirable effects on each other. Accordingly, it may be seen that the pitch P of the light emitting portions 113 needs to be approximately 27 μm or greater.

Accordingly, it is difficult to realize the light emitting element array 102 having the light emitting portions 113 arranged in a row at the pitch P of 21 μm which is necessary for the write operation at 1200 dpi. However, it is easily possible to realize the light emitting element array 102 having the light emitting portions 113 arranged at the pitch P which is necessary for the write operation at 600 dpi. Hence, by using the latter light emitting element array 102 in combination wit the optical path shifting element 301 of any of the first through seventh embodiments of the optical write unit described above, it is possible to realize the high-definition write operation corresponding to 1200 dpi.

As shown in FIG. 26, the light emitting portions 113 of the light emitting element (LED) array 102 are formed directly in the wafer 111, and thus, it is possible to reduce the size of the light emitting element (LED) array 102.

In actual practice, in order to improve the directivity of the light emitted from the light emitting portions (LEDs) 113 of the light emitting element (LED) array 102, it is possible to provide a microlens array (not shown) adjacent to the light emitting element array 102 so that each microlens of the microlens array is adjacent to a corresponding light emitting portion 113 of the light emitting element array 102.

Next, a description will be given of a seventeenth embodiment of the optical write unit according to the present invention.

The seventeenth embodiment of the optical write unit uses a laser diode array (not shown) as the light emitting element array 102. Laser diodes forming the laser diode array can produce a high output with a high efficiency. Hence, by reducing the size of the pixel of the exposed portion on the recording medium 201, it is possible to carry out the write operation by sufficiently heating the recording medium 201 in a case where an optical recording medium having a heat mode is used as the recording medium 201.

In actual practice, in order to improve the directivity of the light emitted from the light emitting portions (laser diodes) 113 of the light emitting element (laser diode) array 102, it is possible to provide a microlens array (not shown) adjacent to the light emitting element array 102 so that each microlens of the microlens array is adjacent to a corresponding light emitting portion 113 of the light emitting element array 102.

Figure 27:
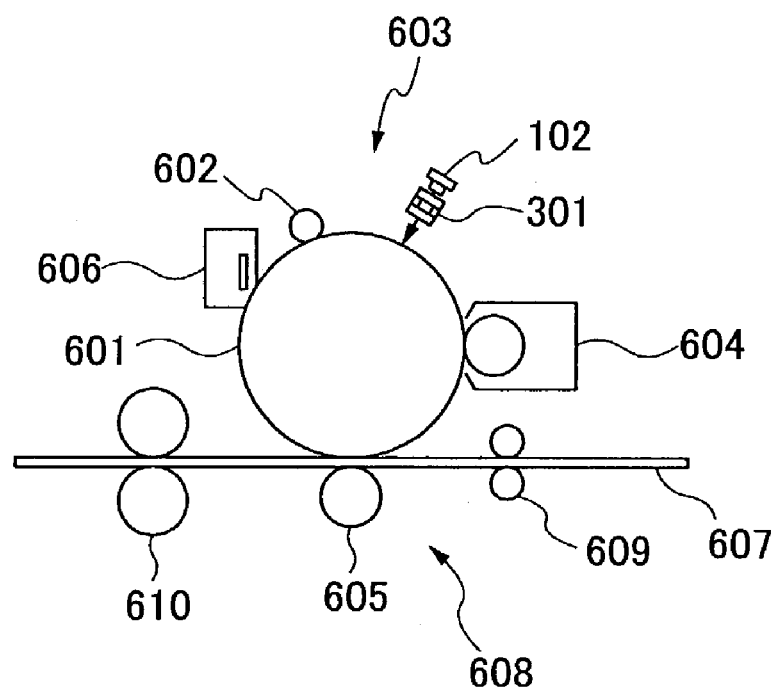
FIG. 27 is a diagram showing a first embodiment of an image forming apparatus according to the present invention.

Next, a description will be given of a first embodiment of an image forming apparatus according to the present invention, by referring to FIG. 27. FIG. 27 is a diagram showing the first embodiment of the image forming apparatus according to the present invention. In FIG. 27, those parts which are the same as those corresponding parts of the first through seventeenth embodiments of the optical write unit shown in FIGS. 2 through 25B are designated by the same reference numerals, and a description thereof will be omitted.

The optical write unit according to the present invention may be applied to any kind of recording medium 201 capable of forming a latent or prominent image by the exposure. Hence, FIG. 27 shows a case where the image forming apparatus is provided with a photoconductive (or photosensitive) body 601 as the recording medium 201, as well as the light emitting element array 102 and the optical path shifting element 301.

A charging unit 602, an optical write unit 602 including the light emitting element array 102 and the optical path shifting element 301, a developing unit 604, a transfer unit 605, and a cleaning unit 606 are arranged in the periphery of the photoconductive body 601 which has a drum shape or a belt shape. In addition, a transfer sheet transport path 608 for guiding and transporting a transfer sheet 607 such as paper is formed between the photoconductive body 601 and the transfer unit 605. In this transfer sheet transport path 608, a paper supply unit 609 is arranged on an upstream side of the photoconductive body 601, and a fixing unit 610 is arranged on a downstream side of the photoconductive body 601.

A photoconductive (or photosensitive) layer (not shown) made of an organic or inorganic material is formed on the surface of the photoconductive body 601. The photoconductive body 601 having the photoconductive layer made of the inorganic material will hereinafter be referred to as an inorganic photoconductive body, and the photoconductive body 601 having the photoconductive layer made of the organic material will hereinafter be referred to as an organic photoconductive body.

Materials such as amorphous selenium and amorphous silicon are used for the inorganic photoconductive body.

The organic photoconductive body is preferably a function separated type having a charge generating layer and a charge transfer layer (both not shown) which function separately. The charge generating layer has a thickness approximately on the order of several μm, and is formed as an evaporation layer of a charge generating agent or as a resin scattered layer in which pigments are scattered in a binder resin such as polycarbonate. The charge generating agent may be formed by pigments such as phthalocyanine pigments, bisazo pigments and perilyne pigments, and the pigments scattered in the binder resin may be such pigments forming the charge generating agent. The charge transfer layer has a thickness approximately on the order of several tens of μm, and is formed as a layer in which a donor material having a positive hole transfer function or an acceptor material having an electron transfer function is scattered within a binder resin such as polycarbonate. In a general function separated type organic photoconductive body, an underlayer, the charge generating layer and the charge transfer layer are successively formed on a photoconductive substrate.

A surface protecting layer (not shown) having a satisfactory mechanical strength may be provided on the inorganic photoconductive body and the organic photoconductive body, if necessary. In general, the surface of the photoconductive body 601 is charged to a negative polarity, and a donor material which transfers positive charges is scattered in the charge transfer layer. Triphenylmethane, triphenylamine dimerization, hydrazone, pyrazoline and the like may be used for the donor material.

A contact charging type charging roller may be used for the charging unit 602. By applying a negative voltage to the charging roller, the surface of the photoconductive body 601 is charged to the negative polarity. Of course, the charging unit 602 is not limited to the charging roller, and any suitable means such as a corona charger and a brush member may be used for the charging unit 602. When the optical write unit 603 exposes the surface of the photoconductive body 601 which is charged by the charging unit 602 to a negative polarity approximately on the order of minus several hundred V, the negative potential of the exposed portion is reduced to thereby form an electrostatic latent image. In this case, it is preferable that the light emitted from the light emitting element 101 has a wavelength for which the photoconductive body 601 has a large spectral sensitivity.

The developing unit 604 selectively adheres toner on the electrostatic latent image, to visualize the electrostatic latent image into a toner image. In other words, the developing unit 604 uses a developing roller (not shown) and applies a developing bias potential approximately on the order of minus several hundred V to the developing roller, and adheres toner particles having the negative polarity to the exposed portions having the reduced potential on the surface of the photoconductive body 601, so as to visualize the electrostatic latent image into the toner image.

The developing unit 604 may use a single component system which uses a single-component developing agent or, a two-component system which uses a two-component developing agent. However, in either case, it is preferable that the toner is charged to a negative polarity.

Moreover, the transfer unit 605 may use a roller member, a belt member, a corona charger or the like. The transfer unit 605 generates an electric field between the transfer unit 605 and the photoconductive body 601.

In the image forming apparatus having the structure described above, the transport of the transfer sheet 607 by a paper supplying unit (not shown) is started at a timing when the toner image is formed on the photoconductive body 601. This paper supplying unit is formed a paper supply tray, a paper supply roller or the like, and is provided on an upstream side along a paper transport direction of the paper supply unit 609 which is formed by a resist roller, for example. At a position where the toner image on the photoconductive body 601 and a print start position on the transfer sheet 607 make contact in synchronism therewith, the toner image is attracted by the transfer unit 605 which generates the electric field between the transfer unit 605 and the photoconductive body 601, and the attracted toner image is electrostatically transferred onto the transfer sheet 607. The toner image on the transfer sheet 607 is then transported to the fixing unit 610 and the toner image is fixed on the transfer sheet 607 by thermal fusion. On the other hand, the residual toner particles remaining on the surface of the photoconductive body 601 after the transfer process are removed by the cleaning unit 606.

The image forming operation using the electrophotography process is carried out in this manner. Since the electrostatic latent image can be formed on the photoconductive body 601 with a relatively small exposure energy when the image forming operation is carried out using the electrophotography process, it is possible to carry out a high-definition optical write operation at a high speed.

Next, a description will be given of a second embodiment of the image forming apparatus according to the present invention. This second embodiment of the image forming apparatus may also use any of the first through seventeenth embodiments of the optical write unit shown in FIGS. 2 through 25B.

In this second embodiment of the image forming apparatus, the recording medium 201 used is made of a material which enables formation of the image when applied with an external energy. For example, the recording medium 201 is made of a photosensitive image forming material or a thermosensitive image forming material.

Materials such as diazo and photochromism materials may be used for the photosensitive image forming material. In this case, the recording medium 201 directly generates color. For this reason, the size of the image forming apparatus itself can be reduced. Moreover, it is possible to realize a high-definition optical write operation by using any of the first through ninth embodiments of the optical write unit described above.

A conventionally used leuco dye material may be used as a thermosensitive color forming material. In this case, it is preferable to also use a material which absorbs light converts the absorbed light into heat. In order to carry out the recording by converting light into heat, it is preferable to use light having a high output such as a laser beam. However, it is necessary to arrange laser light sources such as laser diodes in an array in order to carry out the high-density recording at a high speed. As described above with respect to LEDs, it is also difficult to arrange the laser diodes in an array, but a high-definition optical write operation can be realized by using any of the first through ninth embodiments of the optical write unit described above.

Next, a description will be given of one optical shifting element created by the present inventors, by referring to FIGS. 28A, 28B, 29 and 30.

Figure 28A:
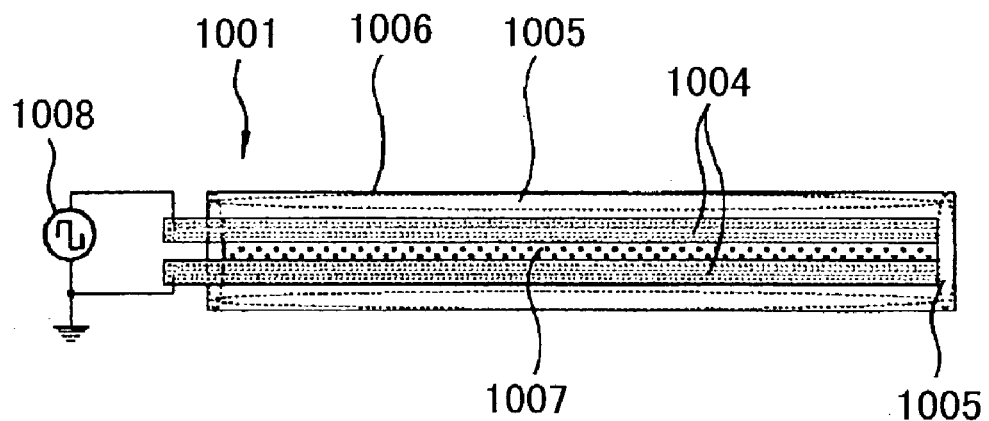
FIGS. 28A and 28B respectively are a plan view and a side view showing one optical shifting element created by the present inventors.
Figure 28B:
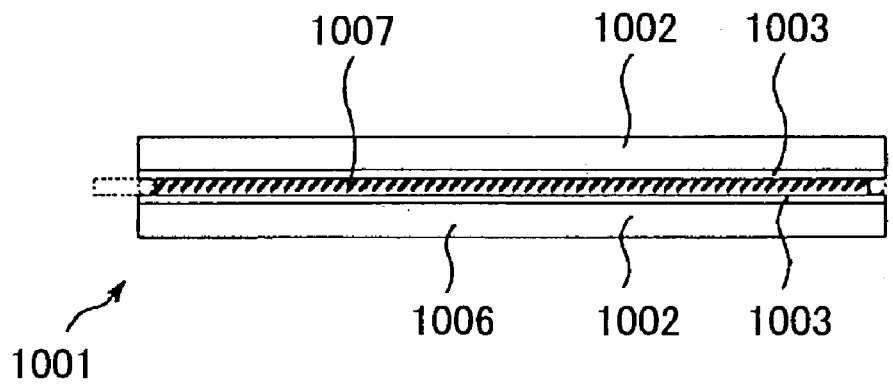

FIGS. 28A and 28B respectively are a plan view and a side view showing one optical shifting element 1001 created by the present inventors.

In FIGS. 28A and 28B, a glass substrate 1002 has a width of 10 mm, a length of 100 mm and a thickness of 1 mm. A vertical (homeotropic) alignment layer 1003 which is commercially available and has a thickness of 0.06 μm, is formed on the glass substrate 1002. Two Al electrode sheets 1004, each having a width of 2 mm, a length of 110 mm and a thickness of 100 μm, and also functioning as spacers, are arranged parallel to each other between the vertical alignment layers 1003 of two glass substrates 1002, so that an effective region has a width of 1 mm. Peripheries of the substrates 1002, the vertical alignment layers 1003 and the electrode sheets 1004, except for a portion, are fixed by an ultraviolet (UV) ray setting bonding agent 1005, so as to form a cell 1006. In a state where this cell 1006 is heated to approximately 90° C., a ferroelectric liquid crystal is injected into a space between the two substrate structures, namely, between the two electrode sheets 1004, by a capillary technique, in order to form a liquid crystal layer 1007. For example, a ferroelectric liquid crystal CS1029 manufactured by Chisso Corporation of Japan, having a refractive index Δn=0.16, a tilt angle θ=25 degrees and a spontaneous polarization Ps=−40 nC/cm², may be used as the ferroelectric liquid crystal which forms the liquid crystal layer 1007. After the ferroelectric liquid crystal is cooled, an opening through which the ferroelectric liquid crystal is injected is sealed by an appropriate bonding material such as the bonding agent 1005, so as to form the liquid crystal layer 1007 having an effective width of 1 mm, a length of approximately 95 mm and a thickness of 100 μm. A power supply 1008 including a pulse generator and a high-speed amplifier is connected to the electrode sheets 1004 which form an electrode pair, to operate the optical path shifting element 1001 shown in FIGS. 28A and 28B.

The present inventors confirmed that optical path shifting element 1001 shown in FIGS. 28A and 28B which is created in the above described manner has a transmittance of approximately 85% or greater.

In a state where no electric field is applied to the optical path shifting element 1001, the present inventors observed a conoscope image of the liquid crystal layer 1007 within the effective region, and found a cross shaped image and a circular ring shaped image at a central portion of the conoscope image. As a result, it was confirmed that the optical axis is perpendicular to the liquid crystal layer 1007 in the state where no electric field is applied. In this state, a spiral structure was observed, in which the tilt direction of the liquid crystal molecules rotates with respect to the direction perpendicular to the surface of the glass substrate 1002, and an average optical axis was observed to be in a spiral axis direction, that is, in a direction perpendicular to the surface of the glass substrate 1002. Next, when a rectangular wave voltage of ±150 V and 1 Hz was applied to the electrode sheets 1004 from the power supply 1008, it was found that the positions of the cross shaped image and the circular ring shaped image in the conoscope image shift in the up-and-down direction, that is, undergo a reciprocating movement at 1 Hz. The tilt angle of the optical axis calculated from the numerical aperture (NA) of an objective lens of the microscope, the refractive index of the liquid crystal and the amount of shift in the position of the cross shaped image was approximately 25 degrees, and it was confirmed that the calculated tilt angle matches the tilt angle θ peculiar to the liquid crystal material. At an electric field intensity on the order of approximately 150 V/mm, it was confirmed that the spiral structure dissolves and the liquid crystal molecules are uniformly aligned in one direction, and that the direction of the optical axis of the liquid crystal layer 1007 can be switched by ±25 degrees.

Figure 29:
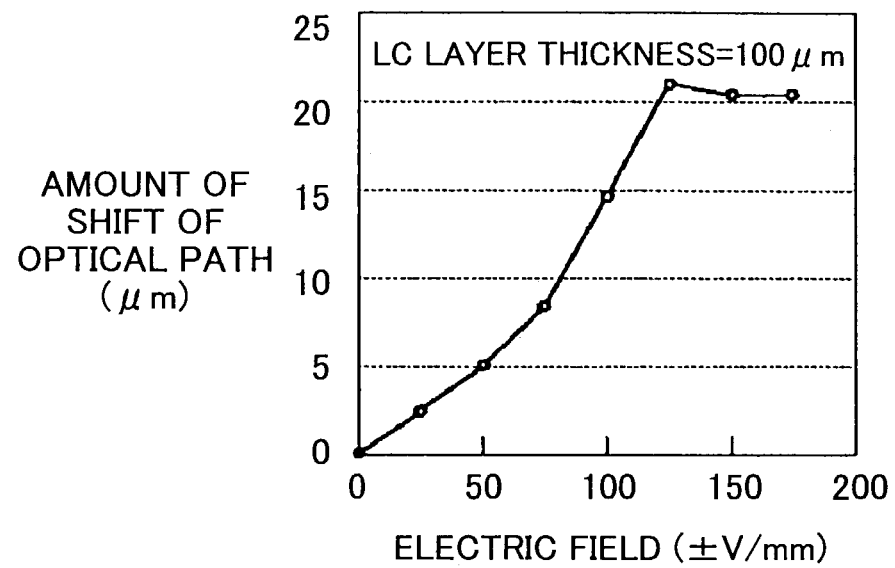
FIG. 29 is a diagram showing a relationship of an applied electric field and an amount of shift of optical path.

The present inventors observed the electric field dependency of the amount of shift of the optical path. The observations made on this electric field dependency will be described with reference to FIG. 29. FIG. 29 is a diagram showing a relationship of the applied electric field and the amount of shift of the optical path.

In experiments conducted by the present inventors, a mask pattern having a square opening with a side of 4 μm was illuminated from the back surface by linearly polarized light, and the light transmitted through the mask pattern was observed via the optical path shifting element 1001. In other words, a shift which occurs in the position of the mask pattern by operating the optical path shifting element 1001 was observed by a video camera provided with a microscope, to measure the amount of shift of the optical path. The temperature of the optical path shifting element 1001 was set to approximately 30° C. In addition, a rectangular wave voltage of 0 to ±175 V and 1 Hz was applied to the electrode sheets 1004 from the power supply 1008. As a result, the amount of shift of the optical path became as shown in FIG. 29 when the plane of polarization of the incident light is perpendicular to the direction of the electric field, that is, parallel to the optical path shifting direction.

As may be seen from FIG. 29, the amount of shift of the optical path is approximately 21 μm at an electric field intensity on the order of approximately ±125 V/mm, and the amount of shift of the optical path saturated at this value. Similarly, measurements were made at several positions along the longitudinal direction of the optical path shifting element 1001, but each of the measurements showed similar characteristics. Furthermore, no focusing error was seen at both the two shifted positions.

The present inventors also checked a deterioration rate of the resolution (or CTF: Contrast Transfer Function) from a change in the luminance distribution of the opening between a case where no optical path shifting element 1001 is provided and a case where the optical path is shifted by the optical path shifting element 1001. It was confirmed that the CTF value is 80% or greater, and that there will be no problems from the practical point of view.

In addition, no shift in the optical path was observed when the plane of polarization of the incident light was parallel to the direction of the electric field.

Figure 30:
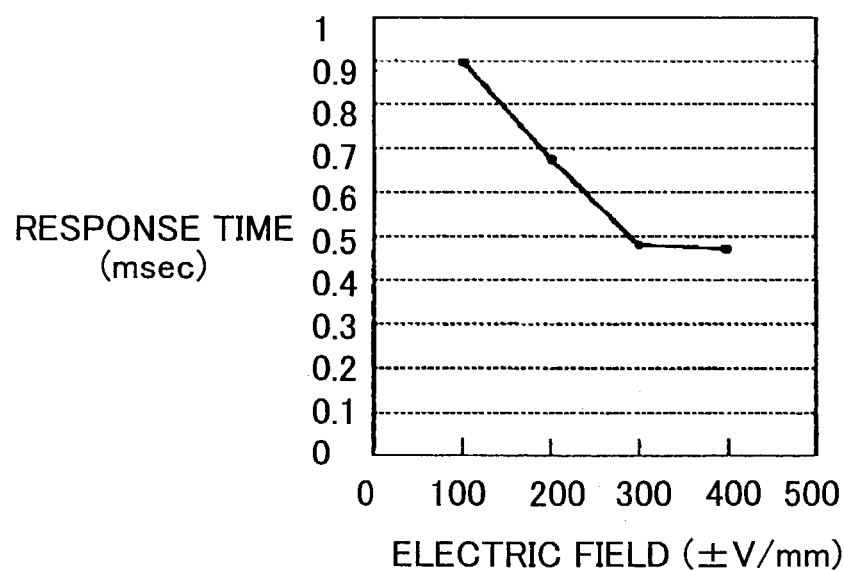
FIG. 30 is a diagram showing a relationship of the applied electric field and a response time.

The present inventors also observed the electric field dependency of the response time of the optical path shift. The observations made on this electric field dependency will be described with reference to FIG. 30. FIG. 30 is a diagram showing a relationship of the applied electric field and the response time.

The electric field dependency of the response time of the optical path shift was observed similarly to the observation of the electric field dependency of the amount of shift of the optical path, using a high-speed camera provided with a microscope. More particularly, the amount of shift of the optical path and the time required to make the optical path shift, that is, the response time of the optical path shift, was measured. The temperature of the optical path shifting element 1001 was set to approximately 30° C.

In addition, a rectangular wave voltage of ±100 V to ±400 V and 100 Hz was applied to the electrode sheets 1004 from the power supply 1008, and the observation by the high-speed camera was made at a time resolution of 40500 frames/sec. As a result, the response time of the optical path shift became as shown in FIG. 30. At an electric field intensity of ±400 V/mm, the response time was 0.5 msec or less.

Figure 31A:
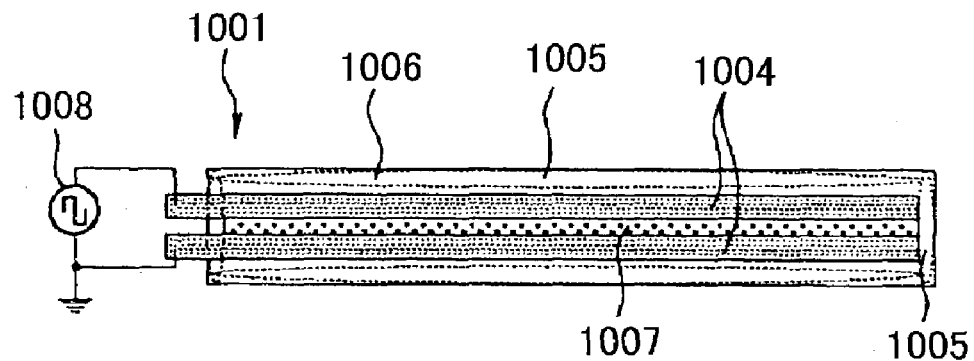
FIGS. 31A and 31B respectively are a plan view and a side view showing another optical path shifting element created by the present inventors.
Figure 31B:
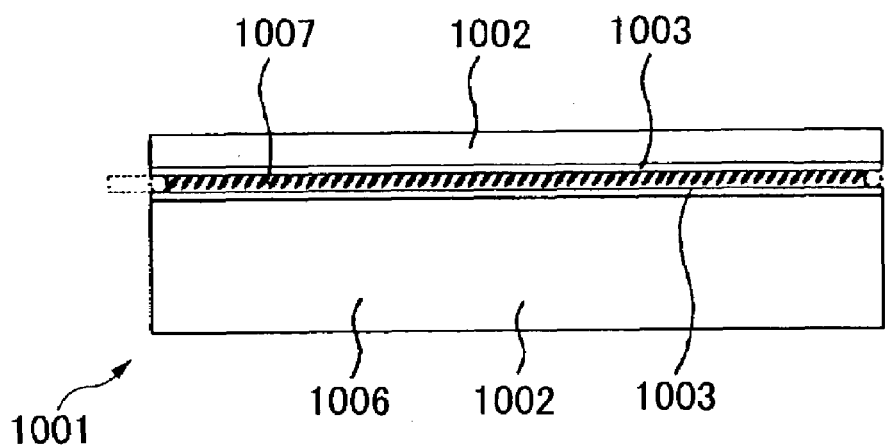

Next, a description will be given of another optical path shifting element created by the present inventors, by referring to FIGS. 31A and 31B. FIGS. 31A and 31B respectively are a plan view and a side view showing another optical path shifting element 1001 created by the present inventors. In FIGS. 31A and 31B, those parts which are basically the same as those corresponding parts in FIGS. 28A and 28B are designated by the same reference numerals, and a description thereof will be omitted.

In FIGS. 31A and 31B, a first glass substrate 1002 has a width of 10 mm, a length of 100 mm and a thickness of 0.15 mm. A second glass substrate 1002 has a width of 10 mm, a length of 100 mm and a thickness of 2 mm. A vertical (homeotropic) alignment layer 1003 which is commercially available and has a thickness of 0.06 μm, is formed on each of the first and second glass substrates 1002. Two Al electrode sheets 1004, each having a width of 2 mm, a length of 110 mm and a thickness of 100 μm, and also functioning as spacers, are arranged parallel to each other between the vertical alignment layers 1003 of first and second glass substrates 1002, so that an effective region has a width of 0.15 mm. Peripheries of the first and second substrates 1002, the vertical alignment layers 1003 and the electrode sheets 1004, except for a portion, are fixed by an ultraviolet (UV) ray setting bonding agent 1005, so as to form a cell 1006 having the first and second glass substrates 1002 with the asymmetric thicknesses. A ferroelectric liquid crystal is injected into a space between the two substrate structures of this cell 1006, similarly as described above with reference to FIGS. 28A and 28B, in order to form a liquid crystal layer 1007. The liquid crystal layer 1007 has an effective width of 0.15 mm, a length of approximately 95 mm and a thickness of 100 μm. A power supply 1008 including a pulse generator and a high-speed amplifier is connected to the electrode sheets 1004 which form an electrode pair, to operate the optical path shifting element 1001 shown in FIGS. 31A and 31B.

The present inventors confirmed that optical path shifting element 1001 shown in FIGS. 31A and 31B which is created in the above described manner has a transmittance of approximately 85% or greater. When the response time of this optical path shifting element 1001 was measured by a high-speed-camera in a manner similar to that described above by applying 400 V across the electrode sheets 1004, the measured response time was 30 μsec, and it was confirmed that a high-speed response is obtained.

Figure 32:
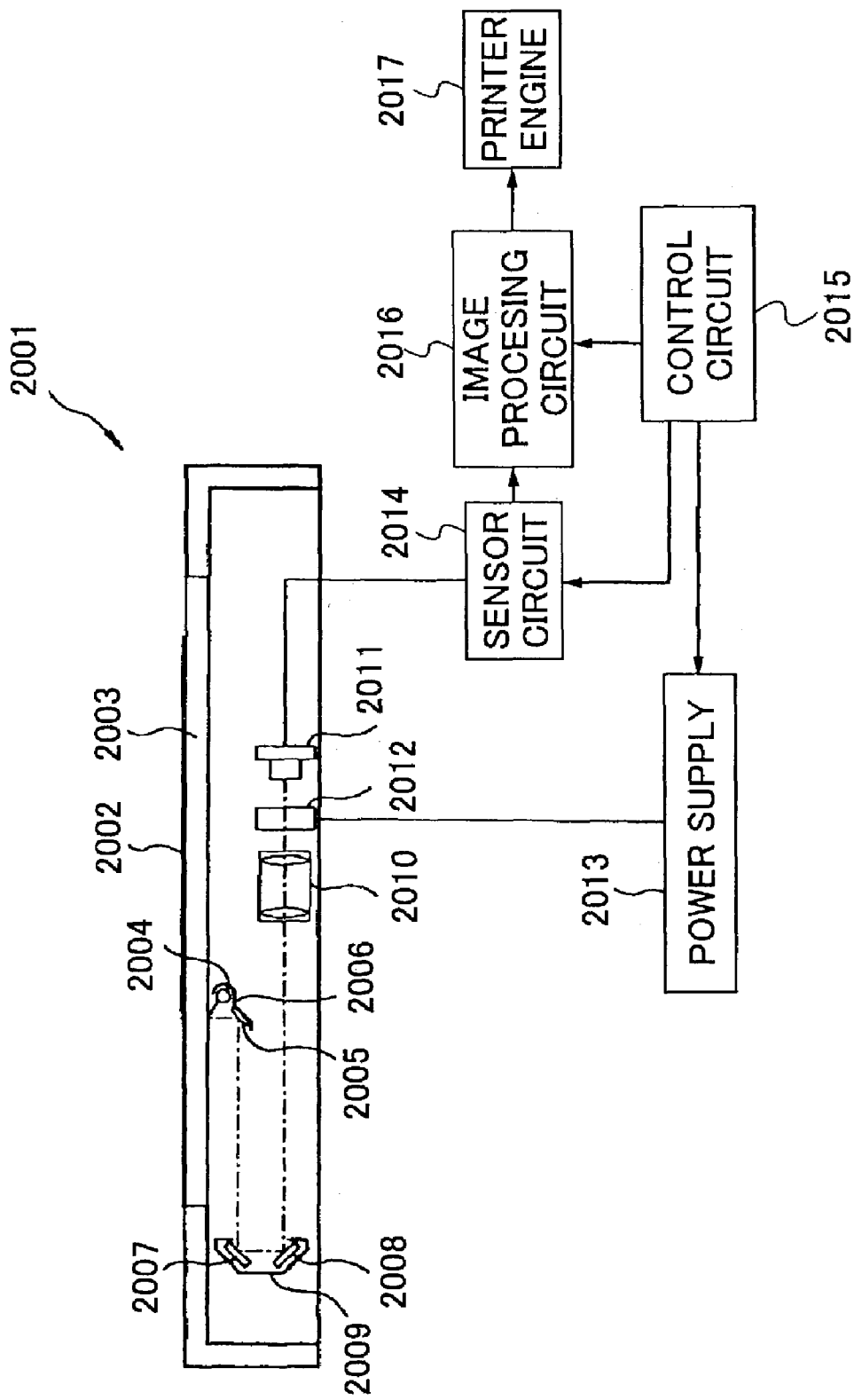
FIG. 32 is a diagram showing a first embodiment of an optical read unit according to the present invention.

Next, a description will be given of a first embodiment of an optical read unit according to the present invention, by referring to FIG. 32. FIG. 32 is a diagram showing the first embodiment of the optical read unit.

An optical read unit 2001 shown in FIG. 32 includes a document base 2003, a first scanning body 2006, a second scanning body 2009, an imaging lens 2010, and a solid state imaging element (or image pickup element) 2011 formed by CCDs. A document 2002 which is to be read is placed on the document base 2003. The first scanning body 2006 includes an illumination (or light source) 2004 and a first mirror 2005. The second scanning body 2009 includes a second mirror 2007 and a third mirror 2008. In addition, an optical path shifting element 2012 is provided in front of the solid state imaging element 2011. A square wave A.C. power supply 2013 which outputs a square wave voltage having a predetermined frequency is connected to the optical path shifting element 2011.

In the image reading unit 2001, the illumination 2004 illuminates the document 2002 which is placed on the document base 2003. Reflected light from the document 2002 is imaged by the imaging lens 2010 on the solid state imaging element 2011 via the optical path shifting element 2012, via the first mirror 2005 of the first scanning body 2006 which scans in a sub scan direction, and also via the second and third mirrors 2007 and 2008 of the second scanning body 2009 which scans in the sub scan direction at one-half the speed of the first scanning body 2006, so as to read a document image of the document 2002.

Figure 33:
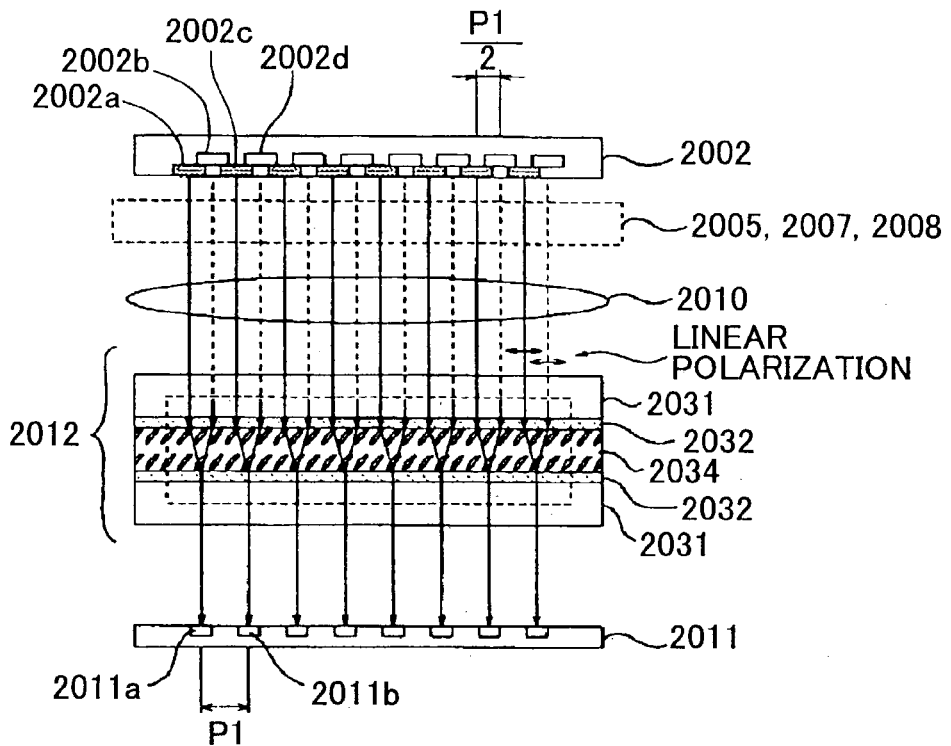
FIG. 33 is a side view in cross section showing an optical path from a document to a solid state imaging element.

FIG. 33 is a side view in cross section showing an optical path from the document 2002 to the solid state imaging element 2011. In a case where pixels (photocells) 2011a of the solid state imaging element 2011 are arranged at a pitch P1 μm as shown in FIG. 33, the optical path is shifted P1/2

μm back and forth (or switched) in a main scan direction in which pixels 2002a, 2002b, 2002a, 2002b, . . . of the document 2002 are arranged, at a high speed, by the optical path shifting element 2012. As a result, positions between the pixels are interpolated, and it is possible to read the document 2002 at two times the pixel density. The solid state imaging element may have a structure in which the pixels (photocells) for reading black-and-white image are arranged in a row or, the pixels (photocells) for reading color images are arranged in three parallel rows for red, green and blue, for example.

Figure 34:
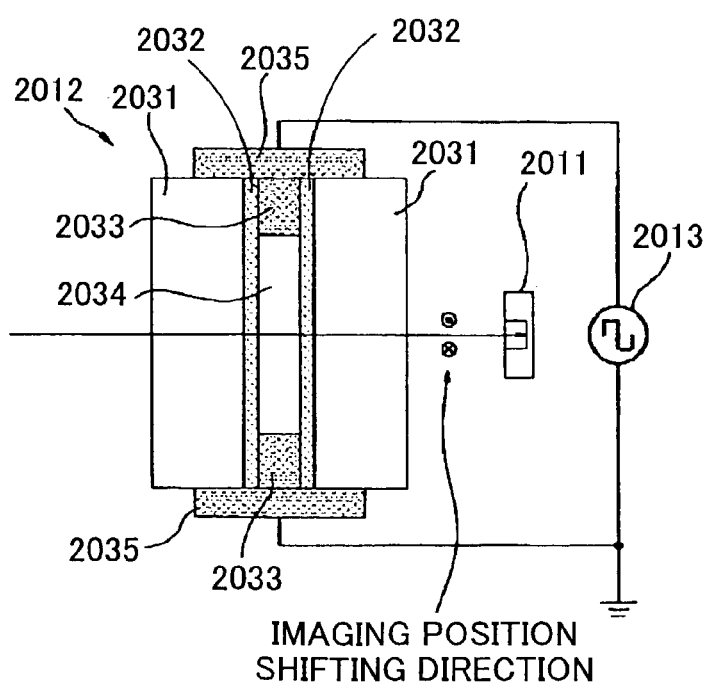
FIG. 34 is a front view in cross section showing the first embodiment of the optical read unit.

FIG. 34 is a front view in cross section showing the first embodiment of the optical read unit, that is, the optical path shifting element 2012.

As shown in FIGS. 33 and 34, the optical path shifting element 2012 includes a pair of transparent substrates 2031 which are separated by a separation distance (or gap) which is restricted by a spacer 2033, via a pair of vertical alignment layers 2032. Surfaces of the pair of substrates 2031 (substrate surfaces) are approximately parallel to each other. A liquid crystal layer 2034 made of a chiral smectic C phase ferroelectric liquid crystal or the like, which makes a homeotropic alignment due to the vertical alignment layers 2032, is sandwiched between the vertical alignment layers 2032 provided on the pair of transparent substrates 2031. The optical path shifting element 2012 further includes an electric field generating means 2013. This electric field generating means 2013 applies a voltage across a pair of electrodes 2035 which are arranged along on both ends of the liquid crystal layer 2034, so as to generate an electric field within the liquid crystal layer 2034 in a normal direction to the substrate surface.

The pair of confronting transparent substrates 2031 may be made of glass, quartz, plastic or the like. It is desirable to use a transparent material having no birefringence for the substrates 2031. In addition, the thickness of the substrates 2031 is preferably in a range of approximately several tens of μm to approximately several mm.

The vertical alignment layer 2032 formed on the substrate 2031 may be made of a vertical alignment agent for liquid crystal display, silane coupling agent, $SiO_2$ evaporation layer, and the like. The material used for the vertical alignment layer 2032 is not limited to a particular material, and any suitable material which causes liquid crystal molecules to make a vertical alignment (homeotropic alignment) with respect to the surface of the substrate 2031 may be used for the vertical alignment layer 2032. The vertical alignment (homeotropic alignment) not only includes a state where the liquid crystal molecules are aligned vertically with respect to the surface of the substrate 2031, but also a state where the liquid crystal molecules are tilted up to several tens of degrees with respect to the surface of the substrate 2031.

The spacer 2033 is provided between the two substrates 2031 to determine the separation between the two substrates 2031, and the liquid crystal layer 2034 is formed between the two substrates 2031. The pair of electrodes 2035 are provided on both ends of the liquid crystal layer 2034, in a state sandwiching the liquid crystal layer 2034. The spacer 2033 may be formed by a sheet member having a thickness in a range of approximately several μm to approximately several mm or, grains having a grain diameter in such a range. It is preferable to provide the spacer 2033 outside an effective region of a light transmitting part of the optical path shifting element 2012. Metals such as Al, Cu and Cr, transparent electrode materials such as ITO, and the like may be used for the pair of electrodes 2035.

In FIG. 34, the pair of electrodes 2035 are formed on the side surfaces of the substrates 2031. However, the locations of the pair of electrodes 2035 are not limited to those shown in FIG. 34 as long as it is possible to apply an electric field in a direction parallel to the surface of the substrate 2031, that is, in the horizontal direction of the liquid crystal layer 2034 in FIG. 33. In order to apply a uniform horizontal electric field within the liquid crystal layer 2034 in FIG. 33, it is preferable to use as the pair of electrodes 2035 metal layers having a width which is approximately equal to or greater than the thickness of the liquid crystal layer 2034.

A width of an effective region of the light transmitting part of the optical path shifting element 2012 is set to correspond to an effective width of the corresponding solid state imaging element 2011. For example, the width of the effective region of the light transmitting part of the optical path shifting element 2012 is in a range of approximately several hundred μm to approximately several mm. The width of the effective region of the light transmitting part of the optical path shifting element 2012 needs to be set wider when reading a color image. In general, a distance between lines of each of the colors is on the order of four lines. Hence, if the pitch P1 of the pixels (photocells) of the solid state imaging element 2011 is 7 μm, the distance between the lines of each of the colors is 28 μm, and the width of the effective region of the light transmitting part of the optical path shifting element 2012 may be set to approximately 100 μm or greater.

Liquid crystal capable of forming a smectic C phase in a temperature range in which the optical read unit 2001 is used for the liquid crystal layer 2034. Hence, the electric field is applied in the horizontal direction of the liquid crystal layer 2034 in FIG. 33, by applying a voltage across the pair of electrodes 2035.

A more detailed description will be given of the liquid crystal layer 2034 capable of forming the smectic C phase. In the liquid crystal layer 2034 which is formed by the smectic crystal, the liquid crystal is arranged in layers (smectic layers) in a major axis direction of the liquid crystal molecules. The liquid crystal in which the major axis direction of the liquid crystal molecules matches the normal direction to the layers (layer normal direction) is referred to as the smectic A-phase, while the liquid crystal in which the major axis direction of the liquid crystal molecules do not match the layer normal direction is referred to as the smectic C phase.

The ferroelectric liquid crystal having the smectic C phase generally has a so-called spiral structure in which the direction of the liquid crystal directors rotates spirally for every smectic layer in a state where no external electric field acts, and is referred to as the chiral smectic C phase. In addition, in the antiferroelectric liquid crystal having the chiral smectic C phase, the liquid crystal directors face mutually opposite directions for every smectic layer. The liquid crystals having the chiral smectic C phase include asymmetric carbon in the molecular structure, and thus have spontaneous polarization. The optical characteristic is controlled by rearranging the liquid crystal molecules in a direction determined by the spontaneous polarization Ps and the external electric field E. In this embodiment, it is assumed for the sake of convenience that the liquid crystal layer 2034 of the optical path shifting element 2012 is made of the ferroelectric liquid crystal, but it is of course possible to similarly use the antiferroelectric liquid crystal for the liquid crystal layer 2034.

The chiral smectic C phase liquid crystal has an extremely high-speed response characteristic compared to the smectic A-phase or nematic liquid crystals, and can carry out a switching in the sub ms range. Particularly because the direction of the liquid crystal directors is uniquely determined with respect to the direction of the electric field in the case of the chiral smectic C phase liquid crystal, the direction of the liquid crystal directors can be controlled with more ease compared to the smectic A-phase liquid crystal.

The liquid crystal layer 2034 made of the smectic C phase liquid crystal having the homeotropic alignment is less likely to receive restricting forces from the substrates 2031 with respect to the operation of the liquid crystal directors compared to a case where the alignment is homogeneous (that is, a state where the liquid crystal directors are aligned parallel to the surface of the substrate 2031), and only requires a small electric field. In the case where the liquid crystal directors have the homogeneous alignment, the liquid crystal directors are strongly dependent upon not only the direction of the electric field but also the surface of he substrate 2031, thereby requiring more accurate positioning of the optical path shifting element 2012. But when the liquid crystal directors have the homeotropic alignment as in the case of this embodiment, a positioning margin of the optical path shifting element 2012 with respect to the light deflection is increased. By utilizing these characteristics of the smectic C phase liquid crystal having the homeotropic alignment, it becomes unnecessary to align the spiral axis perfectly perpendicular to the surface of the substrate 2031. In other words, the spiral axis may be slightly tilted with respect to the normal to the surface of the substrate 2031, as long as the liquid crystal directors can face two directions without receiving the restricting forces from the substrates 2031.

Next, a description will be given of the operation of this embodiment of the optical read unit, based on the operating principle of the optical path shifting element 2012.

Figure 35A:
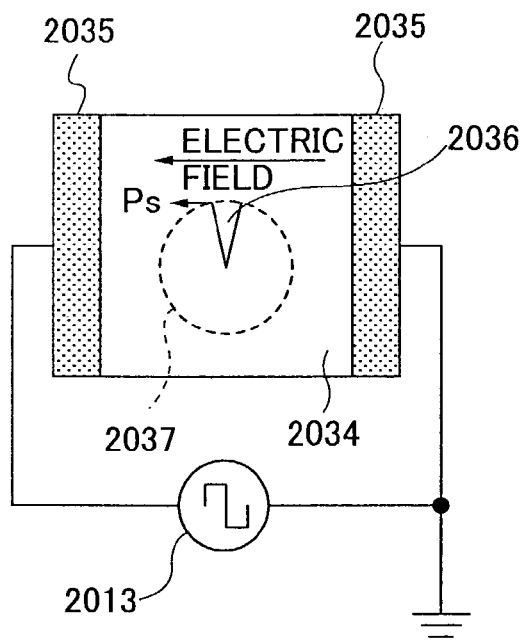
FIGS. 35A and 35B are diagrams for explaining a direction of an electric field generated in a liquid crystal layer of an optical path shifting element, and a tilt direction of liquid crystal molecules.
Figure 35B:
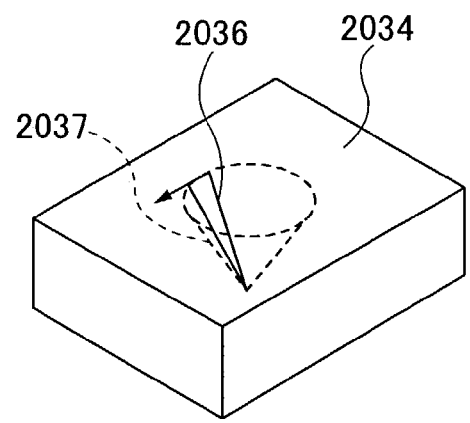
Figure 36A:
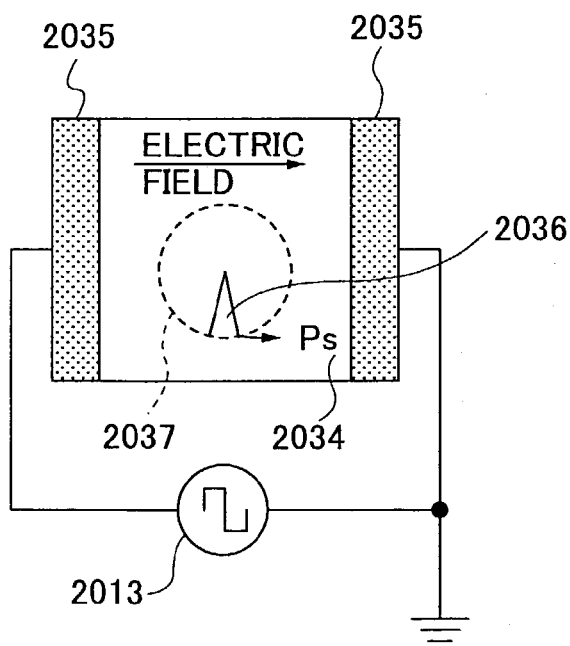
FIGS. 36A and 36B are diagrams for explaining the direction of the electric field generated in the liquid crystal layer of the optical path shifting element, and the tilt direction of the liquid crystal molecules, for a case where the direction of the electric field is reversed.
Figure 36B:
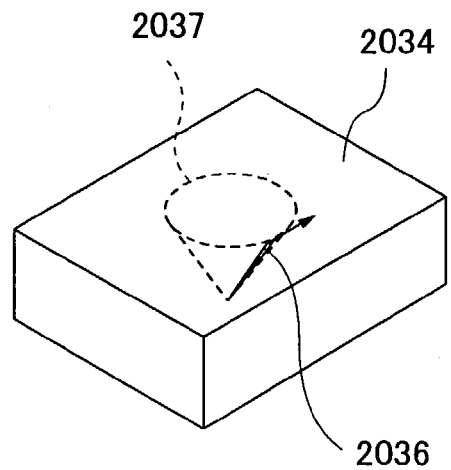
Figure 37A:
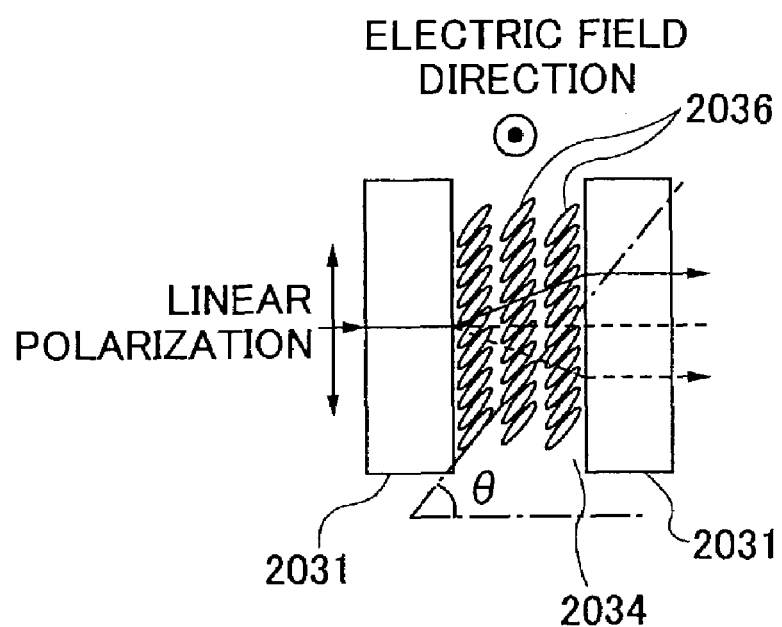
FIG. 37A is a diagram showing a state of alignment of the liquid crystal molecules in the liquid crystal layer.

FIGS. 35A and 35B are diagrams for explaining the direction of the electric field generated in the liquid crystal layer 2034 of the optical path shifting element 2012, and the tilt direction of the liquid crystal molecules. FIGS. 36A and 36B are diagrams for explaining the direction of the electric field generated in the liquid crystal layer 2034 of the optical path shifting element 2012, and the tilt direction of the liquid crystal molecules, for a case where the direction of the electric field is reversed. FIG. 37A is a diagram showing a state of alignment of the liquid crystal molecules in the liquid crystal layer 2034. Further, FIG. 37B is a diagram showing a state of alignment of the liquid crystal molecules in the liquid crystal layer 2034 for the case where the direction of the electric field is reversed.

In FIGS. 35A, 35B, 36A and 36B, the length of the optical path shifting element 2012 is illustrated as being short compared to the width of the optical path shifting element 2012 between the pair of electrodes 2031, for the sake of convenience. However, the width and length of the optical path shifting element 2012 may be set so that the structure is long and narrow with respect to the effective area of the solid state imaging element 2011.

FIGS. 35A and 36A respectively show the optical path shifting element 2012 viewed from the side of the light emission surface thereof. FIG. 35A shows a state where the liquid crystal directors are tilted such that the side of the liquid crystal molecule illustrated with the wider width is tilted in a direction out of the paper. FIG. 36A shows a state where the liquid crystal directors are tilted such that the side of the liquid crystal molecule illustrated with the narrower width is tilted in a direction into the paper. The direction of the spontaneous polarization Ps of the liquid crystal is indicated by an arrow in FIGS. 35A and 36A. As shown in FIG. 35A, the direction of the tilt angle of the liquid crystal molecules having the approximately vertical alignment is reversed when the direction of the electric field reverses. FIGS. 35A and 36A show the relationship of the direction of the applied electric field and the tilt direction of the liquid crystal molecules, for the liquid crystal having the spontaneous polarization Ps which is positive. When the direction of the tilt angle reverses, it may be regarded that the liquid crystal molecules within the smectic layer undergo a rotary movement within a virtual cone shape as shown in FIGS. 35B and 36B.

Figure 37B:
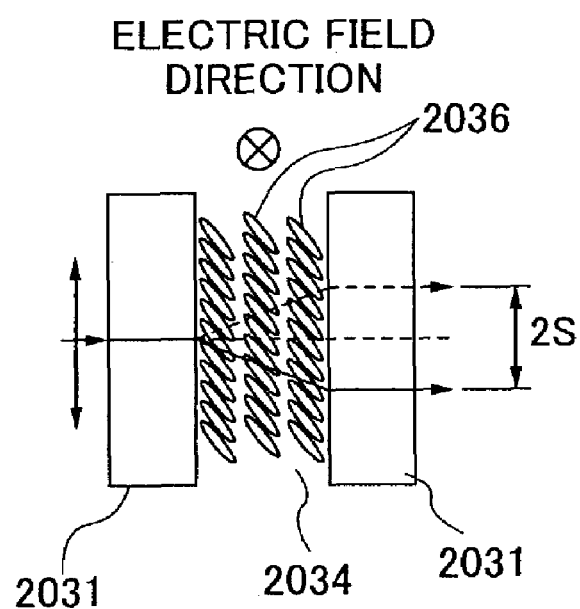
FIG. 37B is a diagram showing a state of alignment of the liquid crystal molecules in the liquid crystal layer for the case where the direction of the electric field is reversed.

In FIGS. 37A and 37B, the illustration of the vertical alignment layer 2032, the spacer 2033 and the pair of electrodes 2031 is omitted. Further, for the sake of convenience, FIGS. 37A and 37B show a case where the voltage is applied in a direction perpendicular to (that is, in a direction into or out of) the paper, and the electric field acts in this direction perpendicular to the paper. The direction of the electric field is switched by a voltage applying means (not shown) depending on a target light deflecting direction, so that the optical path shifting element 2012 is switched between a state shown in FIG. 37A and a state shown in FIG. 37B.

As shown in FIG. 37A, when the electric field is applied in the direction out of the paper, the number of liquid crystal molecules with the liquid crystal directors tilted towards the top right in FIG. 37A increases if the spontaneous polarization of the liquid crystal molecules is positive, and in this case, an average optical axis of the liquid crystal layer 2034 also tilts towards the top right in FIG. 37A, so that the liquid crystal layer 2034 functions as a birefringence plate. At electric fields greater than or equal to a threshold value where the spiral structure of the chiral smectic C phase dissolves, all liquid crystal directors have a tilt angle θ, and the liquid crystal layer 2034 functions as a birefringence plate having an optical axis which is tilted by an angle θ in the upward direction. The linearly polarized light which is incident to the liquid crystal layer 2034 from the left in FIG. 37A as extraordinary light makes a parallel shift in the upward direction. When the refractive index in the major axis direction of the liquid crystal molecules is denoted by ne, the refractive index in a minor axis direction of the liquid crystal molecules is denoted by no, and a thickness (gap) of the liquid crystal layer 2034 is denoted by d, an amount of shift, S, can be described by the formula (1) described above.

Similarly, when the voltage applied to the pair of electrodes 2035 is reversed and the electric field is applied in the direction into the paper in FIG. 37B, the liquid crystal directors tilt towards the bottom right in FIG. 37B, and the liquid crystal layer 2034 functions as a birefringence plate having an optical axis which is tilted downwards by an angle θ. The linearly polarized light which is incident to the liquid crystal layer 2034 from the left in FIG. 37B as extraordinary light makes a parallel shift in the downward direction. Accordingly, an amount of shift of the optical path, amounting to 2S, is obtained by the reversal of the direction of the electrical field.

Therefore, by switching the polarity of the electric field applied to the liquid crystal layer 2034 via the pair of electrodes 2035, the liquid crystal layer 2034 exhibits an optical path shifting function. Hence, it is possible to receive by the solid state imaging element 2011 the light which has been interpolated between the pixels, so that a high-resolution image reading is possible by time-divisionally receiving the light, even by use of the solid state imaging element 2012 having a low resolution.

As may be seen from FIGS. 37A and 37B, the optical path of the light reflected from the document 2001 is shifted symmetrically. For this reason, there is an advantage in that the optical path length does not vary when the optical path is shifted by the optical path shifting element 2012.

Moreover, even at the electric fields less than the threshold value at which the spiral structure of the chiral smectic C phase dissolves in the liquid crystal layer 2034, the average direction of the liquid crystal directors may be regarded as the optical axis of the liquid crystal layer 2034, similarly to the case where the electric field is greater than or equal to the threshold value at which the spiral structure of the chiral smectic C phase dissolves. Even in the region where the electric field is less than the threshold value at which the spiral structure of the chiral smectic C phase dissolves, the amount of shift of the optical path can be controlled, because the tilt direction of the optical axis with respect to the electric field intensity changes.

Furthermore, the amount of shift 2S of the optical path when the electric field is reversed, depends upon the optical characteristic of the liquid crystal material used for the liquid crystal layer 2034 and the thickness of the liquid crystal layer 2034. For example, when the thickness of the liquid crystal layer 2034 is in a range of approximately several tens of μm to approximately several hundred μm, it is possible to obtain an amount of shift of the optical path in a range of approximately several μm to approximately several tens of μm, and it is possible to cope with the solid state imaging element 1011 having the pixels (photocells) arranged at the pitch P1 in a range of approximately several μm to approximately several tens of μm. Hence, the optical path shifting element 2012 of this embodiment is suited for the image reading unit 2001 for reading the document 2002 with a reading resolution of several hundred dpi to several thousand dpi.

In addition, a switching time required to switch the optical axis of the optical path shifting element 2012 changes depending on the spontaneous polarization, the tilt angle, the spiral pitch and the viscoelasticity of the liquid crystal material used for the liquid crystal layer 2034, the electric field intensity, the temperature and the like. But in any case, it is possible to obtain a high-speed response from the optical path shifting element 2012 on the order of approximately several hundred μsec at an electric field intensity of approximately several hundred V/mm, and approximately several tens of μsec at an electric field intensity of approximately several thousand V/mm (several V/μm).

Returning now to the description of the optical read unit 2001 shown in FIG. 32, the solid state imaging element 2011 is driven by a sensor circuit 2014. The solid state imaging element 2011 and the optical path shifting element 2012 are controlled by a control circuit 2015 which is formed by a microcomputer or the like. The control circuit 2015 also controls motors (not shown) which drive the first and second scanning bodies 2006 and 2009. The control circuit 2015 forms a control means for controlling various part of the optical read unit 2001.

Image data read by the solid state imaging element 2011 are subjected to a predetermined image processing in an image processing circuit 2016. In this embodiment, the optical read unit 2001 is provided in an image forming apparatus such as a digital copying machine. Thus, the image data subjected to the predetermined image processing in the image processing circuit 2016 are output to a printer engine 2017, and the printer engine 2017 prints the read image data on a recording medium such a paper by a known means.

The solid state imaging element 2011 and the optical path shifting element 2012 are controlled in synchronism with each other by the control circuit 2015. Suppose that the pixels 2002a, 2002b, 2002c, 2002d, . . . which appear in the main scan direction of the document 2002 at the pitch P1/2 μm as shown in FIG. 33. When the optical path shifting element 2012 is driven and shifts the optical path in the state shown in FIG. 35A, the pixel 2002a of the document 2002 is imaged on the pixel (photocell) 2011a of the solid state imaging element 2011, and the solid state imaging element 2011 transfers the read image data from the pixel (photocell) 2011a to the sensor circuit 2014 shown in FIG. 32. On the other hand, when the optical path shifting element 2012 shifts the optical path in the state shown in FIG. 36A, the pixel 2002b of the document 2002 is imaged on the pixel (photocell) 2011a of the solid state imaging element 2011, and the solid state imaging element 2011 transfers the read image data from the pixel (photocell) 2011a to the sensor circuit 2014. The solid state imaging element 2011 carries out the operation of transferring the read image data from the pixels (photocells) to the sensor circuit 2014 at each of the shifted positions of the optical path, for each main scan line. As a result, for each main scan line, the pixels 2002a, 2002b, 2002c, 2002d, . . . which are arranged at the pitch P1/2 μm on the document 2002 are read by the pixels (photocells) 2011a, 2011b, . . . of the solid state imaging element 2011, and the number of pixels read becomes two times the number of pixels (photocells) of the solid state imaging element 2011. The optical path shifting element 2012 shifts the optical path twice in one period of the rectangular wave voltage which is output from the square wave A.C. power supply 2013, and the solid state imaging element 2011 transfers the read image data twice in one period of the rectangular wave voltage.

By carrying out the control described above, the pixels 2002a and 2000b located at different positions on the document 2002 can be time-divisionally received by the same pixel (photocell) 2011a of the solid state imaging element 2011, by shifting the optical path by the optical path shifting element 2012. As a result, the effective read resolution of the solid stage imaging element 2011 is doubled from the original read resolution.

Figure 38:
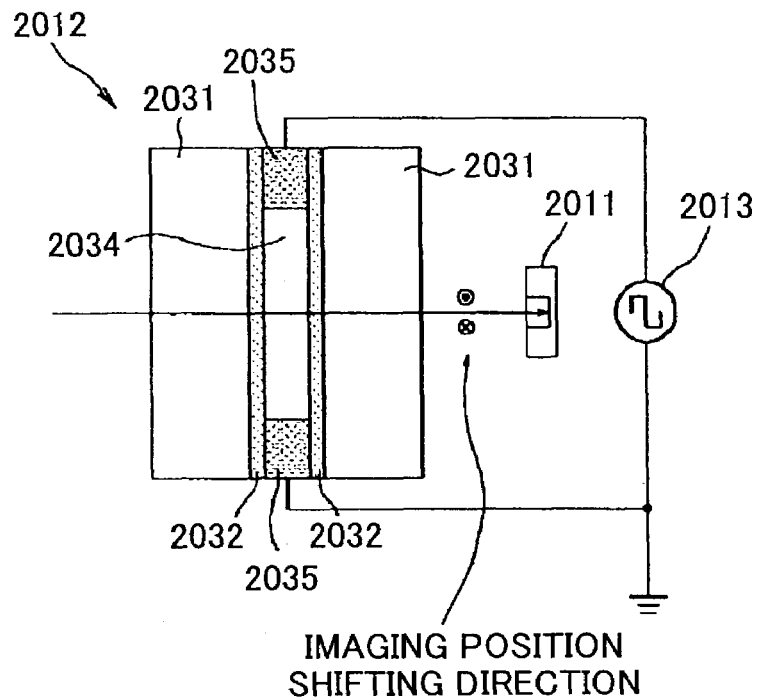
FIG. 38 is a front view in cross section showing a modification of the first embodiment of the optical read unit.

FIG. 38 is a front view in cross section showing a modification of the first embodiment of the optical read unit, that is, the optical path shifting element 2012. In FIG. 38, those parts which are the same as those corresponding parts in FIG. 34 are designated by the same reference numerals, and a description thereof will be omitted.

In the optical path shifting element 2012 shown in FIG. 38, the member forming the spacer 2033 and the metal sheet members forming the pair of electrodes 2035 may be formed by a common metal member, that is, the electrode 2035, so that the thickness of the liquid crystal layer 2034 is determined by the thickness of this common metal layer. The two electrodes 2035 have the same thickness. In this case, it is possible to reduce the number of parts of the optical path shifting element 2012. In addition, it is possible to positively make the thickness of the liquid crystal layer 2034 uniform. Furthermore, it is possible to efficiently apply to the liquid crystal layer 2034 the electric field in the direction parallel to the substrate surface, thereby making it possible to reduce the voltage which needs to be applied to the electrodes 2035.

Figure 39:
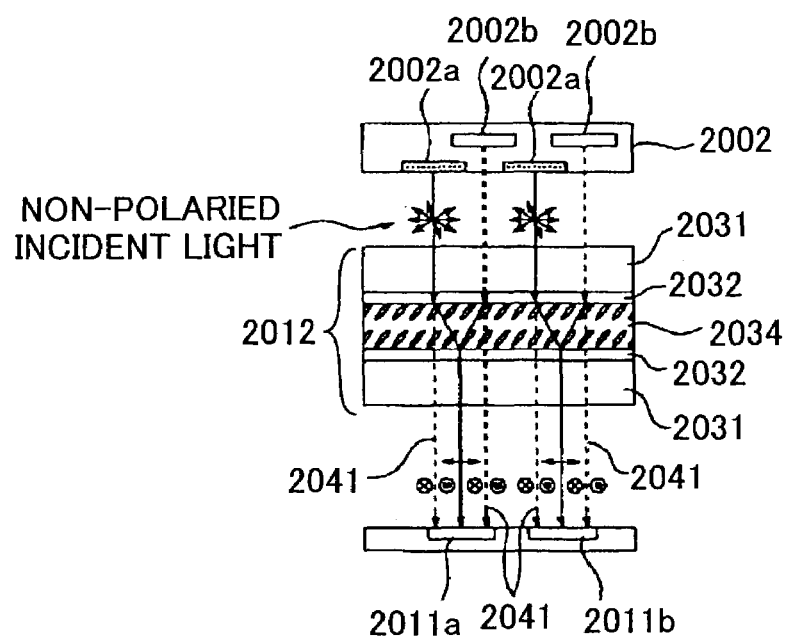
FIG. 39 is a side view in cross section showing the first embodiment of the optical read unit for explaining a phenomenon generated therein.

In the optical read unit 2001 described above, it is assumed that the incident light to the optical path shifting element 2012 is linearly polarized light which is parallel to the optical path shifting direction. However, in actual practice, the light incident to the optical path shifting element 2012 may not be the desired linearly polarized light. Hence, although the linearly polarized light component parallel to the optical path shifting direction, that is, parallel to the tilted direction of the liquid crystal directors, is shifted as described above, the other light components are not shifted, to thereby generate a noise light component 2041 as shown in FIG. 39. The noise light component deteriorates the resolution and the contrast.

Figure 40A:
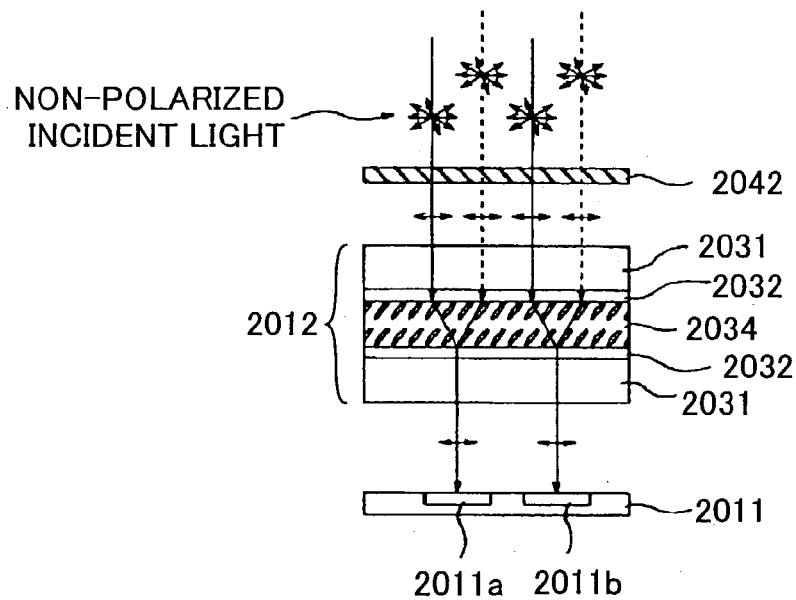
FIG. 40A is a side view in cross section showing a second embodiment of the optical read unit according to the present invention.
Figure 40B:
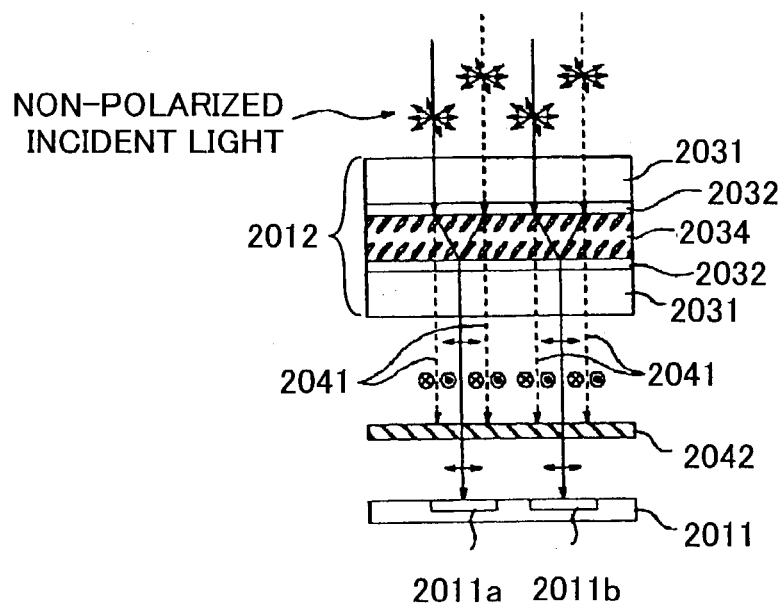
FIG. 40B is a side view in cross section showing a modification of the second embodiment of the optical read unit.

FIG. 40A is a side view in cross section showing a second embodiment of the optical read unit according to the present invention, and FIG. 40B is a side view in cross section showing a modification of the second embodiment of the optical read unit. In FIGS. 40A and 40B, those parts which are the same as those corresponding parts in FIG. 39, are designated by the same reference numerals, and a description thereof will be omitted.

In this second embodiment and the modification thereof, a linearly polarizing plate 2042 which transmits only the light components in the plane of polarization parallel to the optical path shifting direction is provided, so that only the light which is subjected to the desired shift is received by the solid stage imaging element 2011. The linearly polarizing plate 2042 may be provided on the input side of the optical path shifting element 2012 as shown in FIG. 40A or, provided on the output side of the optical path shifting element 2012 as shown in FIG. 40B.

The provision of the linearly polarizing plate 2042 positively ensures that the light received by the solid state imaging element 2011 is only the linearly polarized light parallel to the optical path shifting direction. Therefore, it is possible to prevent unwanted light components from reaching the solid stage imaging element 2011, to thereby enable the optical read operation to be carried out with a high resolution and a high contrast.

Figure 41A:
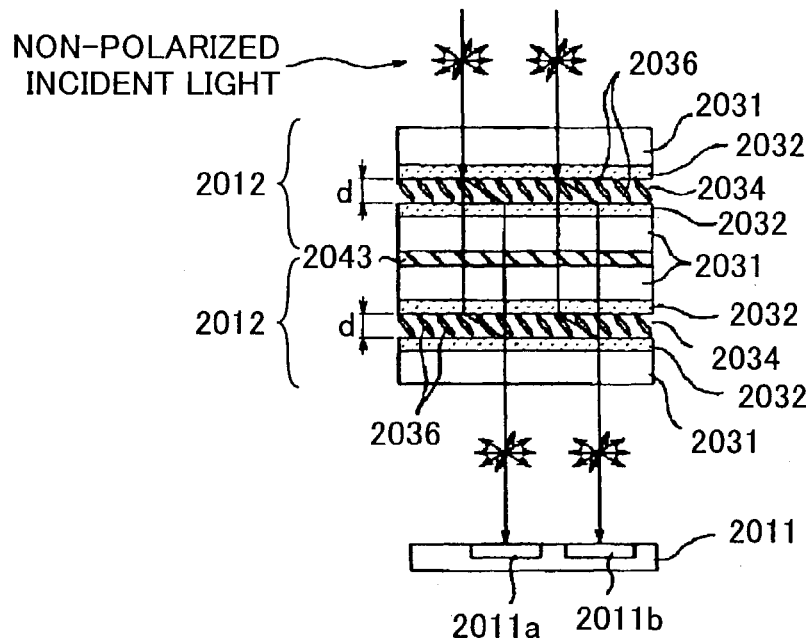
FIG. 41A is a side view in cross section showing a third embodiment of the optical read unit according to the present invention.
Figure 41B:
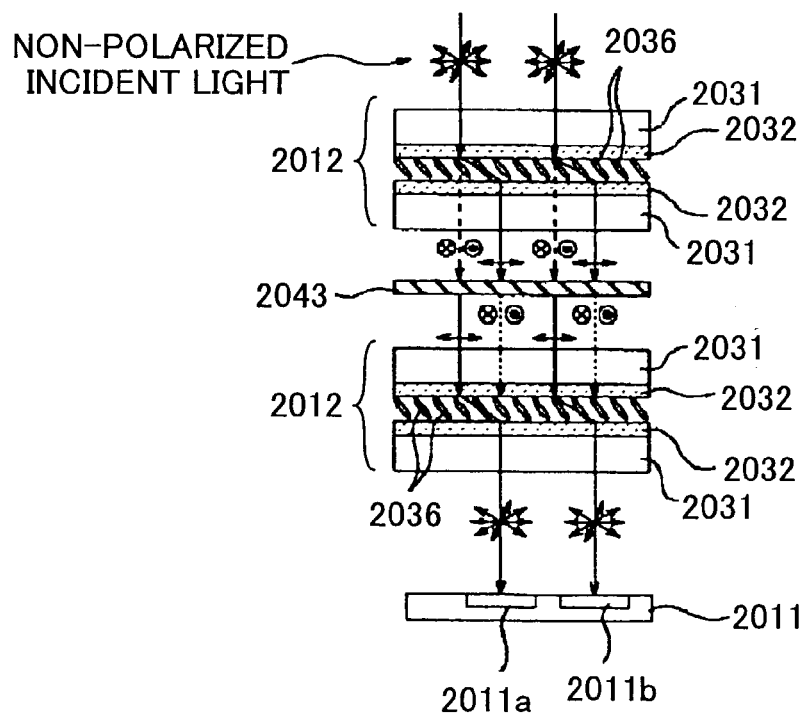
FIG. 41B is a diagram for explaining the operation of the third embodiment of the optical read unit.

Next, a description will be given of a third embodiment of the optical read unit according to the present invention, by referring to FIGS. 41A and 41B. FIG. 41A is a side view in cross section showing the third embodiment of the optical read unit, and FIG. 41B is a diagram for explaining the operation of the third embodiment of the optical read unit. In FIGS. 41A and 41B, those parts which are the same as those corresponding parts of the first embodiment of the optical read unit shown in FIGS. 32 through 37B are designated by the same reference numerals, and a description thereof will be omitted.

In the first and second embodiments of the optical read unit described above, only the linearly polarized light component in the optical path shifting direction is received by the solid state imaging element 2011. Hence, the surplus polarized light components are reflected or transmitted so as not to be used for the exposure of the solid stage imaging element 2011. For this reason, the light utilization efficiency of the light emitted from the illumination 2004 and exposed on the solid state imaging element 2011 deteriorates by an amount corresponding to the surplus polarized light components which are not used for the exposure.

Hence, in this third embodiment of the optical read unit, two optical path shifting elements 2012 having liquid crystal layers 2034 with approximately the same thicknesses are arranged in series in the optical path facing a direction such that the optical path shifting directions of the two optical path shifting elements 2012 are approximately parallel to each other. In addition, a polarization plane rotating element 2043 which rotates the plane of linear polarization by approximately 90 degrees, is arranged between the two optical path shifting elements 2012. FIGS. 41A and 41B show a state where the liquid crystal molecules are tilted in one direction by an electric field which is applied in one direction. FIG. 41A shows the two optical path shifting elements 2012 in contiguous contact with the polarization plane rotating element 2043. But in FIG. 41B, the polarization plane rotating element 2043 is illustrated, for the sake of convenience, in a state separated from the two optical path shifting elements 2012, so as to facilitate the description of the polarization direction within the two optical path shifting elements 2012.

As shown in FIG. 41A, when the non-polarized light from the document 2002 is transmitted through the first optical path shifting element 2012, the polarized light component parallel to the optical path shifting direction is shifted to the right in FIG. 41A in correspondence with the thickness d of the liquid crystal layer 2034 of this first optical path shifting element 2012. The polarized light component perpendicular to the paper in FIG. 41A is not deflected and propagates in a straight line. When these light components output from the first optical path shifting element 2012 is transmitted through the polarization plane rotating element 2043, each plane of polarization is rotated by approximately 90 degrees. Hence, in the second optical path shifting element 2012, the shifted polarized light component from the first optical path shifting element 2012 propagates in a straight line, and the polarized light component propagated in the straight line through the first optical path shifting element 2012 is shifted to the right in FIG. 41A in correspondence with the thickness d of the liquid crystal layer 2034 of the second optical path shifting element 2012. FIG. 41B shows the shifted state of the polarized light components in relation to the direction of the electric field generated within each of the liquid crystal layers 2034 of the first and second optical path shifting element 2012.

When the liquid crystal material and thickness of the two liquid crystal layers 2034 and the electric fields applied to the two liquid crystal layers 2034 are respectively the same, the amount of shift of the polarized light component generated in the two liquid crystal layers 2034 becomes the same. Hence, it is possible to utilize all of the polarized light components of the light from the document 2002, and the light utilization efficiency is approximately doubled compared to the case where only the linearly polarized light component in one direction is used.

The polarization plane rotating element 2043 may be formed by a halfwave plate, a twist nematic liquid crystal cell, a twist nematic liquid crystal film or the like.

Next, a description will be given of a fourth embodiment of the optical read unit according to the present invention, by referring to FIG. 42. FIG. 42 is a side view in cross section showing the fourth embodiment of the optical read unit. In FIG. 42, those parts which are the same as those corresponding parts of the second embodiment of the optical read unit shown in FIGS. 40A and 40B are designated by the same reference numerals, and a description thereof will be omitted.

In this fourth embodiment of the optical read unit, a polarization plane rotating element 2044 which rotates the plane of linear polarization by approximately 90 degrees is used as an intermediate layer which divides the liquid crystal layer 2034 of the single optical path shifting element 2012 into two divided layer portions, that is, two liquid crystal layers 2034. The thicknesses of the two divided layer portions (liquid crystal layers) 2034 respectively arranged on the upstream side and the downstream side of the optical path with respect to the polarization plane rotating element 2044 are set approximately the same (=d).

Thus, the polarization plane rotating element 2044 also functions as the intermediate layer, so that the number of layers or elements forming the optical path shifting element 2012 is reduced. In addition, the transmittance of the optical path shifting element 2012 as a whole is improved, because it is possible to reduce undesirable effects of reflections at the interfaces of the layers.

Furthermore, the alignment of the liquid crystal layer 2034 is improved, and all of the polarized light components input to the optical path shifting element 2012 can be shifted, thereby improving the light utilization efficiency.

The polarization plane rotating element 2044 may be formed by a halfwave plate, a twist nematic liquid crystal cell, a twist nematic liquid crystal film or the like.

Of course, it is possible to further provide an intermediate layer in each of the two liquid crystal layers 2034 respectively on the upstream side and the downstream side of the optical path. In this case, the thicknesses of the divided layer portions of each of the two liquid crystal layers 2034, divided by the corresponding intermediate layer, may be set so that the total thickness is approximately the same for the two liquid crystal layers 2034.

FIGS. 43A and 43B respectively are a plan view and a side view showing an optical path shifting element created by the present inventors.

In FIGS. 43A and 43B, a glass substrate 2031 has a width of 10 mm, a length of 40 mm and a thickness of 1 mm. A vertical (homeotropic) alignment layer 2032 which is commercially available and has a thickness of 0.6 µm, is formed on the glass substrate 2031. Two Al electrode sheets 2035, each having a width of 2 mm, a length of 45 mm and a thickness of 35 µm, and also functioning as spacers, are arranged parallel to each other between the vertical alignment layers 2032 of two glass substrates 2031, so that an effective region has a width of 1 mm. Peripheries of the substrates 2031, the vertical alignment layers 2032 and the electrode sheets 2035, except for a portion, are fixed by an ultraviolet (UV) ray setting bonding agent 2051, so as to form a cell 2038. In a state where this cell 2038 is heated to approximately 90° C., a ferroelectric liquid crystal is injected into a space between the two substrate structures, namely, between the two electrode sheets 2035, by a capillary technique, in order to form a liquid crystal layer 2034. For example, a ferroelectric liquid crystal CS1029 manufactured by Chisso Corporation of Japan, having a refractive index $\Delta n=0.16$, a tilt angle $\theta=25$ degrees and a spontaneous polarization $Ps=-40$ $nC/cm^2$, may be used as the ferroelectric liquid crystal which forms the liquid crystal layer 2034. After the ferroelectric liquid crystal is cooled, an opening through which the ferroelectric liquid crystal is injected is sealed by an appropriate bonding material such as the bonding agent 2051, so as to form the liquid crystal layer 2034 having an effective width of 1 mm, a length of approximately 40 mm and a thickness of 35 µm. The rectangular wave A.C. power supply 2013 including a pulse generator and a high-speed amplifier is connected to the electrode sheets 2035 which form an electrode pair, to operate the optical path shifting element 2012 shown in FIGS. 43A and 43B.

The present inventors confirmed that optical path shifting element 2012 shown in FIGS. 43A and 43B which is created in the above described manner has a transmittance of approximately 85% or greater.

In a state where no electric field is applied to the optical path shifting element 2012, the present inventors observed a conoscope image of the liquid crystal layer 2034 within the effective region, and found a cross shaped image and a circular ring shaped image at a central portion of the conoscope image. As a result, it was confirmed that the optical axis is perpendicular to the liquid crystal layer 2034 in the state where no electric field is applied. In this state, a spiral structure was observed, in which the tilt direction of the liquid crystal molecules rotates with respect to the direction perpendicular to the surface of the glass substrate 2031, and an average optical axis was observed to be in a spiral axis direction, that is, in a direction perpendicular to the surface of the glass substrate 2031.

Next, when a rectangular wave voltage of ±150 V and 1 Hz was applied to the electrode sheets 2035 from the rectangular wave A.C. power supply 2013, it was found that the positions of the cross shaped image and the circular ring shaped image in the conoscope image shift in the up-and-down direction, that is, undergo a reciprocating movement at 1 Hz. The tilt angle of the optical axis calculated from the numerical aperture (NA) of an objective lens of the microscope, the refractive index of the liquid crystal and the amount of shift in the position of the cross shaped image was approximately 25 degrees, and it was confirmed that the calculated tilt angle matches the tilt angle $\theta$ peculiar to the liquid crystal material. At an electric field intensity on the order of approximately 150 V/mm, it was confirmed that the spiral structure dissolves and the liquid crystal molecules are uniformly aligned in one direction, and that the direction of the optical axis of the liquid crystal layer 2034 can be switched by ±25 degrees.

The present inventors observed the electric field dependency of the amount of shift of the optical path. In experiments conducted by the present inventors, a mask pattern having a square opening with a side of 4 µm was illuminated from the back surface by linearly polarized light, and the light transmitted through the mask pattern was observed via the optical path shifting element 2012. In other words, a shift which occurs in the position of the mask pattern by operating the optical path shifting element 2012 was observed by a video camera provided with a microscope, to measure the amount of shift of the optical path. The temperature of the optical path shifting element 2012 was set to approximately 30° C. In addition, a rectangular wave voltage of 0 to ±400 V and 1 Hz was applied to the electrode sheets 2035 from the rectangular wave A.C. power supply 2013. As a result, it was found that when the plane of polarization of the incident light is perpendicular to the direction of the electric field, that is, parallel to the optical path shifting direction, the amount of shift of the optical path is approximately 7 µm at an electric field intensity on the order of approximately ±150 V/mm, and the amount of shift of the optical path saturated at this value. Similarly, measurements were made at several positions along the longitudinal direction of the optical path shifting element 2012, but each of the measurements showed similar characteristics. Furthermore, no focusing error was seen at both the two shifted positions.

The present inventors also checked a deterioration rate of the resolution (or CTF: Contrast Transfer Function) from a change in the luminance distribution of the opening between a case where no optical path shifting element 2012 is provided and a case where the optical path is shifted by the optical path shifting element 2012. It was confirmed that the CTF value is 80% or greater, and that there will be no problems from the practical point of view.

In addition, no shift in the optical path was observed when the plane of polarization of the incident light was parallel to the direction of the electric field.

The present inventors also observed the electric field dependency of the response time of the optical path shift. The electric field dependency of the response time of the optical path shift was observed similarly to the observation of the electric field dependency of the amount of shift of the optical path, using a high-speed camera provided with a microscope. More particularly, the amount of shift of the optical path and the time required to make the optical path shift, that is, the response time of the optical path shift, was measured. The temperature of the optical path shifting element 2012 was set to approximately 30° C.

In addition, a rectangular wave voltage of ±400 V and 100 Hz was applied to the electrode sheets 2035 from the rectangular wave A.C. power supply 2013, and the observation by the high-speed camera was made at a time resolution of 40500 frames/sec. As a result, at an electric field intensity of ±400 V/mm, the response time was 0.5 msec or less.

A third embodiment of the image forming apparatus according to the present invention uses any of the embodiments of the optical read unit described above.

In each of the embodiments of the optical read unit described above, a one-dimensional CCD sensor may be used for the solid state imaging element 2011. The present inventors conducted experiments for black-and-white images, using a one-dimensional CCD sensor having 2088 effective pixels (photocells) arranged at a pitch of 14 μm and having a scan speed of 1 msec/line. The effective width of the CCD sensor was approximately 29 mm, which can be sufficiently covered by the area of the optical path shifting element 2012. The optical system shown in FIG. 32 was set so that the resolution along the shorter side (257 mm) of the B4-size document 2002 corresponds to 8 dots/mm (200 ppi). By shifting the optical path by 7 μm by the optical path shifting element 2012, it was possible to obtain an effective read resolution corresponding to 400 ppi.

A rectangular wave voltage of ±400 V and 330 Hz was applied to the electrodes 2035 of the optical path shifting element 2012 from the rectangular wave A.C. power supply 2013. Since the electric field applying time at one polarity of the rectangular wave voltage is 1.5 msec and the response time of the optical path shifting element 2012 is 0.5 msec, it was confirmed that the main scan of one line can be carried out in the remaining 1.0 msec. Then, the imaging position was shifted by 7 μm by the optical path shifting element 2012, and the main scan of further one line was carried out. This shift in the imaging position corresponded to 63.5 μm on the document 2002. Thereafter, the first scanning body 2006 was moved in the sub scan direction for the next scan.

Because the shift in the sub scan direction is made at a frequency of 330 Hz in units of 63.5 μm for 400 dpi, the sub scan speed was approximately 21 mm/sec. Of course, the movement of the first scanning body 2006 in the sub scan direction may be made continuously or intermittently by use of a stepping motor.

An embodiment of an imaging unit according to the present invention includes a lens, any one of the optical path shifting elements described above, and a light receiving means or element. In a case where the lens is provided on the output side of the optical path shifting element, as in the case of the lens 510 shown in FIG. 19, the optical path shifting element receives light from a light emitting element, and exposes the light receiving means or element, such as the recording medium 201 shown in FIG. 2, via the lens. On the other hand, in a case where the lens is provided on the input side of the optical path shifting element, as in the case of the lens 2010 shown in FIG. 33, the optical path shifting element receives light via the lens, and exposes the light receiving means or element, such as the solid state imaging element 2011.

In each of the embodiments described above, it is of course possible to arranged more than two optical path shifting elements in series, when providing a plurality of optical path shifting elements.

Further, the present invention is not limited to these embodiments, but various variations and modifications may be made without departing from the scope of the present invention.

What is claimed is:

1. An imaging unit for imaging light on a light receiving element, comprising:
   at least one optical path shifting element having an input side and an output side; and
   a lens arranged on the input side or the output side of the optical path shifting element,
   said light receiving element receiving light imaged thereon via the optical path shifting element which comprises:
   a liquid crystal layer;
   first and second vertical alignment layers arranged on opposite surfaces of the liquid crystal layer;
   first and second transparent substrates respectively arranged on the first and second vertical alignment layers; and
   first and second electrodes arranged on respective sides of the liquid crystal layer perpendicular to the opposite surfaces of the liquid crystal layer, thereby sandwiching the liquid crystal layer between the first and second electrodes for an entire thickness of the liquid crystal layer and applying an electrical field in a direction approximately parallel to an in-plane direction of the first and second transparent substrates when applied with a voltage,
   said liquid crystal layer being made of a chiral smectic C phase ferroelectric liquid crystal having a homeotropic alignment caused by the vertical alignment layers,
   said optical path shifting element shifting an optical path of linearly polarized light input thereto in a first optical path shifting direction in a first state and in a second optical path shifting direction in a second state depending on a state of an electric field applied to the liquid crystal layer, said linearly polarized light having a plane of polarization perpendicular to a direction of the electric field.

2. The imaging unit as claimed in claim 1, wherein the first and second electrodes of the optical path shifting element is disposed between the first and second substrates and determines a thickness of the liquid crystal layer.

3. The imaging unit as claimed in claim 1, further comprising:
   a linearly polarizing plate, arranged on the input side or the output side of the optical path shifting element, transmitting only light having a plane of polarization parallel to the optical path shifting direction.

4. The imaging unit as claimed in claim 1, further comprising:
   a polarization plane rotating element, arranged at a position dividing the liquid crystal layer into two layer portions of approximately equal thicknesses, and rotating a plane of linear polarization by approximately 90 degrees.

5. The imaging unit as claimed in claim 1, wherein two said optical path shifting elements are arranged in series along the optical path so that optical path shifting directions of the two optical path shifting elements are approximately parallel to each other.

6. The imaging unit as claimed in claim 5, further comprising:
a polarization plane rotating element, disposed between the two optical path shifting elements, and rotating a plane of linear polarization by approximately 90 degrees.

7. An optical write unit for optically writing an image on a recording medium, comprising:
a light emitting element array having a plurality of light emitting elements arranged in an arrangement direction at a predetermined pixel pitch;
a lens converging light on the recording medium; and
at least one optical path shifting element electrically shifting an optical path of incoming light in first and second optical path shifting directions parallel to the arrangement direction,
said optical path shifting element being controlled to shift the optical path to thereby irradiate light, which has been interpolated between pixels of the predetermined pixel pitch, with respect to the recording medium,
said optical path shifting element comprising:
a pair of electrodes having a predetermined separation;
a pair of vertical alignment layers disposed between the pair of electrodes;
a liquid crystal layer, disposed between the pair of vertical alignment layers, and made of a chiral smectic C phase ferroelectric liquid crystal having a homeotropic alignment caused by the pair of vertical alignment layers; and
an electric field generating part configured to apply a voltage to the liquid crystal layer to generate an electric field in a direction which is approximately parallel to an in-plane direction of a pair of transparent substrates and is approximately perpendicular to the arrangement direction, wherein
the pair of electrodes are arranged perpendicular to the liquid crystal layer, thereby sandwiching the liquid crystal layer between the pair of electrodes for an entire thickness of the liquid crystal layer, and
said linearly polarized light having a plane of polarization perpendicular to a direction of the electric field.

8. The optical write unit as claimed in claim 7, wherein a plurality of said optical path shifting elements are arranged in series along the optical path so that optical path shifting directions of the plurality of optical path shifting elements are approximately parallel to each other, and said electric field generating means independently drives the plurality of optical path shifting elements.

9. The optical write unit as claimed in claim 7, wherein said optical path shifting element further comprises an intermediate layer arranged at a position dividing the liquid crystal layer into two layer portions of approximately equal thicknesses, and said intermediate layer has a vertical alignment layer formed on at least one of confronting surfaces thereof.

10. The optical write unit as claimed in claim 7, wherein said optical path shifting means further comprises a pair of electrodes disposed on respective side surfaces of the liquid crystal layer.

11. The optical write unit as claimed in claim 10, the predetermined separation d of the pair of electrodes is set to satisfy a relationship, $$2T \times NA/n \leq d \leq 2T \times NA$$

where NA denotes a numerical aperture of the lens, n denotes a refractive index of the pair of transparent substrates of the optical path shifting element, and T denotes a maximum distance from a focal point position of the lens to the liquid crystal layer within the optical path shifting element.

12. The optical write unit as claimed in claim 7, further comprising:
a linearly polarizing plate, arranged in the optical path from the light emitting element array to the recording medium, transmitting only light having a plane of polarization parallel to the optical path shifting direction of the optical path shifting element.

13. The optical write unit as claimed in claim 7, wherein two said optical path shifting elements are arranged in series along the optical path so that optical path shifting directions of the two optical path shifting elements are approximately parallel to each other, and further comprising:
a polarization plane rotating element, disposed between the two optical path shifting elements, and rotating a plane of linear polarization by approximately 90 degrees.

14. The optical write unit as claimed in claim 7, wherein said optical path shifting element further comprises an intermediate layer, formed by a polarization plane rotating element which rotates a plane of linear polarization by approximately 90 degrees, arranged at a position dividing the liquid crystal layer into two layer portions of approximately equal thicknesses, and said intermediate layer has a vertical alignment layer formed on at least one of confronting surfaces thereof.

15. The optical write unit as claimed in claim 7, wherein one of the pair of transparent substrates closer to the light emitting element array has a thickness smaller than that of the other of the pair of transparent substrates closer to the lens.

16. The optical write unit as claimed in claim 7, wherein one of the pair of transparent substrates closer to the recording medium has a thickness smaller than that of the other of the pair of transparent substrates closer to the lens.

17. The optical write unit as claimed in claim 7, further comprising:
a microlens array, including a plurality of microlenses, arranged adjacent to the light emitting element array, so that the microlenses are arranged at positions corresponding to the light emitting elements of the light emitting element array.

18. The optical write unit as claimed in claim 17, wherein the microlens array includes at least a second liquid crystal layer and a second pair of electrodes for applying an electric field to the second liquid crystal layer, and a focal length of each of the microlenses is variable with respect to light in a predetermined polarization direction depending on an electric field intensity of the electric field applied to the second liquid crystal layer.

19. The optical write unit as claimed in claim 7, further comprising:
a pair of microlens arrays, each including a plurality of microlenses, arranged in series in an optical axis direction thereof and adjacent to the light emitting element array, so that the microlenses are arranged at positions corresponding to the light emitting elements of the light emitting element array, wherein each of the pair of microlens arrays includes at least a second liquid crystal layer and a second pair of electrodes for applying an electric field to the second liquid crystal layer, a focal length of each of the microlenses is variable with respect to light in a predetermined polarization direction depending on an electric field intensity of the electric field applied to the second liquid crystal layer, and alignment directions of liquid crystal molecules within the second liquid crystal layer are mutually perpendicular between the pair of microlens arrays in a state where the electric field is applied or no electric field is applied to the second pair of electrodes of each of the pair of microlens arrays.

20. The optical write unit as claimed in claim 7, wherein the lens includes at least a second liquid crystal layer and a second pair of electrodes for applying an electric field to the second liquid crystal layer, and a focal length of the lens is variable with respect to light in a predetermined polarization direction depending on an electric field intensity of the electric field applied to the second liquid crystal layer.

21. The optical write unit as claimed in claim 7, wherein the lens includes at least two second liquid crystal layers and a two second pair of electrodes for applying an electric field to the two second liquid crystal layers, a focal length of the lens is variable with respect to light in a predetermined polarization direction depending on an electric field intensity of the electric field applied to the two second liquid crystal layers, and alignment directions of liquid crystal molecules within the two second liquid crystal layers are mutually perpendicular in a state where the electric field is applied or no electric field is applied to the two second pair of electrodes.

22. The optical write unit as claimed in claim 7, wherein the light emitting elements of the light emitting element array are selected from a group consisting of light emitting diodes (LEDs) and laser diodes.

23. An image forming apparatus comprising:
a photoconductive body;
a charging unit uniformly charging a surface of the photoconductive body;
an optical write unit forming a latent image on the charged surface of the photoconductive body by irradiating light thereon;
a developing unit developing the latent image into a developed image; and
a transfer unit transferring the developed image onto a recording medium, said optical write unit comprising:
a light emitting element array having a plurality of light emitting elements arranged in an arrangement direction at a predetermined pixel pitch;
a lens converging light on the photoconductive body; and
at least one optical path shifting element electrically shifting an optical path of incoming light in first and second optical path shifting directions parallel to the arrangement direction,
said optical path shifting element being controlled to shift the optical path to thereby irradiate light, which has been interpolated between pixels of the predetermined pixel pitch, with respect to the photoconductive body,
said optical path shifting element comprising:
a pair of electrodes having a predetermined separation;
a pair of vertical alignment layers disposed between the pair of electrodes;
a liquid crystal layer, disposed between the pair of vertical alignment layers, and made of a chiral smectic C phase ferroelectric liquid crystal having a homeotropic alignment caused by the pair of vertical alignment layers; and
an electric field generating part configured to apply a voltage to the liquid crystal layer to generate an electric field in a direction which is approximately parallel to an in-plane direction of a pair of transparent substrates and is approximately perpendicular to the arrangement direction, wherein
the pair of electrodes are arranged perpendicular to the liquid crystal layer, thereby sandwiching the liquid crystal layer between the pair of electrodes for an entire thickness of the liquid crystal layer, and
said linearly polarized light having a plane of polarization perpendicular to a direction of the electric field.

24. The image forming apparatus as claimed in claim 23, wherein the surface of the photoconductive body is made of a material which forms the latent image in response to an external energy.

* * * * *